US011757293B2

(12) United States Patent
Nishikawa et al.

(10) Patent No.: US 11,757,293 B2
(45) Date of Patent: Sep. 12, 2023

(54) BATTERY PACK, AND ELECTRIC APPLIANCE USING BATTERY PACK

(71) Applicant: Koki Holdings Co., Ltd., Tokyo (JP)

(72) Inventors: Tomomasa Nishikawa, Ibaraki (JP); Masayuki Ogura, Ibaraki (JP); Masaru Hirano, Ibaraki (JP); Takuhiro Murakami, Ibaraki (JP); Nobuhiro Takano, Ibaraki (JP); Osamu Kawanobe, Ibaraki (JP); Akira Matsushita, Ibaraki (JP); Hayato Yamaguchi, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 16/346,117

(22) PCT Filed: Oct. 27, 2017

(86) PCT No.: PCT/JP2017/038951
§ 371 (c)(1),
(2) Date: Apr. 30, 2019

(87) PCT Pub. No.: WO2018/079724
PCT Pub. Date: May 3, 2018

(65) Prior Publication Data
US 2019/0260209 A1 Aug. 22, 2019

(30) Foreign Application Priority Data

Oct. 31, 2016 (JP) ................................ 2016-213113
Oct. 31, 2016 (JP) ................................ 2016-213115
(Continued)

(51) Int. Cl.
H02J 7/00 (2006.01)
B25F 5/00 (2006.01)
(Continued)

(52) U.S. Cl.
CPC .............. *H02J 7/0024* (2013.01); *B25F 5/00* (2013.01); *H01M 50/247* (2021.01);
(Continued)

(58) Field of Classification Search
CPC ............... H01M 2/10; H01M 2220/30; H01M 2220/00; H01M 2/105; H02J 7/0024; H02J 7/00; B25F 5/00
See application file for complete search history.

(56) References Cited

U.S. PATENT DOCUMENTS

2005/0280393 A1    12/2005  Feldmann
2015/0214520 A1*   7/2015   Nishikawa ................ B25F 5/02
                                                            429/100
2015/0256111 A1    9/2015   Forster et al.

FOREIGN PATENT DOCUMENTS

CN    101924379    12/2010
CN    201838666    5/2011
(Continued)

OTHER PUBLICATIONS

JP2008178278A Takano et al. espacenet machine translation (Year: 2008).*
(Continued)

*Primary Examiner* — Cynthia H Kelly
*Assistant Examiner* — Monique M Wills
(74) *Attorney, Agent, or Firm* — JCIPRNET

(57) ABSTRACT

In order that the output voltage of a battery pack can be switched and the battery pack can be shared among different voltage electric appliances, this battery pack has a switching mechanism that switches outputting a low voltage by parallel connection of two cell units or outputting a high voltage by series connection of the two cell units, said two cell units each being composed of a plurality of cells connected in series, wherein the switching mechanism is configured from
(Continued)

a change-over switch having an operation lever (452). The change-over switch is embedded in a battery pack (400), and an operator is able to manually switch outputting 18 V by setting the operation lever (452) at a first position or outputting 36 V by setting the operation lever (452) at a second position.

5 Claims, 31 Drawing Sheets

(30) Foreign Application Priority Data

Oct. 31, 2016 (JP) ................................ 2016-213118
Sep. 29, 2017 (JP) ................................ 2017-190371

(51) Int. Cl.
*H01M 50/247* (2021.01)
*H01M 50/519* (2021.01)
*H01M 50/213* (2021.01)
*H01M 50/502* (2021.01)

(52) U.S. Cl.
CPC ............. *H01M 50/519* (2021.01); *H02J 7/00* (2013.01); *H01M 50/213* (2021.01); *H01M 50/502* (2021.01); *H01M 2220/00* (2013.01)

(56) References Cited

FOREIGN PATENT DOCUMENTS

| | | | | |
|---|---|---|---|---|
| CN | 102714484 | 10/2012 | | |
| CN | 203134921 | 8/2013 | | |
| CN | 104044106 | 9/2014 | | |
| CN | 104520074 | 4/2015 | | |
| CN | 105765822 | 7/2016 | | |
| CN | 205394455 | 7/2016 | | |
| EP | 1903657 | 3/2008 | | |
| JP | S49102738 | 9/1974 | | |
| JP | 2008178278 | 7/2008 | | |
| JP | 2008178278 A | * | 7/2008 | ................ B25F 5/02 |
| JP | 2013086228 | 5/2013 | | |
| JP | 2014017954 | 1/2014 | | |
| JP | 2015191735 | 11/2015 | | |
| WO | 2015132606 | 9/2015 | | |
| WO | 2015179318 | 11/2015 | | |

OTHER PUBLICATIONS

"International Search Report (Form PCT/ISA/210) of PCT/JP2017/038951," dated Dec. 12, 2017, with English translation thereof, pp. 1-4.

"Office Action of Japan Counterpart Application", dated Apr. 28, 2020, with English translation, p. 1-p. 9.

"Search Report of Europe Counterpart Application", dated Jun. 2, 2020, p. 1-p. 7.

Office Action of China Counterpart Application, with English translation thereof, dated Apr. 26, 2021, pp. 1-22.

"Office Action of China Counterpart Application" with English translation thereof, dated Nov. 2, 2021, p. 1-p. 19.

* cited by examiner (1)

(2)

(1) 14500 size cells × 30

Weight
26g/cell × 30cells = 690g
Volume : 298299[mm³]
(cell) 230907[mm³]
(separator) 67392[mm³]

18V setting (1)

(2)

BATTERY PACK, AND ELECTRIC APPLIANCE USING BATTERY PACK

CROSS-REFERENCE TO RELATED APPLICATION

This application is a 371 application of the International PCT application serial no. PCT/JP2017/038951, filed on Oct. 27, 2017, which claims the priority benefits of Japan Patent Application No. 2016-213113, filed on Oct. 31, 2016, Japan Patent Application No. 2016-213115, filed on Oct. 31, 2016, Japan Patent Application No. 2016-213118, filed on Oct. 31, 2016, and Japan Patent Application No. 2017-190371, filed on Sep. 29, 2017. The entirety of each of the above-mentioned patent applications is hereby incorporated by reference herein and made a part of this specification.

TECHNICAL FIELD

The present invention relates to a battery pack that supplies power to an electric appliance body including a load device such as a motor and a light. Moreover, the present invention relates to an electric appliance such as an electric tool using a battery pack.

BACKGROUND ART

Electric tools and electric appliances using a commercial power supply may be driven by battery packs using a secondary battery such as a lithium ion battery, and electric tools and electric appliances are thus able to become cordless. For example, in a hand-held electric tool that drives a tip tool using a motor, a battery pack in which a plurality of secondary battery cells are housed may be used, and the motor may be driven by electric energy stored in the battery pack. The battery pack is detachable from an electric tool body, and when the voltage drops due to discharging, the battery pack is removed from the electric tool body, and charged using an external charger.

In a cordless type electric tool or electric appliance, securing a predetermined operation time and securing a predetermined output is required, and there have been attempts to increase an output and a power according to improvement in the performance of secondary batteries. In addition, electric appliances using a battery pack as a power supply have been developed, and battery packs with various voltages have been provided. Generally, output voltages of battery packs are fixed. However, Patent Literature 1 proposes a power supply device for an electric device in which a plurality of battery units are provided in a housing in which a battery is housed, and a connection member can select whether the battery units are connected in series to provide an output or connected in parallel to provide an output, and which can support devices with different voltages.

CITATION LIST

Patent Literature

[Patent Literature 1]
Japanese Unexamined Patent Application Publication No. 2014-17954

SUMMARY OF INVENTION

Technical Problem

It is cumbersome for users to provide a plurality of types of battery pack when a plurality of electric tools and electric appliances are used. It is desirable to realize a user-friendly battery pack that supports electric tools and electric appliances with different voltages by switching voltage. Moreover, it is desirable to realize a voltage switching type battery pack that can be easily mounted in an electric appliance, in place of a power supply device separate from an electric appliance body as in Patent Literature 1.

The present invention has been made in view of the above circumstances, and one object of the present invention is to provide a battery pack which can be mounted in an electric appliance body and can switch output voltage, and an electric appliance using the same. Another object of the present invention is to provide a battery pack that can easily switch output voltage and an electric appliance using the same. Still another object of the present invention is to provide a battery pack in which, when an output voltage of the battery pack is set to a voltage different from a rated voltage of an electric appliance body, the battery pack can be prevented from being mounted in the electric appliance body, and an electric appliance using the same.

Solution to Problem

Representative inventions among inventions disclosed in this specification will be described as follows. According to first invention, there are provided a battery pack which can be mounted in an electric appliance body and includes a plurality of cell units including at least one cell, a housing which can be mounted in the electric appliance body and in which a plurality of cell units are housed, and a switching mechanism for switching whether the plurality of cell units are connected in parallel to output a low voltage or the plurality of cell units are connected in series to output a high voltage, and an electric appliance using the same. According to the first invention, by providing the above features, it is possible to achieve the object of providing a battery pack which can be mounted in an electric appliance body and can switch output voltage, and an electric appliance using the same.

According to a second invention, there are provided a battery pack which can be mounted in an electric appliance body and includes a plurality of cell units including at least one cell, a housing in which a plurality of cell units are housed, and a switching mechanism for switching whether the plurality of cell units are connected in parallel to output a low voltage or the plurality of cell units are connected in series to output a high voltage, wherein the switching mechanism includes a change-over switch having a first position at which a low voltage is output and a second position at which a high voltage is output, an operation portion that switches the change-over switch between the first position and the second position by operating from the outside of the battery pack, and an electric appliance using the same. According to the second invention, by providing the above features, it is possible to achieve the object of providing a battery pack that can easily switch output voltage and an electric appliance using the same.

According to a third invention, there are provided a battery pack which can be mounted in an electric appliance body and includes cell units including at least one cell, a housing which can be mounted in the electric appliance body and in which the cell units are housed, and a switching mechanism that switches whether a low voltage is output or a high voltage is output, wherein the switching mechanism includes a change-over switch having a first position at which a low voltage is output and a second position at which a high voltage is output and an operation portion that switches the change-over switch between the first position and the second position by operating from the outside of the battery pack, wherein the battery pack is configured that when the change-over switch is at a position at which a voltage different from a rated voltage of the electric appliance body is output, while the battery pack is mounted in the electric appliance body, the electric appliance body interferes with the operation portion, and the battery pack cannot be mounted in the electric appliance body while the change-over switch remains at this position, and an electric appliance using the same. According to the third invention, it is possible to achieve the object of providing a battery pack in which, when an output voltage of the battery pack is set to a voltage different from a rated voltage of an electric appliance body, the battery pack can be prevented from being connected to the electric appliance body, and an electric appliance using the same.

Therefore, according to not only the inventions having the above features, but also inventions having, for example, the following features, it is possible to achieve at least any of the above objects. In addition, configurations of examples described in the section of description of embodiments can be combined with these inventions.

According to a fourth invention, there is provided a battery pack which is able to be mounted in an electric appliance body by moving forward and toward the electric appliance body, wherein the battery pack includes a housing in which a plurality of cell units in which a plurality of respective cells are connected in series are housed, a rail mechanism provided to extend in a front to rear direction in an upper part of the housing, a positive electrode terminal and a negative electrode terminal connected to the plurality of cell units and a switching mechanism for switching whether the cell units are connected in parallel to output a low voltage or the cell units are connected in series to output a high voltage, wherein the switching mechanism includes a change-over switch that switches output voltage and an operation portion for operating the change-over switch, and wherein the battery pack is configured that at least a part of the change-over switch or at least a part of the operation portion is positioned on the rear side relative to the positive electrode terminal and the negative electrode terminal at a position with the same height as the positive electrode terminal and the negative electrode terminal.

According to a fifth invention, there is provided a battery pack in which the battery pack includes a pair of latches for fixing the battery pack so that the battery pack does not escape from the electric appliance body, and the change-over switch is disposed between the pair of latches, in the fourth invention.

According to a sixth invention, there is provided a battery pack in which the battery pack has a circuit board to which the positive electrode terminal and the negative electrode terminal are connected, and the change-over switch is disposed behind the circuit board and connected to the circuit board, in the fourth or fifth invention.

According to a seventh invention, there is provided a battery pack including a housing in which a plurality of cell units in which a plurality of respective cells are connected in series are housed, a rail mechanism that is provided in the housing and for fitting with a mounting part of an electric appliance body to be connected, and a switching mechanism for switching whether the cell units are connected in parallel to output a low voltage or the cell units are connected in series to output a high voltage, wherein the switching mechanism includes a change-over switch that switches output and an operation portion for operating the change-over switch, and when the operation portion is operated, the change-over switch is switched between the first position and the second position. The battery pack is configured that at least a part of the operation portion protrudes upward from the positive electrode terminal and the negative electrode terminal or is positioned on the rear side relative to the positive electrode terminal and the negative electrode terminal at a position with the same height as the positive electrode terminal and the negative electrode terminal. According to the seventh invention, by providing the above features, it is possible to achieve the object of providing a battery pack that can be mounted in an electric appliance body and can switch output voltage. In addition, it is possible to achieve the object of providing a battery pack that can easily switch output voltage. In addition, according to the fourth seventh invention, it is easy to operate the operation portion for switching output voltage, and for example, when the operator operates the operation portion by hand, a hand is less likely to touch the positive electrode terminal and the negative electrode terminal.

According to an eighth invention, the switching mechanism is disposed on the rear side relative to a terminal disposition area in which the positive electrode terminal and the negative electrode terminal are disposed side by side in a direction intersecting a mounting direction when viewed in a mounting direction of the battery pack toward the electric appliance body.

According to a ninth invention, in the battery pack, a contact member that switches a connection state of cell units according to the position of the operation portion is provided, and the contact member is housed in an inner case, and the inner case is housed in the housing.

According to a tenth invention, in the battery pack, there are a terminal disposition area in which the positive electrode terminal and the negative electrode terminal are disposed side by side in a direction intersecting a mounting direction of the battery pack toward the electric appliance body, and a latch housing area which is provided to be positioned on the rear side in the mounting direction relative to the terminal disposition area and houses a latch mechanism for fixing the battery pack so that the battery pack does not escape from the electric appliance body, wherein the switching mechanism is disposed in an area overlapping the latch housing area when viewed in the mounting direction.

According to an eleventh invention, the terminal disposition area of the battery pack is provided to protrude upward from a lower step surface, and the latch housing area is provided to protrude upward from the terminal disposition area. The switching mechanism is disposed on the rear side relative to the rail mechanism. In addition, a positive electrode terminal and a negative electrode terminal that are disposed side by side in a direction intersecting the mounting direction are provided, and the rail mechanism includes a pair of rails that extend in the mounting direction outside the positive electrode terminal and the negative electrode terminal in the intersecting direction, and the switching mechanism is disposed on the rear side relative to the positive electrode terminal and the negative electrode terminal in the mounting direction and between the pair of rails.

According to a twelfth invention, when the operation portion sets the change-over switch to a first position on the side of a low voltage, the battery pack is able to be mounted in a first electric appliance body that is compatible with a low voltage, and when the operation portion sets the change-over switch to a second position on the side of a high voltage, the battery pack is able to be mounted in a second electric appliance body that is compatible with a high voltage. The operation portion returns the change-over switch to the first position when the battery pack is removed from the electric appliance body using a biasing component. In addition, in the battery pack, a ridge part that projects upward from an upper step surface of the housing in which the positive electrode terminal and the negative electrode terminal are housed, and a stopper part surrounded by the ridge part are formed, the rail mechanism is provided on both sides of the upper step surface, and the operation portion is disposed inside the stopper part, that is, a part hidden from the outside when connected to the electric appliance body. In the battery pack, in the vicinity of the center of the ridge part in a direction intersecting the mounting direction, a recess part in which a vent opening to the inside of the housing is disposed is provided, and the operation portion may be provided in the vicinity of the vent opening in the recess part.

According to a thirteenth invention, there are provided a battery pack including a change-over switch that switches output and an electric appliance including a first electric appliance body that can be connected to a battery pack and is compatible with a low voltage. In the battery pack, when the operation portion is at a first position, a low voltage is output, and when the operation portion is at a second position, a high voltage is output. The first electric appliance body has a switching element that can be engaged with the operation portion. When the operation portion of the battery pack is at the second position, while the battery pack is connected to the first electric appliance body, the switching element is engaged with the operation portion. In addition, when the operation portion is at the second position, while the battery pack is connected to the first electric appliance body, the switching element is engaged with the operation portion, and the operation portion is moved to the first position. In addition, when the operation portion is at the second position, while the battery pack is connected to the first electric appliance body, the switching element is engaged with the operation portion, and blocks connection between the battery pack and the first electric appliance body.

According to a fourteenth invention, there is provided an electric appliance system including a battery pack including a plurality of cell units, a first electric appliance body to which the battery pack is connected, and a second electric appliance body to which the battery pack is connected and has a larger rated voltage than that of the first electric appliance body. The first electric appliance body has a first power supply terminal group including a first positive electrode input terminal and a first negative electrode input terminal that are disposed away from each other in a direction intersecting a connection direction. The second electric appliance body has a second power supply terminal group including a second positive electrode terminal and a second negative electrode terminal disposed at a position different from that of the first power supply terminal group in the intersecting direction, and a serial terminal for serial connection of cell units. The battery pack includes a first output terminal group connected to the first power supply terminal group, a second output terminal group connected to the second power supply terminal group, and a serial connection terminal connected to the serial terminal. When the battery pack is connected to the first electric appliance body, the first power supply terminal group and the first output terminal group are connected and thus the plurality of cell units are connected in parallel. When the battery pack is connected to the second electric appliance body, the second power supply terminal group and the second output terminal group are connected and the serial terminal and the serial connection terminal are connected, and thus the cell units are connected in series.

According to a fifteenth invention, there is provided an electric appliance system including a battery pack including a plurality of cell units, a first electric appliance body to which the battery pack is connected, and a second electric appliance body to which the battery pack is connected and has a larger rated voltage than that of the first electric appliance body. The first electric appliance body includes a parallel positive electrode terminal and a parallel negative electrode terminal, and the second electric appliance body includes a serial positive electrode terminal, a serial negative electrode terminal, and a serial terminal. The battery pack includes a parallel terminal group, a serial terminal group, and a serial connection terminal which can be connected to a parallel positive electrode terminal, a parallel negative electrode terminal, a serial positive electrode terminal, a serial negative electrode terminal, and a serial terminal. When the battery pack is connected to the first electric appliance body, the parallel positive electrode terminal and the parallel negative electrode terminal are connected to the parallel terminal group. In addition, when the battery pack is connected to the second electric appliance body, the serial positive electrode terminal and the serial negative electrode terminal are connected to the serial terminal group and the serial terminal is connected to the serial connection terminal.

According to a sixteenth invention, the first electric appliance body includes a first device side positive electrode terminal connected to the positive electrode terminal group and a first device side negative electrode terminal connected to the negative electrode terminal group. When the battery pack and the first electric appliance body are connected, the plurality of cell units are connected in parallel. In addition, the second electric appliance body includes a device side serial terminal connected to the serial terminal group, a second device side positive electrode terminal connected to the positive electrode terminal, and a second device side negative electrode terminal connected to the negative electrode terminal. When the battery pack and the second electric appliance body are connected, the plurality of cell units are connected in series.

According to a seventeenth invention, there is provided a battery pack which includes a housing in which a plurality of cells are housed, and in which a plurality of cells are connected in series to form a plurality of cell units, and it is possible to switch whether the plurality of cell units are connected in parallel to output a first voltage or the plurality of cell units are connected in series to output a second voltage. A low voltage terminal group including a positive electrode terminal and negative electrode terminal for a low voltage and a high voltage terminal group including a positive electrode terminal and negative electrode terminal for a high voltage are independently provided. An area occupied by the low voltage terminal group is set to be included in an area occupied by the high voltage terminal group. A voltage switching mechanism operates according to mounting of the terminal of the electric appliance body to be connected and switches a voltage. In the voltage switching mechanism, a wiring contact position between cell units moves according to the position of the mounted terminal group when connected to the electric appliance body, and the voltage switching mechanism switches whether the plurality of cell units are connected in parallel or connected in series. In addition, the voltage switching mechanism includes a plurality of movable members that are movable in a direction intersecting a mounting direction of the battery pack toward the electric appliance body. The movable member moves in the intersecting direction in contact with the power supply terminal of the electric appliance body connected to one of the low voltage terminal group and the high voltage terminal group, and the movable member moves and switches connections between the cell units. In addition, the voltage switching mechanism includes a biasing component. When the power supply terminal of the electric appliance body is not in contact with the movable member, the movable member is moved to a connection position on the low voltage side.

According to an eighteenth invention, there is provided a battery pack that can switch between a first voltage and a second voltage, and when a battery pack is connected to an electric appliance body, a contact position between cell units moves according to the position of the terminal of the electric appliance body, and whether a plurality of cell units are connected in parallel or connected in series are switched between. Therefore, a first power supply terminal that outputs a first voltage and a second power supply terminal that outputs a second voltage are provided. A voltage switching mechanism includes a movable member that moves according to the position of a device side power supply terminal of an electric appliance body connected to the first power supply terminal or the second power supply terminal. According to movement of the movable member, connections between the plurality of cell units are switched. The voltage switching mechanism includes a plurality of movable members that are movable in a direction intersecting a mounting direction of the battery pack toward the electric appliance body, and the plurality of movable members move in the intersecting direction in contact with the power supply terminal on the side of the electric appliance, and connections between the plurality of cell units are switched according to movement of the movable member. In addition, the voltage switching mechanism includes a biasing component. When the power supply terminal on the side of the electric appliance is not in contact with the movable member, the movable member returns to a connection position on the low voltage side.

According to a nineteenth invention, there is provided a battery pack in which it is possible to switch whether cell units are connected in parallel to output a first voltage or the plurality of cell units are connected in series to output a second voltage. A movable change-over switching member for switching connections between cell units between serial and parallel connections is provided. The change-over switching member has a movable member that moves in a direction intersecting a mounting direction of the battery pack toward an electric appliance body. The movable member moves according to insertion of the terminal of the electric appliance body for a first or second voltage, and switches output voltage of the battery pack. The movable member includes two members that move toward or away from each other in a direction intersecting the mounting direction. The movable member has an inclined surface for bringing two members into close proximity to each other according to insertion of the terminal of the electric appliance body. In addition, the battery pack includes a housing in which a plurality of cells are housed, and in which a plurality of cells are connected in series to form a plurality of cell units, can switch whether the cell units are connected in parallel to output a first voltage or the plurality of cell units are connected in series to output a second voltage, includes a mobile terminal that moves according to the position of the power supply terminal of the electric appli- ance body to be connected, and in which connection states between cell units are switched according to movement of the mobile terminal.

Advantageous Effects of Invention

According to the present invention, it is possible to provide a battery pack which can be mounted in an electric appliance body and can switch output voltage and an electric appliance including the same. In addition, according to the present invention, it is possible to provide a battery pack that can easily switch output voltage and an electric appliance including the same. In addition, according to the present invention, it is possible to provide a battery pack in which, when an output voltage of the battery pack is set to a voltage different from a rated voltage of an electric appliance body, the battery pack can be prevented from being mounted in the electric appliance body, and an electric appliance including the same.

Figure 6:
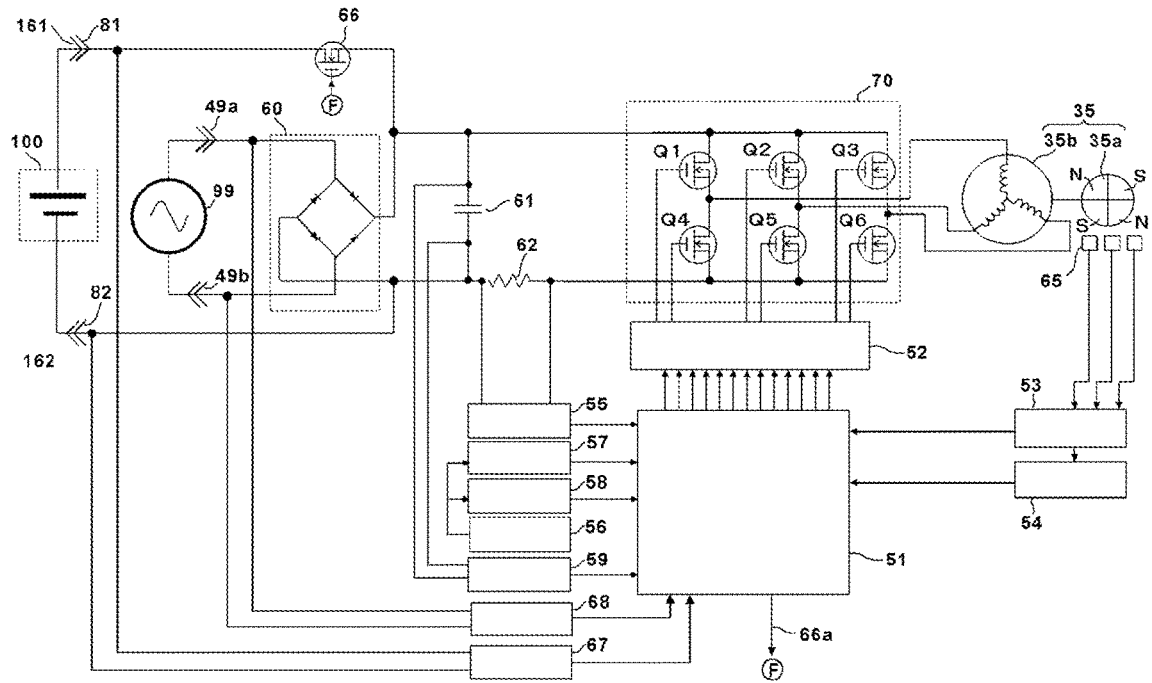
Figure 6:
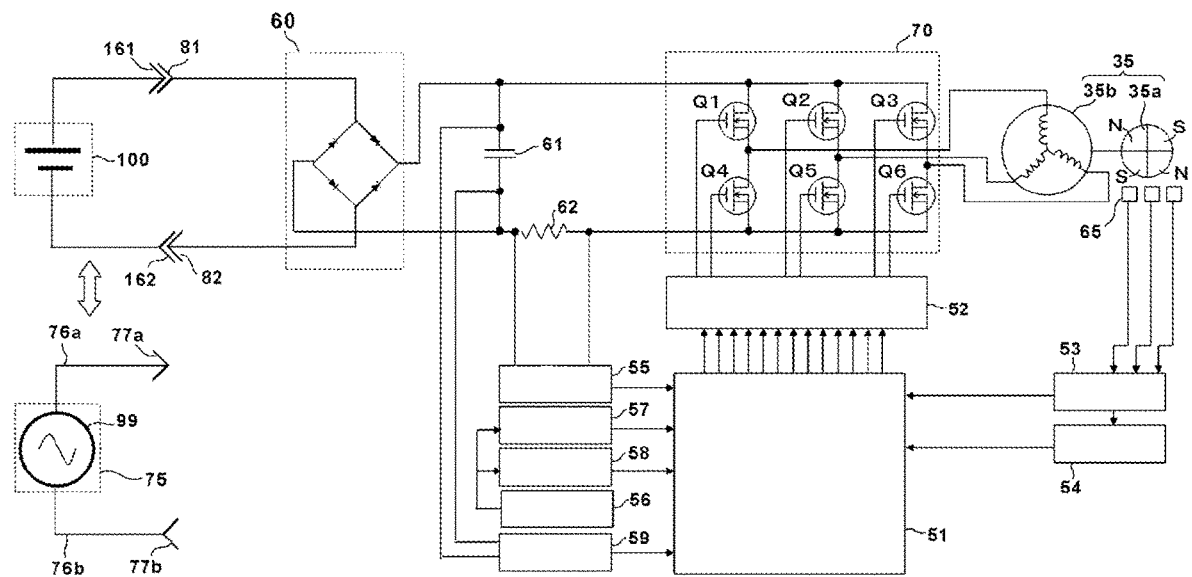

(1) of FIG. 6 is a circuit block diagram of a drive control system of the electric tool body 30B, and (2) of FIG. 6 is a circuit block diagram of a drive control system of the electric tool body 30C.

Figure 7:
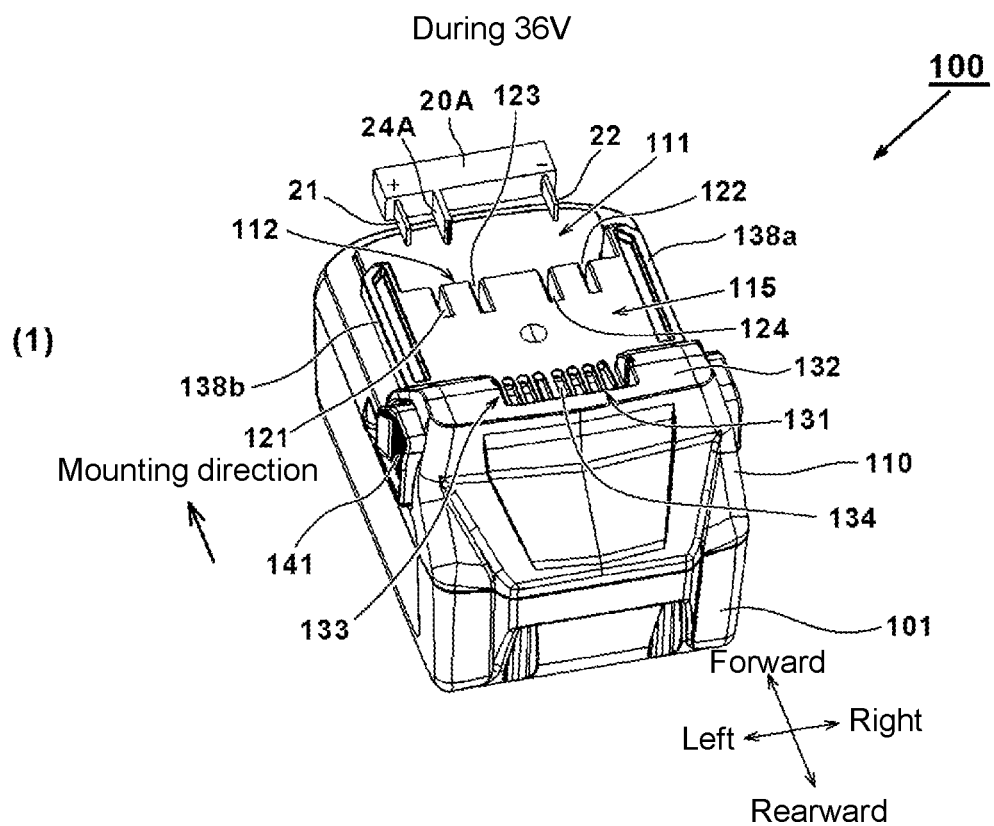
Figure 7:
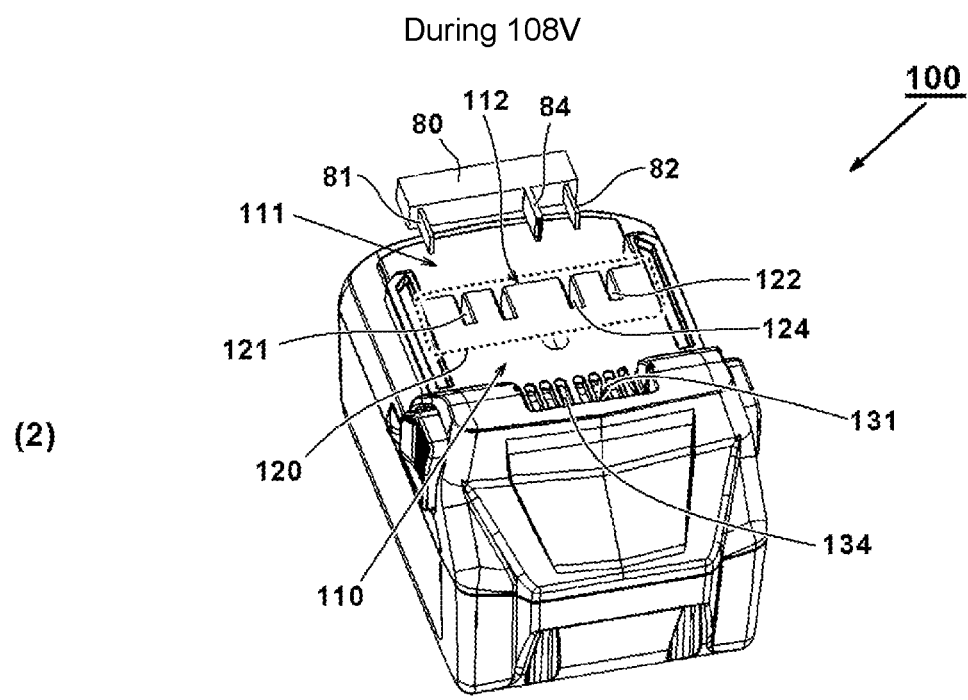

FIG. 7 shows perspective views of an external form of a battery pack 100 of a first example.

Figure 8:
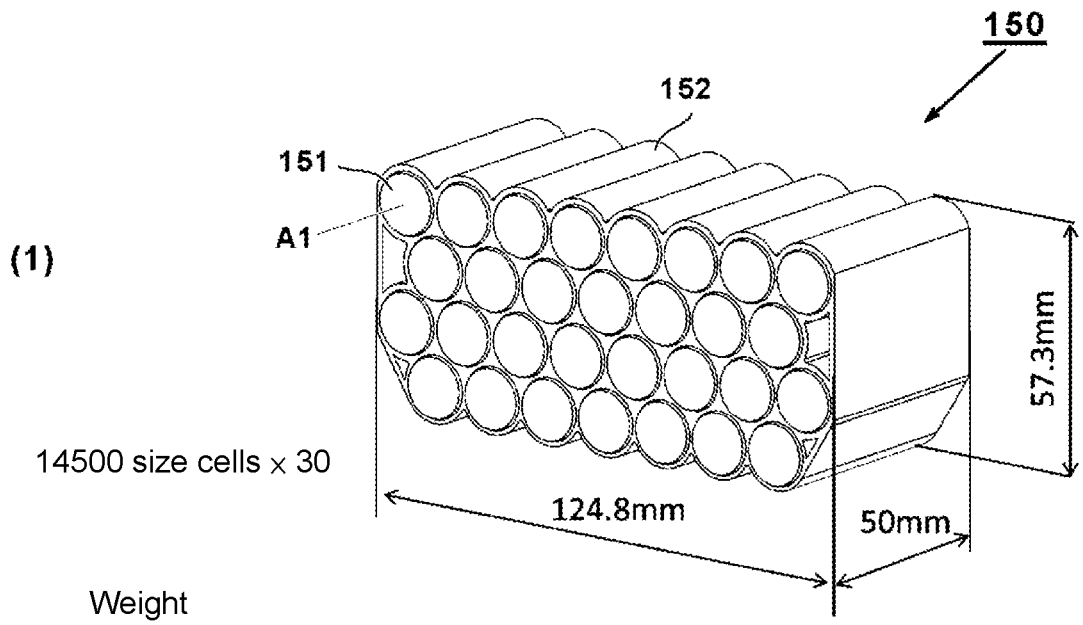
Figure 8:
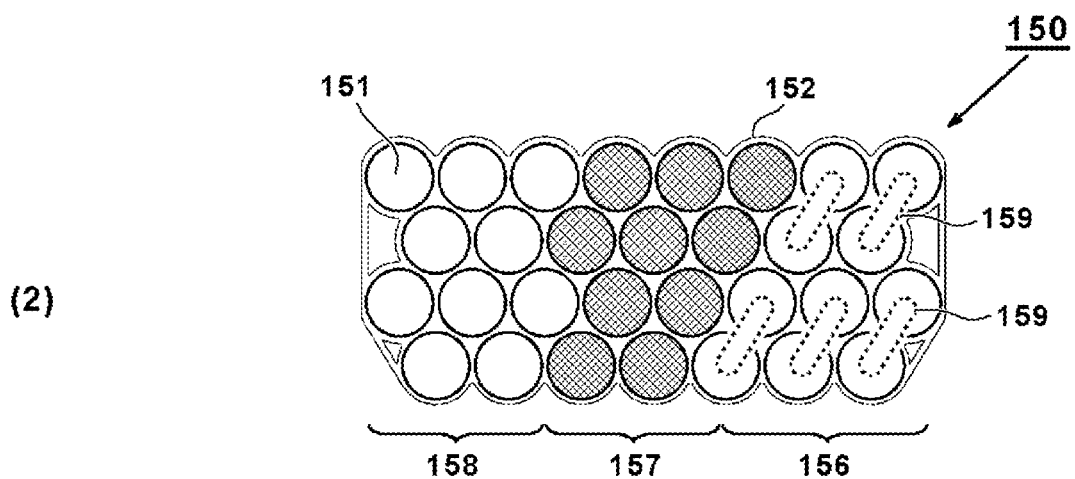

FIG. 8 shows diagrams of a cell pack 150 housed inside the battery pack 100, (1) of FIG. 8 is a perspective view, and (2) of FIG. 8 is a side view of the cell pack 150 when viewed in an axial direction of a cell 151.

Figure 9:
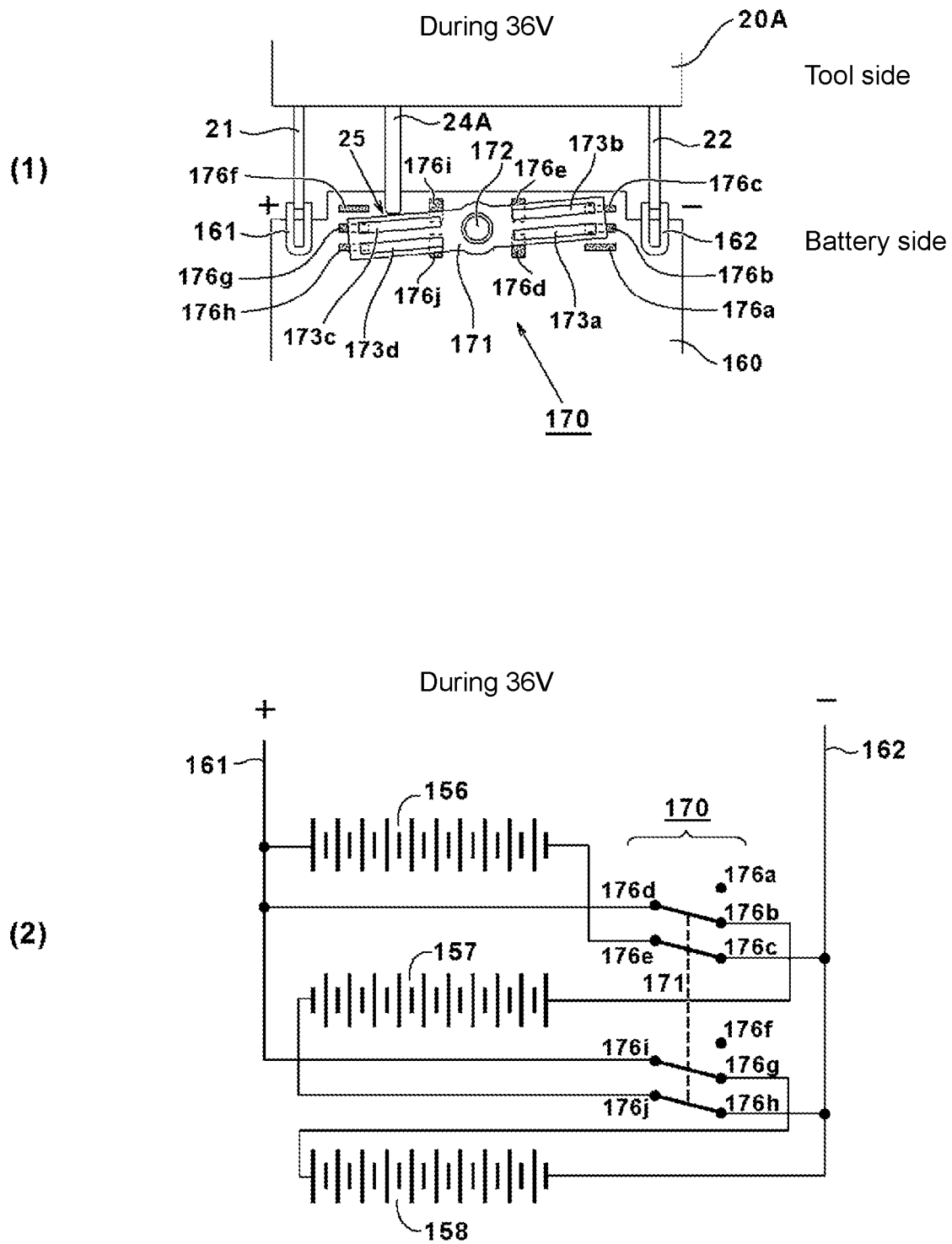

(1) of FIG. 9 is a diagram showing a state in the vicinity of a terminal part 20A when the battery pack 100 is mounted in an electric tool body at a rated voltage of 36 V, and (2) of FIG. 9 is a connection circuit diagram thereof.

Figure 10:
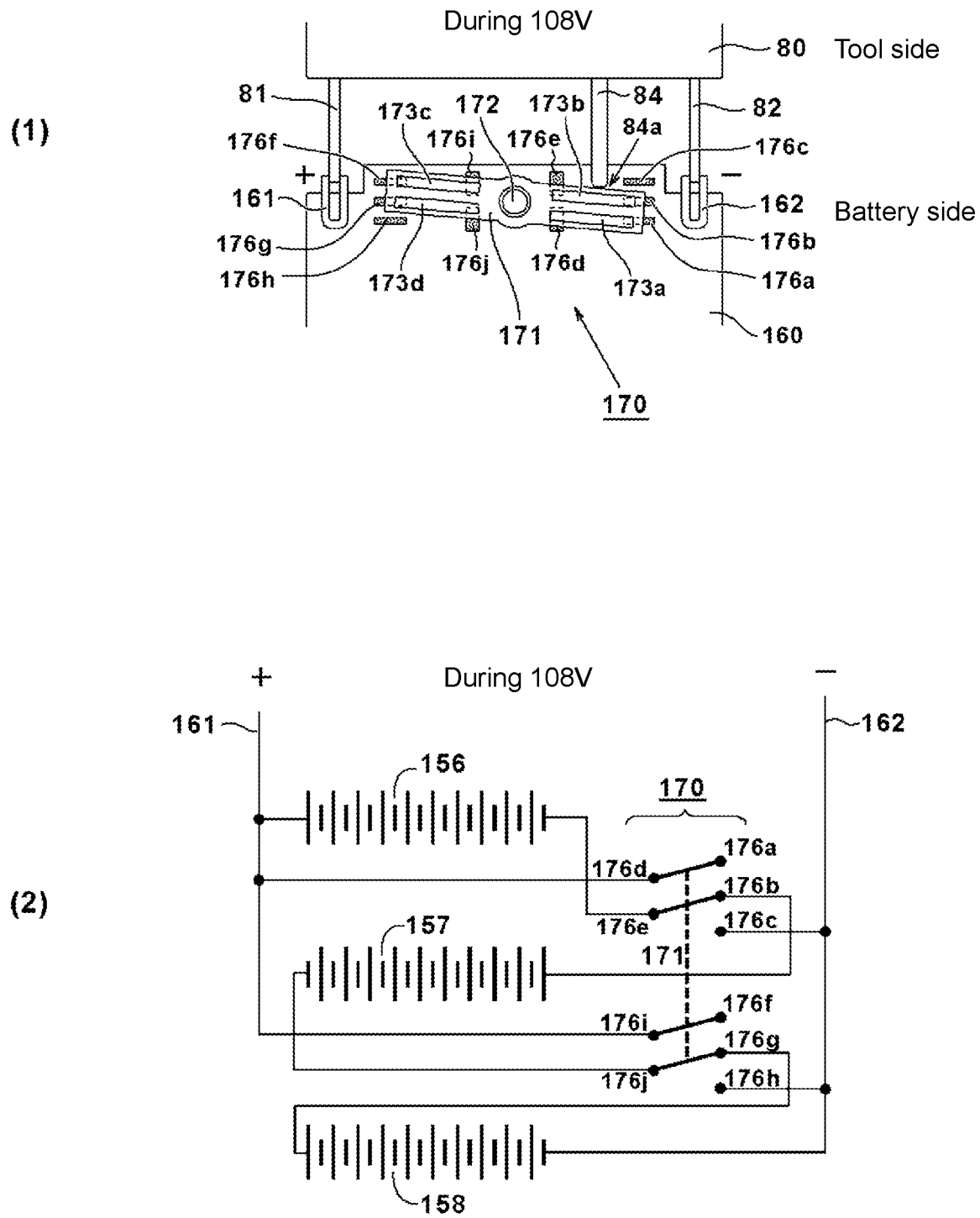

(1) of FIG. 10 is a diagram showing a state in the vicinity of a terminal part 80 when the battery pack 100 is mounted in an electric tool body at a rated voltage of 108 V, and (2) of FIG. 10 is a connection circuit diagram thereof.

Figure 11:
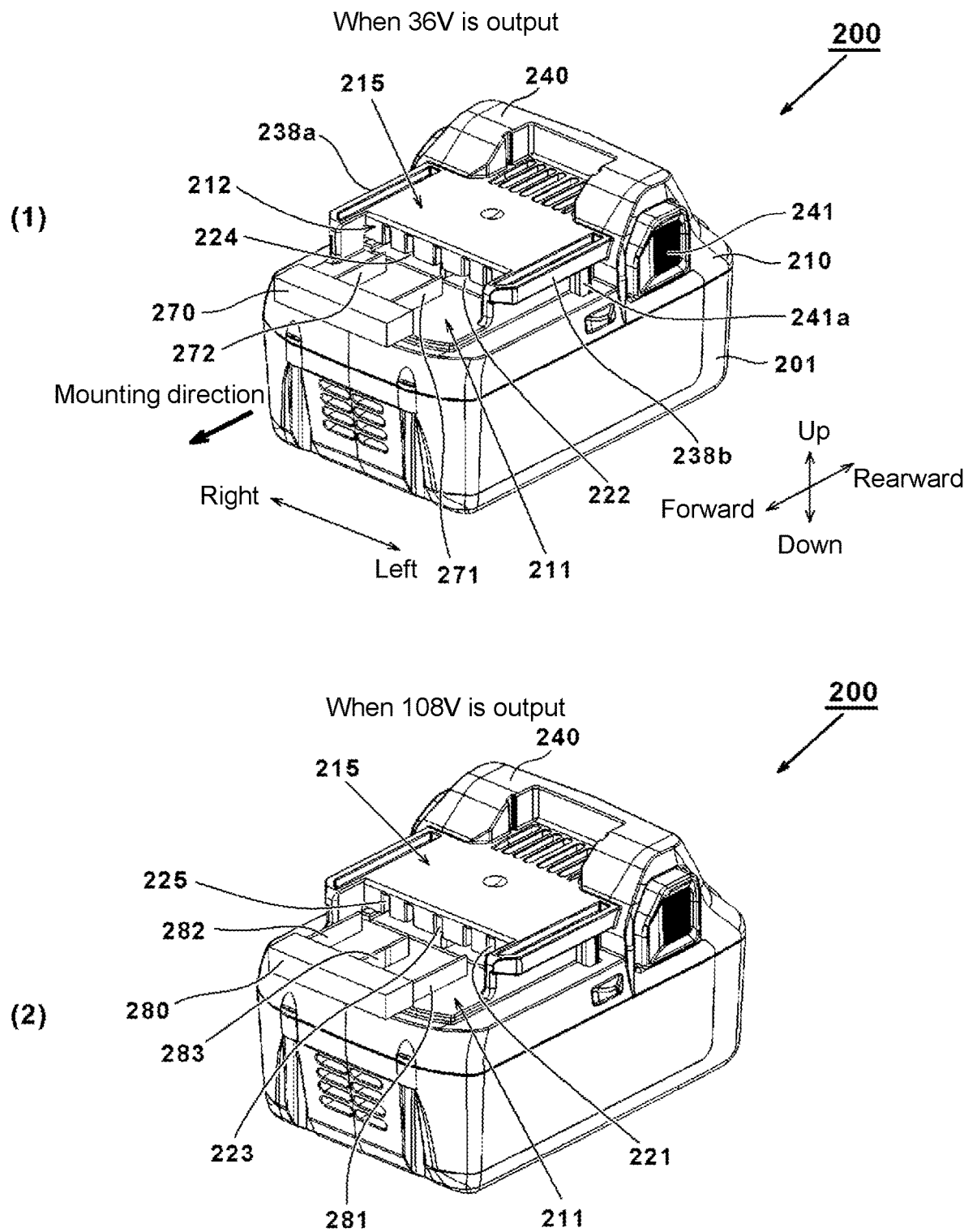

FIG. 11 shows perspective views of the shapes of a battery pack 200 according to a second example and a terminal part connected thereto, (1) of FIG. 11 shows a state when connected to an electric appliance at a rated voltage of 36 V, and (2) of FIG. 11 shows a state when connected to an electric appliance at a rated voltage of 108 V.

Figure 12:
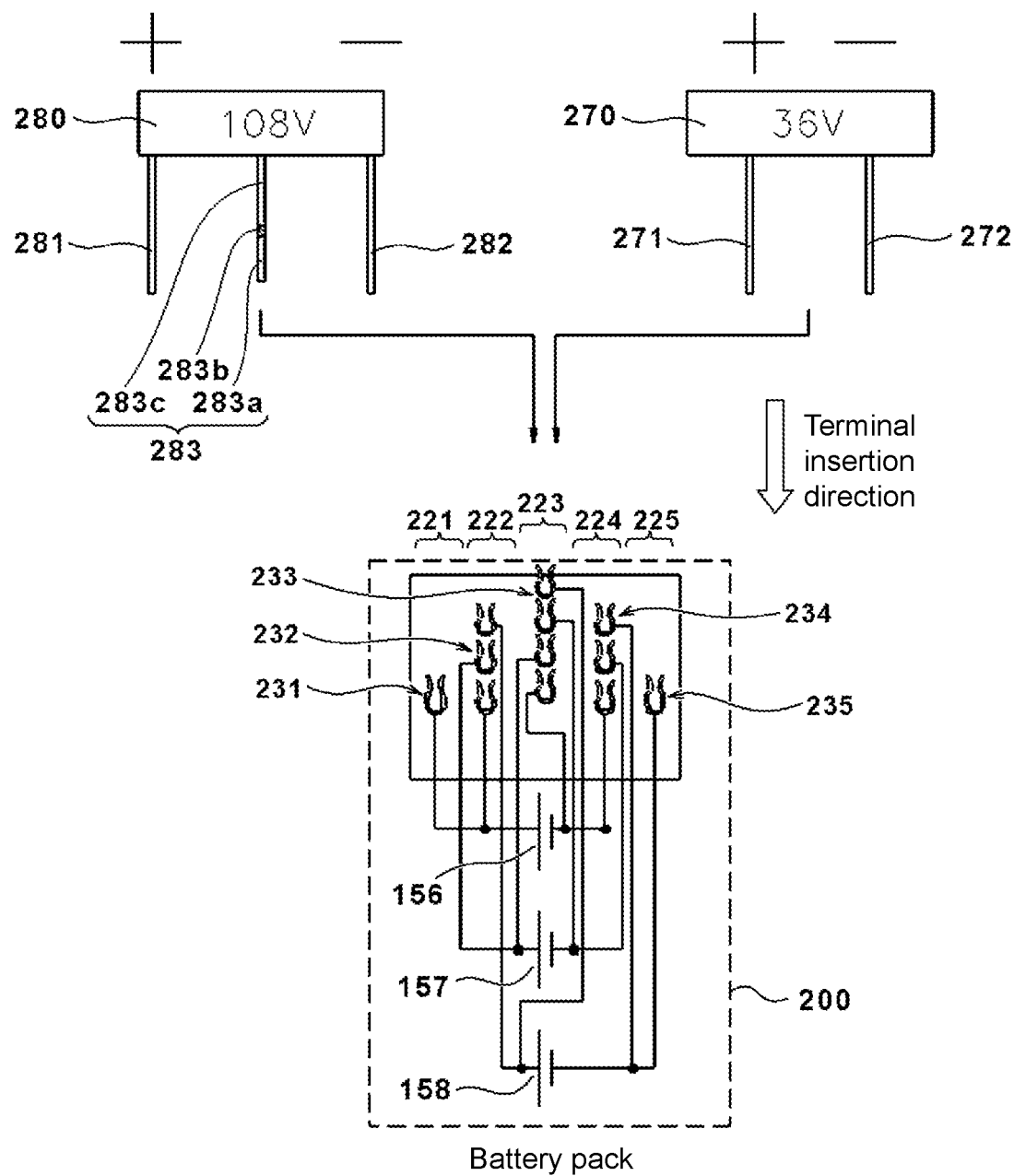

FIG. 12 is a connection circuit diagram of the battery pack 200 in FIG. 11.

Figure 13:
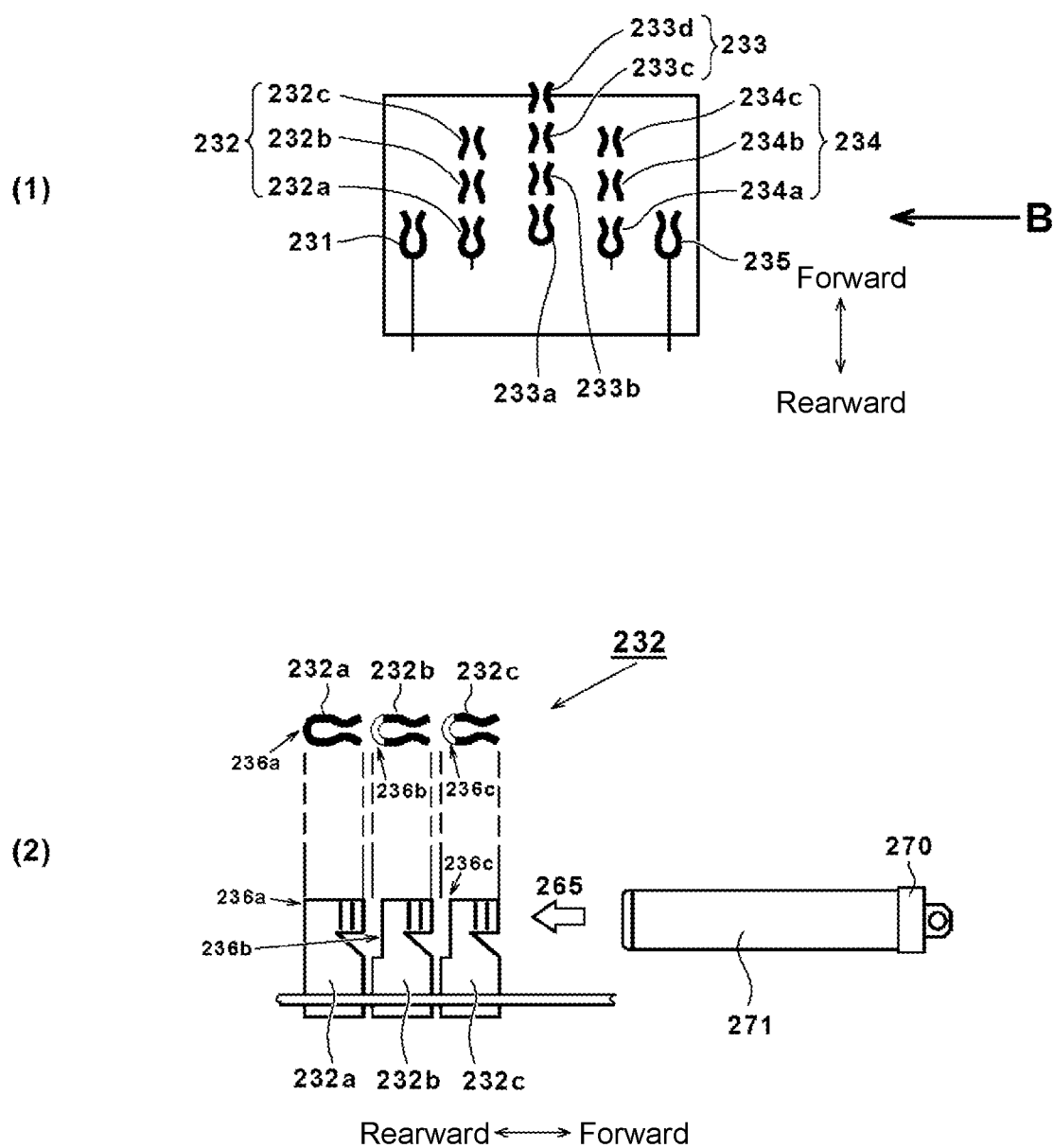

FIG. 13 shows diagrams of the shapes of terminals 231 to 235 in FIG. 12, (1) of FIG. 13 is a top view, and (2) of FIG. 13 is a side view of the terminal group 232 (a diagram in a direction of an arrow B in (1) of FIG. 13).

Figure 14:
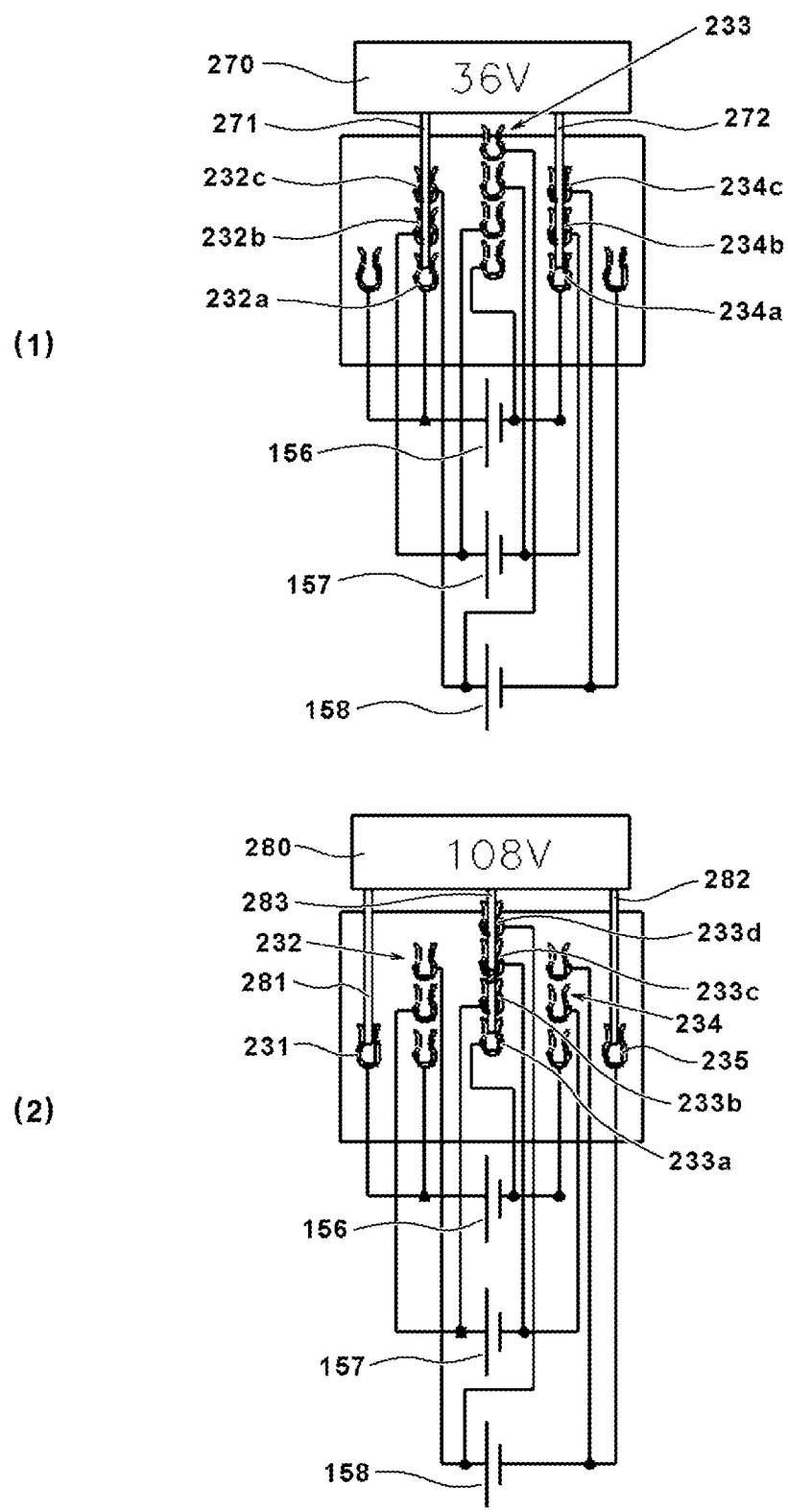

FIG. 14 shows diagrams of states when the battery pack 200 is mounted in terminal parts 270 and 280, (1) of FIG. 14 shows a state when 36 V is output, and (2) of FIG. 14 shows a state when 108 V is output.

Figure 15:
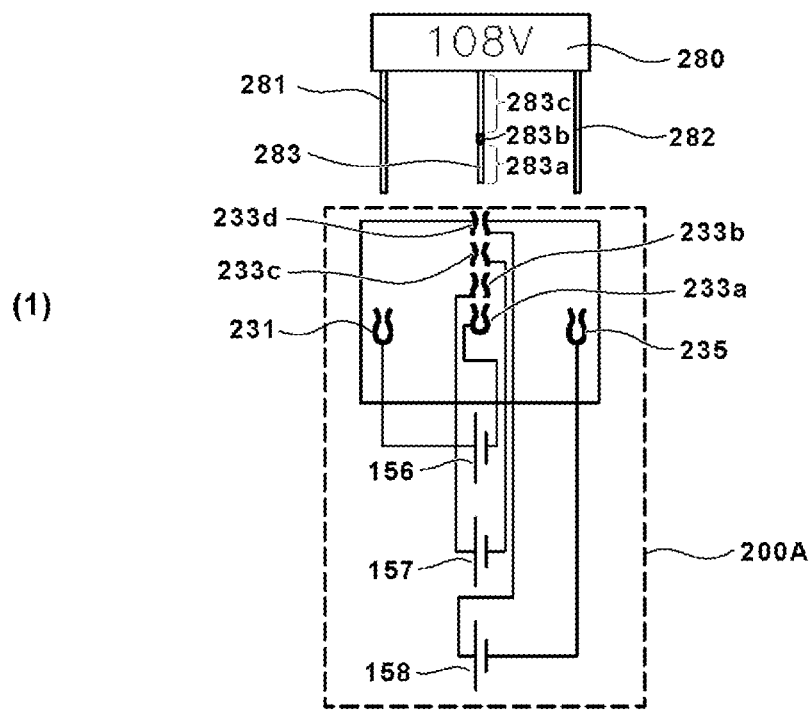
Figure 15:
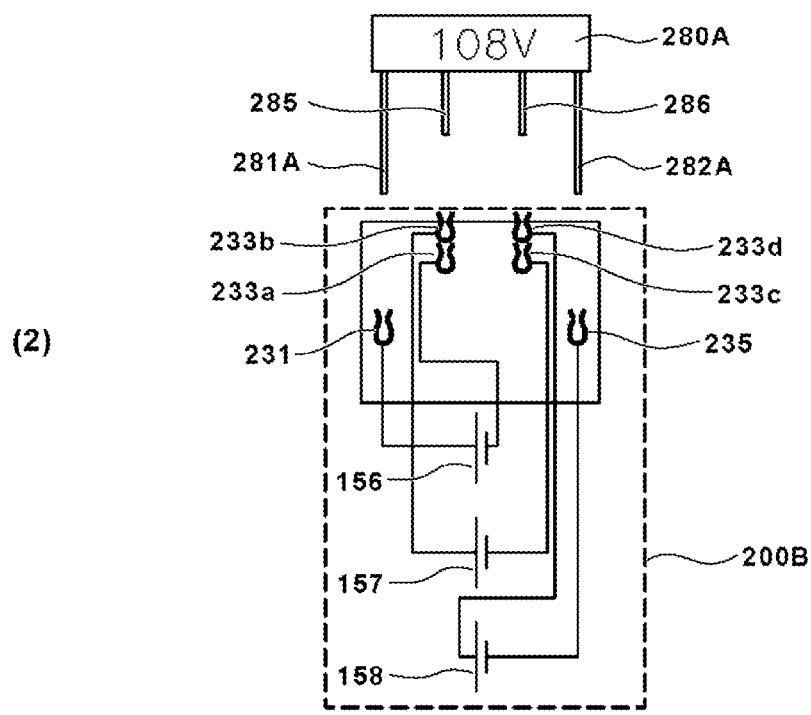

FIG. 15 shows diagrams for explaining a circuit diagram of the 108 V dedicated battery packs 200A and 200B according to a modified example of the second example, (1) of FIG. 15 shows a case in which the same terminal part 280 as in FIG. 11 and FIG. 12 is used, and (2) of FIG. 15 shows a case in which a terminal part 280A of a modified example is used.

Figure 16:
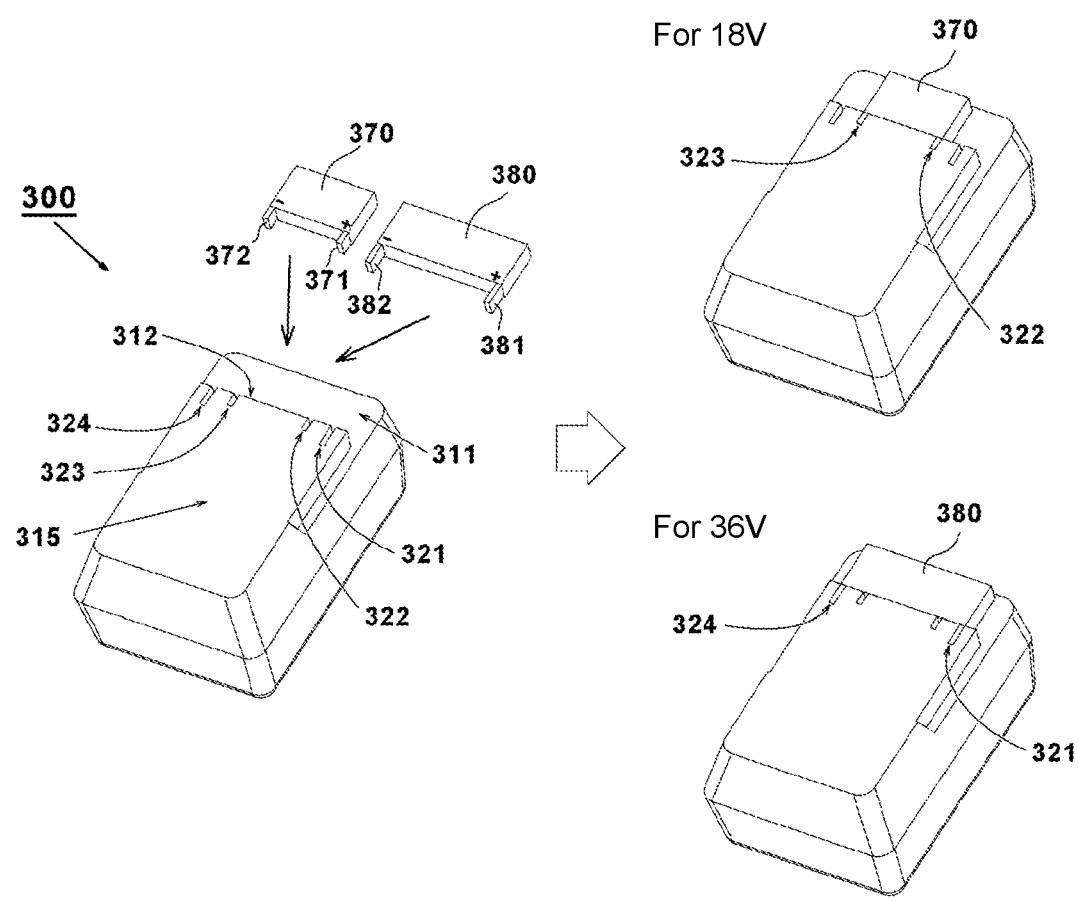

FIG. 16 is a schematic perspective view showing the shapes of a battery pack 300 according to a third example of the present invention and terminal parts 370 and 380 mounted therein.

Figure 17:
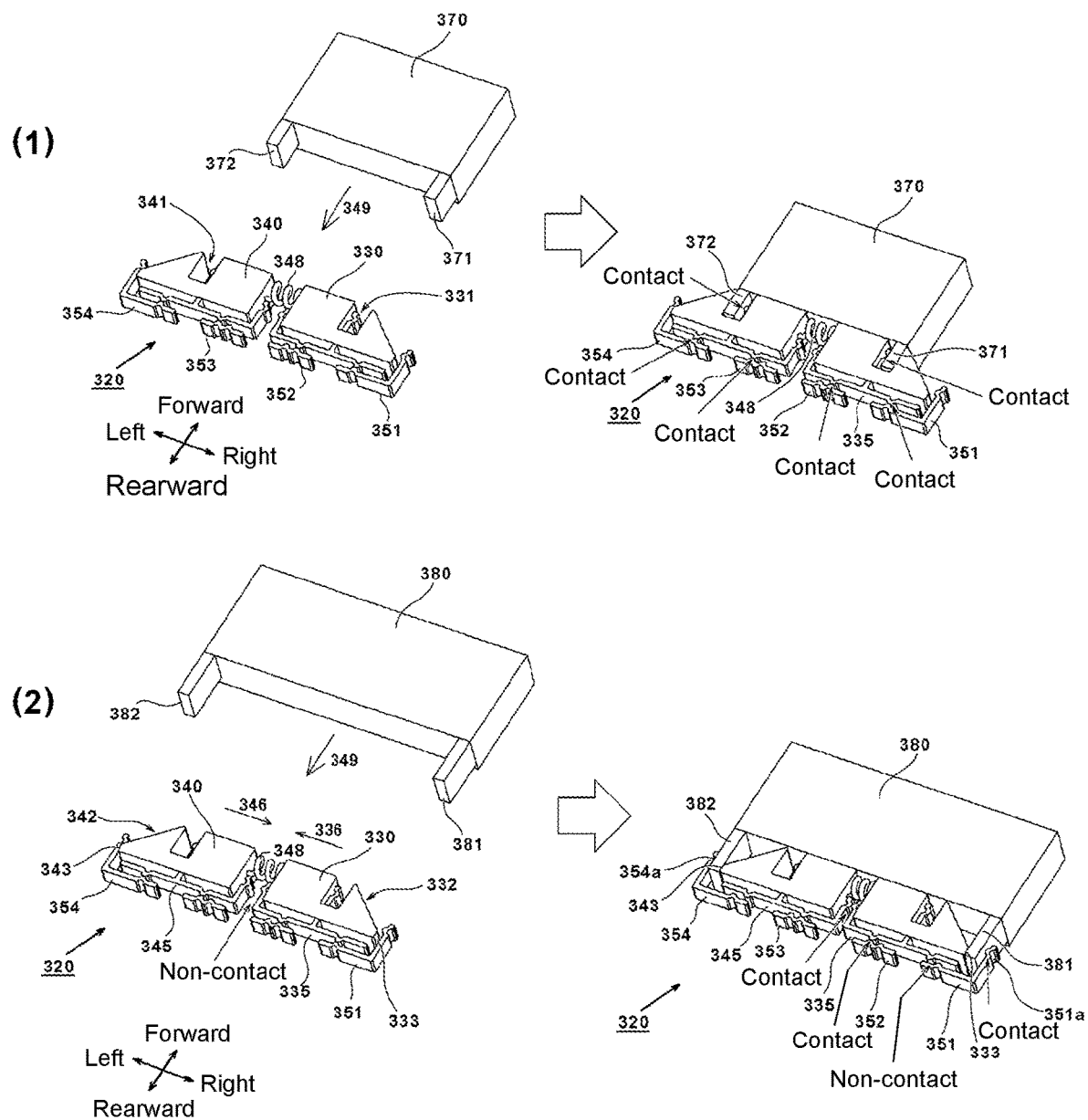

FIG. 17 shows diagrams of constituent parts of a voltage switching mechanism 320 disposed near the positions of slots 321 to 324 inside the battery pack 300 in FIG. 16, and particularly, on the rear side of a step part 312.

Figure 18:
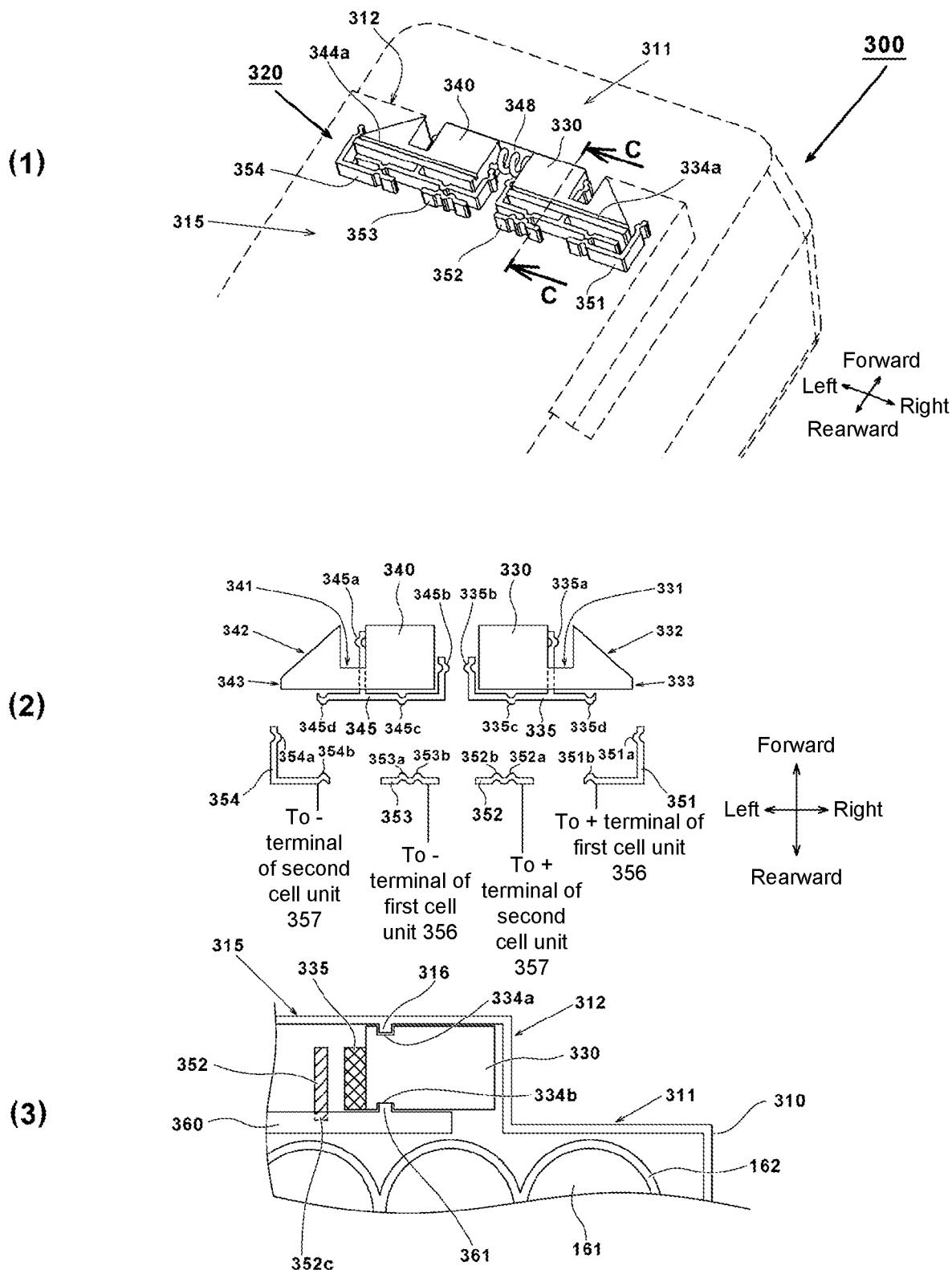

FIG. 18 shows diagrams for explaining the voltage switching mechanism 320 using movable guide members 330 and 340 and terminals 351 to 354, (1) of FIG. 18 is a diagram showing a housing position of the voltage switching mechanism 320 in the battery pack 300, (2) of FIG. 18 is a development view of the voltage switching mechanism 320 when viewed from the top, and (3) of FIG. 18 is a cross-sectional view taken along the line C-C in (1) of FIG. 18.

Figure 19:
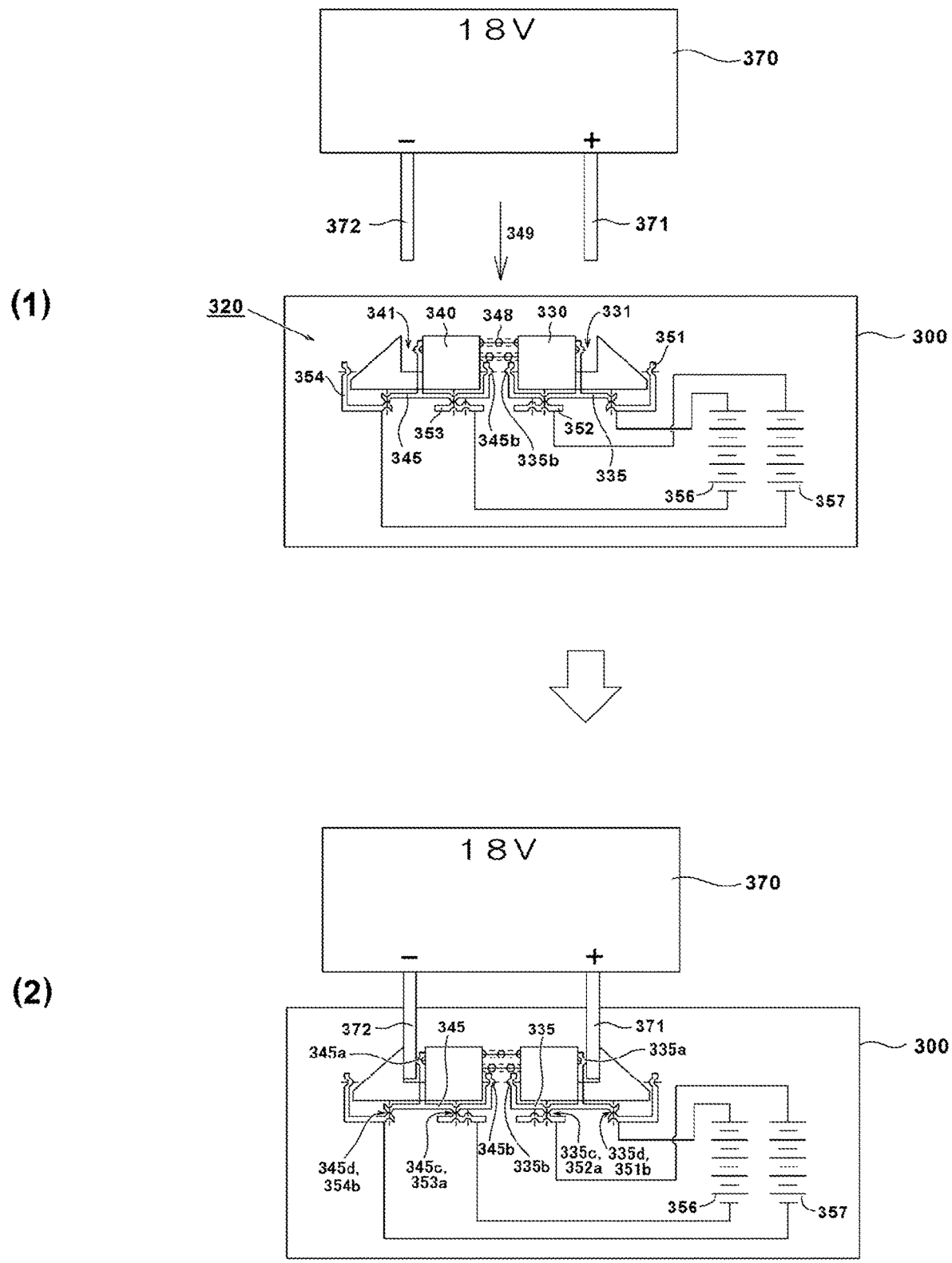

FIG. 19 shows diagrams explaining a connection state of a cell pack according to the voltage switching mechanism 320 when connected to an electric appliance at a rated voltage of 18 V, (1) of FIG. 19 is a diagram showing a state before the terminal part 370 is mounted in the battery pack 300, and (2) of FIG. 19 is a diagram showing a state after mounting.

Figure 20:
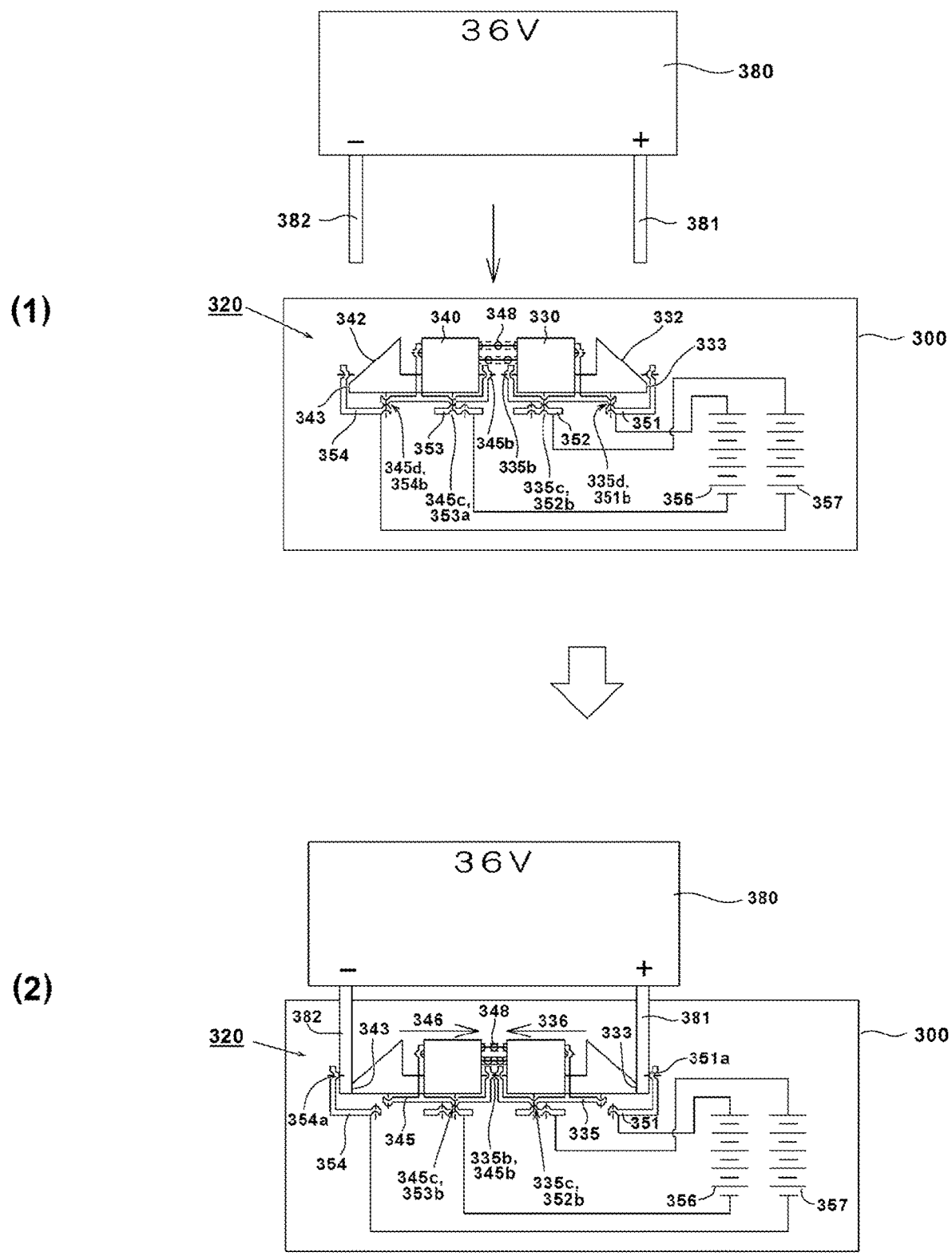

FIG. 20 shows diagrams explaining a connection state of a cell pack according to the voltage switching mechanism 320 when connected to an electric appliance at a rated voltage of 36 V, (1) of FIG. 20 shows a state before the terminal part 380 is mounted in the battery pack 300, and (2) of FIG. 20 is a diagram showing a state after mounting.

Figure 21:
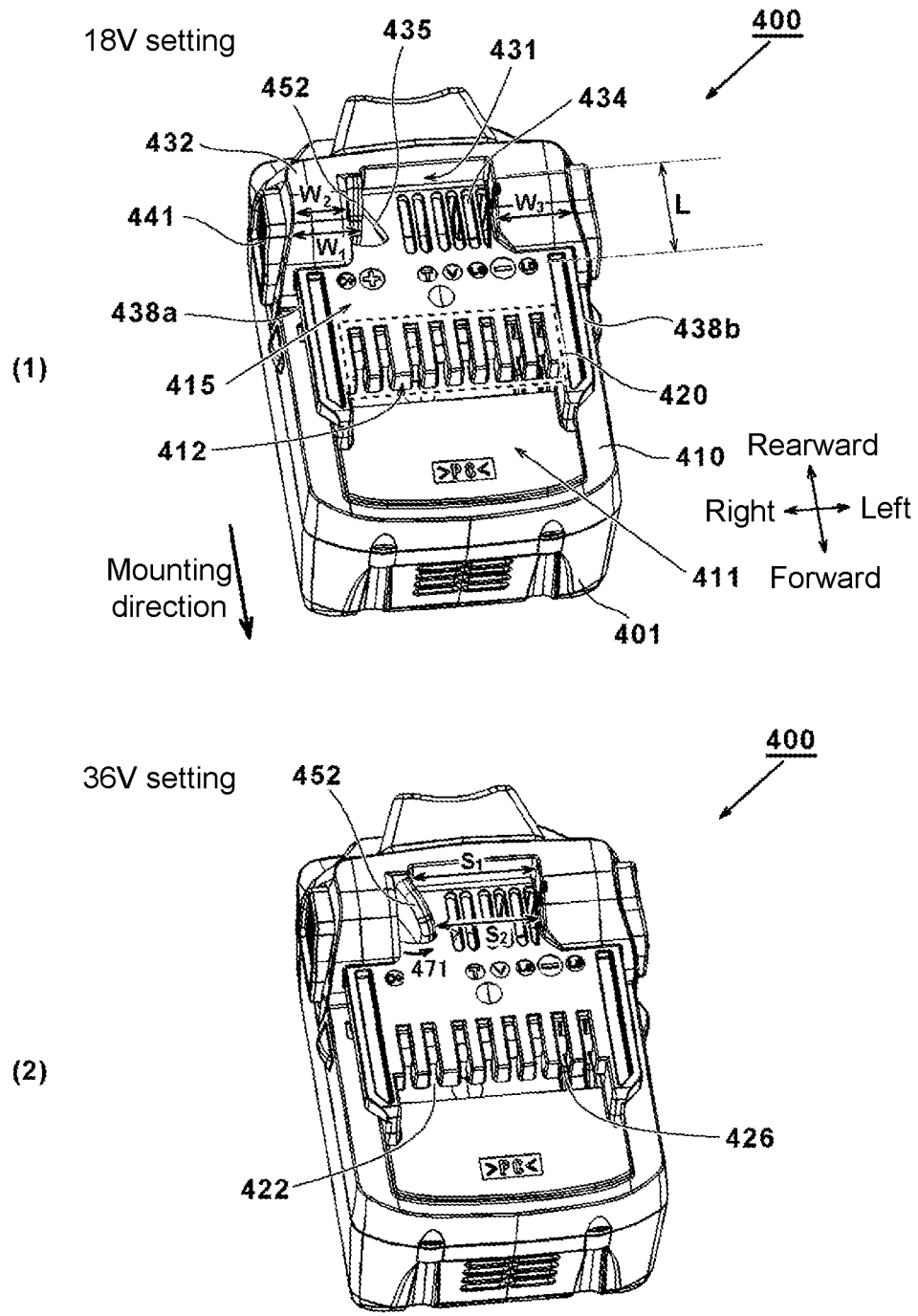

FIG. 21 shows a perspective view of a battery pack 400 according to a fourth example, (1) of FIG. 21 is a diagram showing a state when 18 V is output, and (2) of FIG. 21 is a diagram showing a state when 36 V is output.

Figure 22:
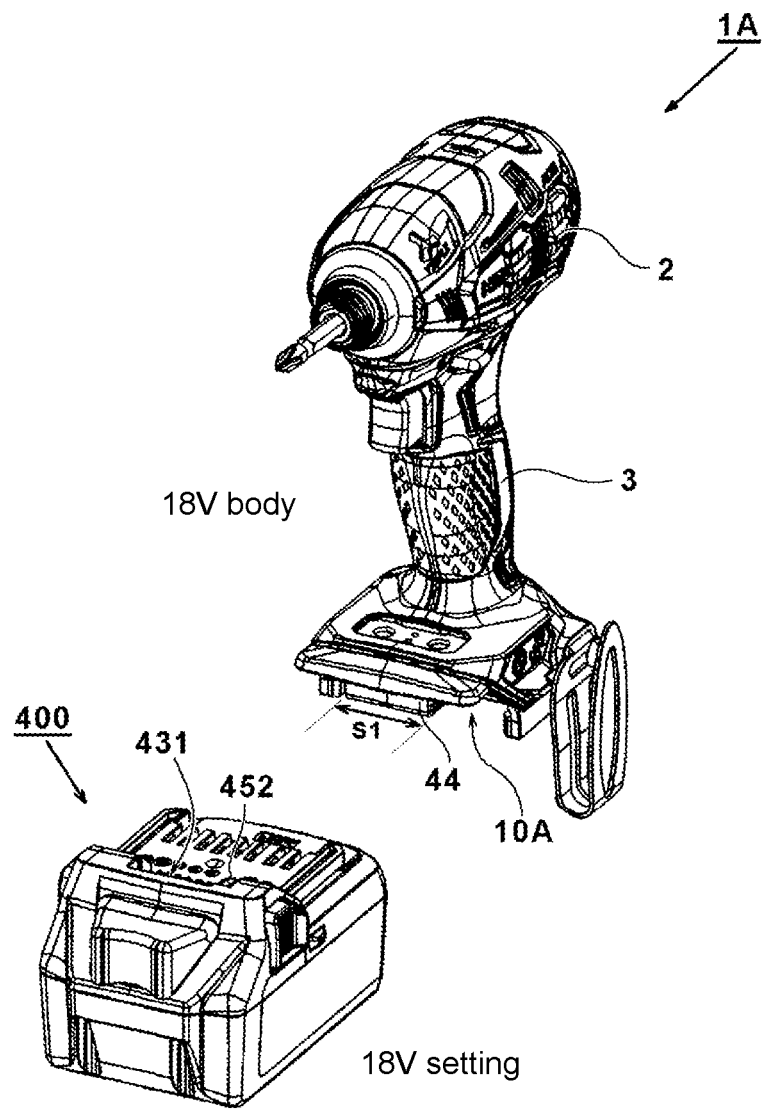

FIG. 22 is a perspective view showing the shape of an electric tool body 1A which is an example of an electric appliance at a rated voltage of 18 V.

Figure 23:
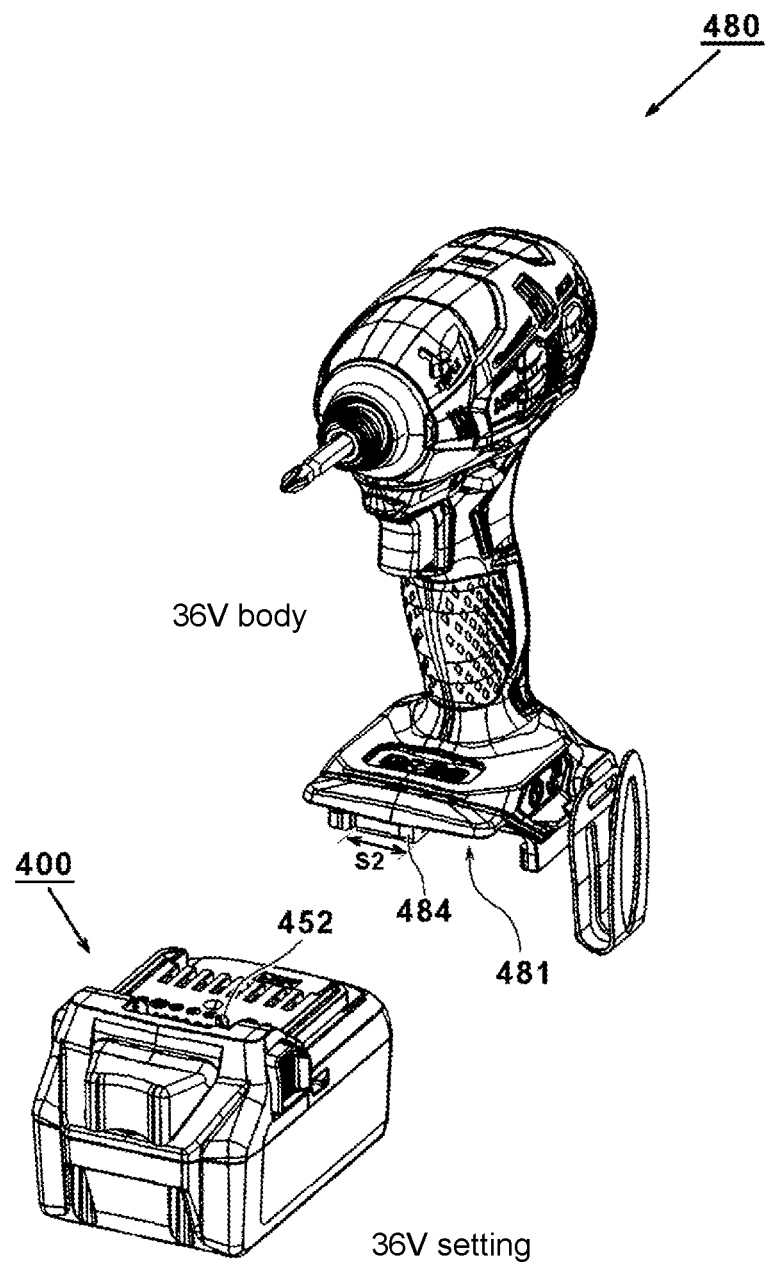

FIG. 23 is a perspective view showing the shape of an electric tool body 480 which is an example of an electric appliance at a rated voltage of 36 V.

Figure 24:
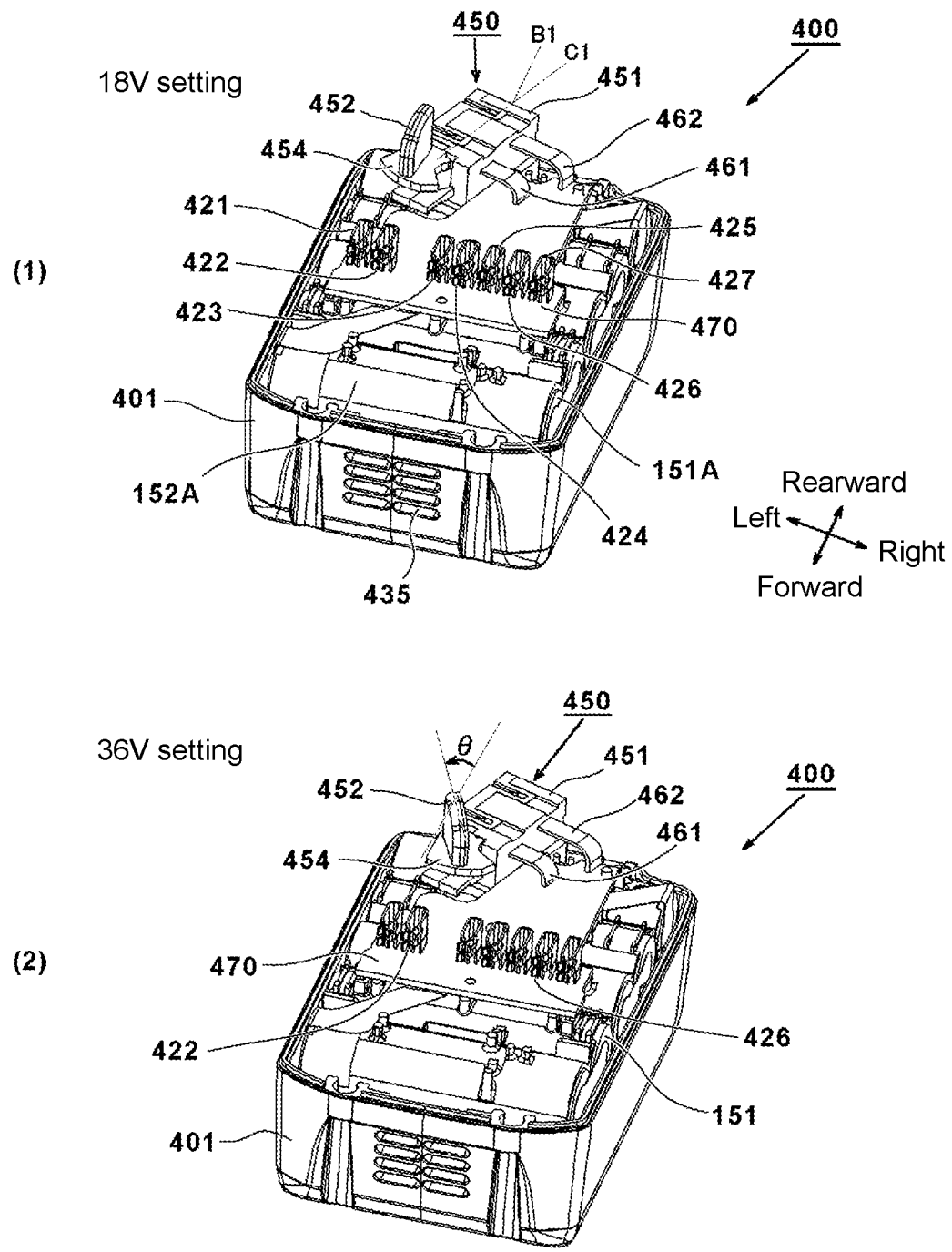

FIG. 24 shows perspective views of a state in which an upper case 410 (refer to FIG. 21) of the battery pack 400 is removed, (1) of FIG. 24 shows a case in which an operation lever 452 is at a first position, and (2) of FIG. 24 shows a case in which the operation lever 452 is at a second position.

Figure 25:
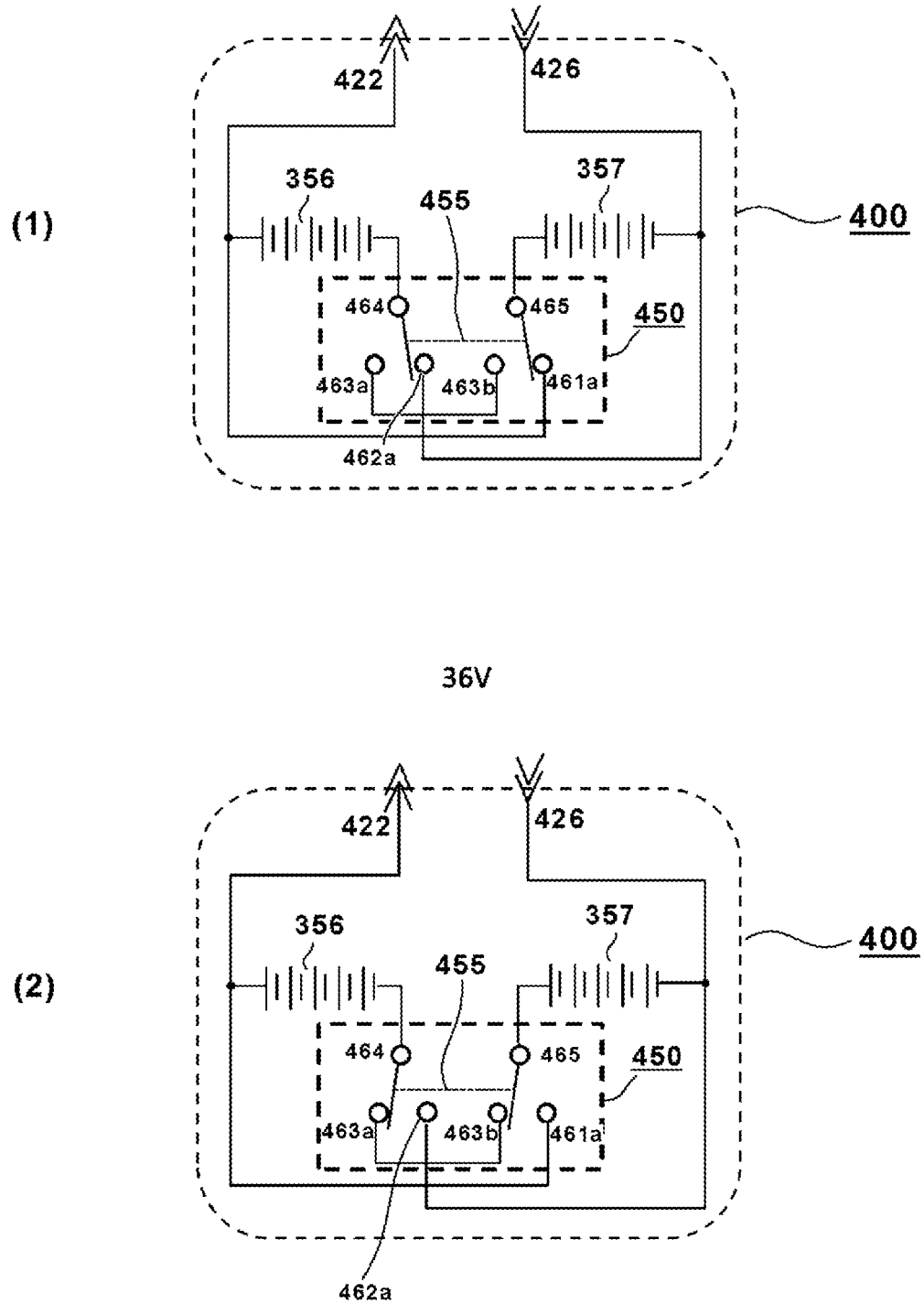

FIG. 25 shows circuit diagrams of the battery pack 400 according to the fourth example, (1) of FIG. 25 shows a connection state when 18 V is output, and (2) of FIG. 25 shows a connection state when 36 V is output.

Figure 26:
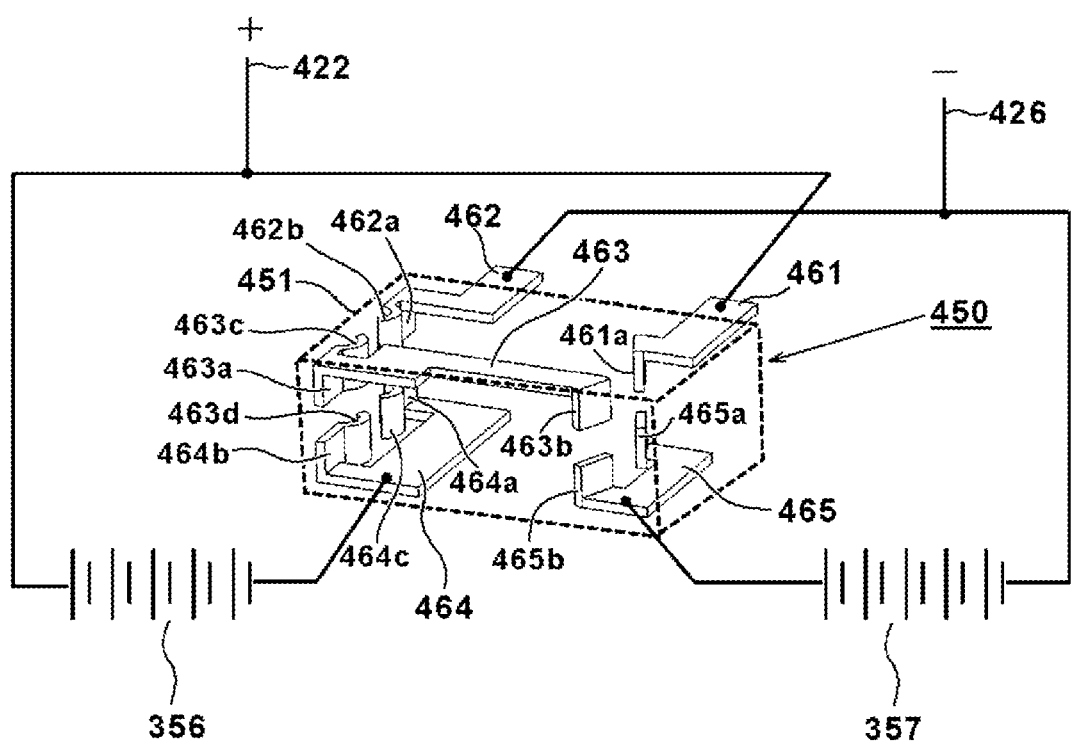

FIG. 26 is a diagram showing the shapes of contact terminals 461 to 465 of a switch mechanism 450.

Figure 27:
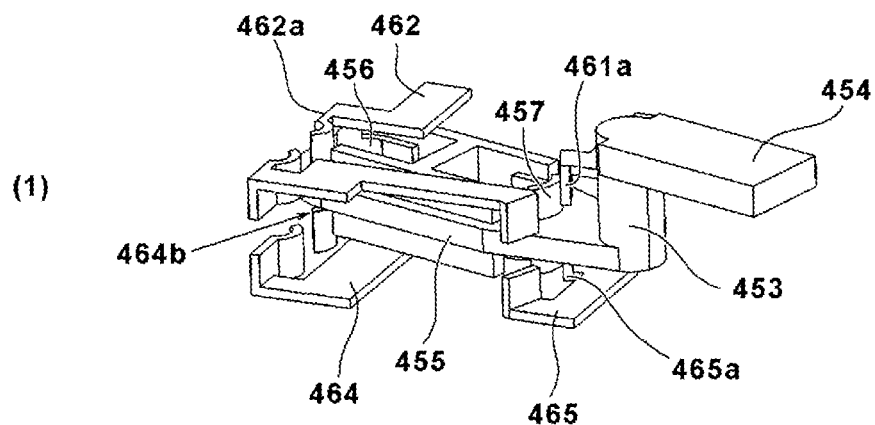
Figure 27:
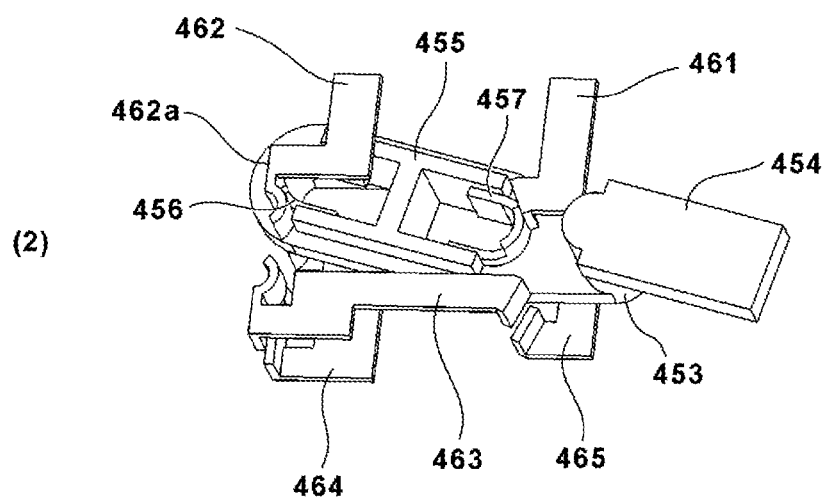

FIG. 27 shows perspective views showing an internal structure of a switch case 451.

Figure 28:
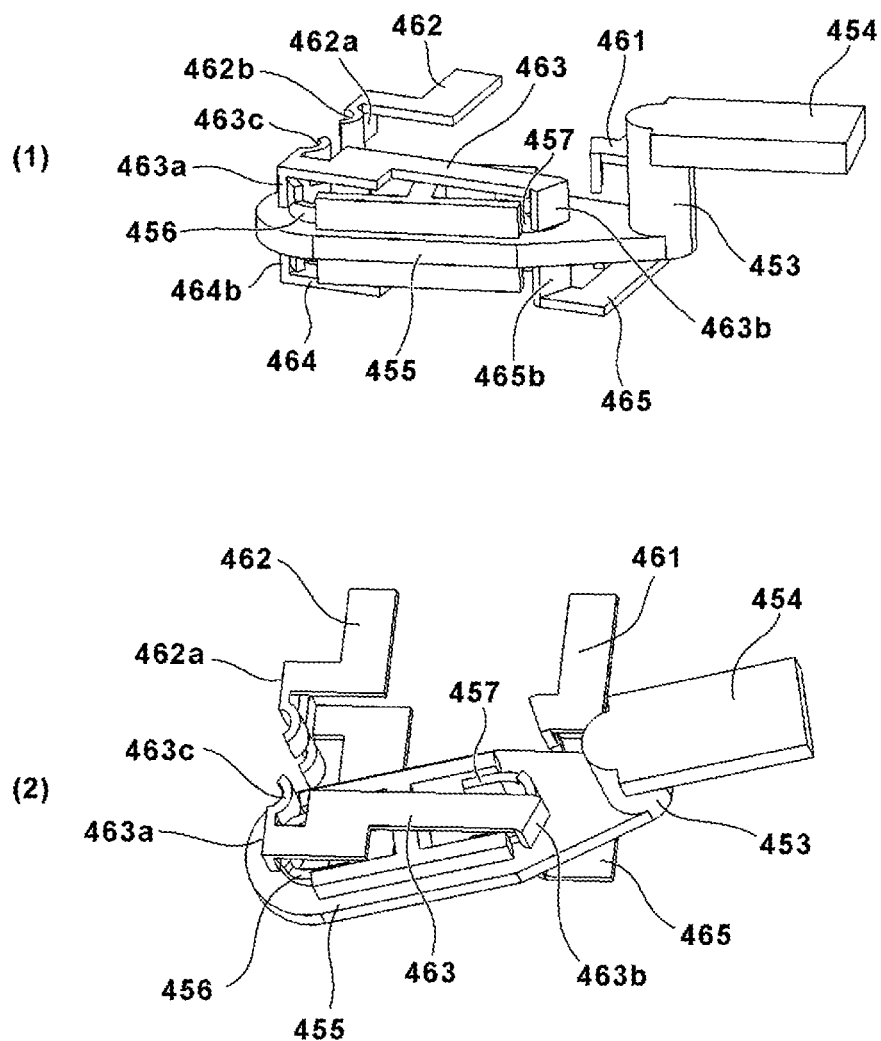

FIG. 28 shows perspective views of an internal structure of the switch case 451 when a switching element 455 is moved in a state in FIG. 27 and the output is 36 V.

Figure 29:
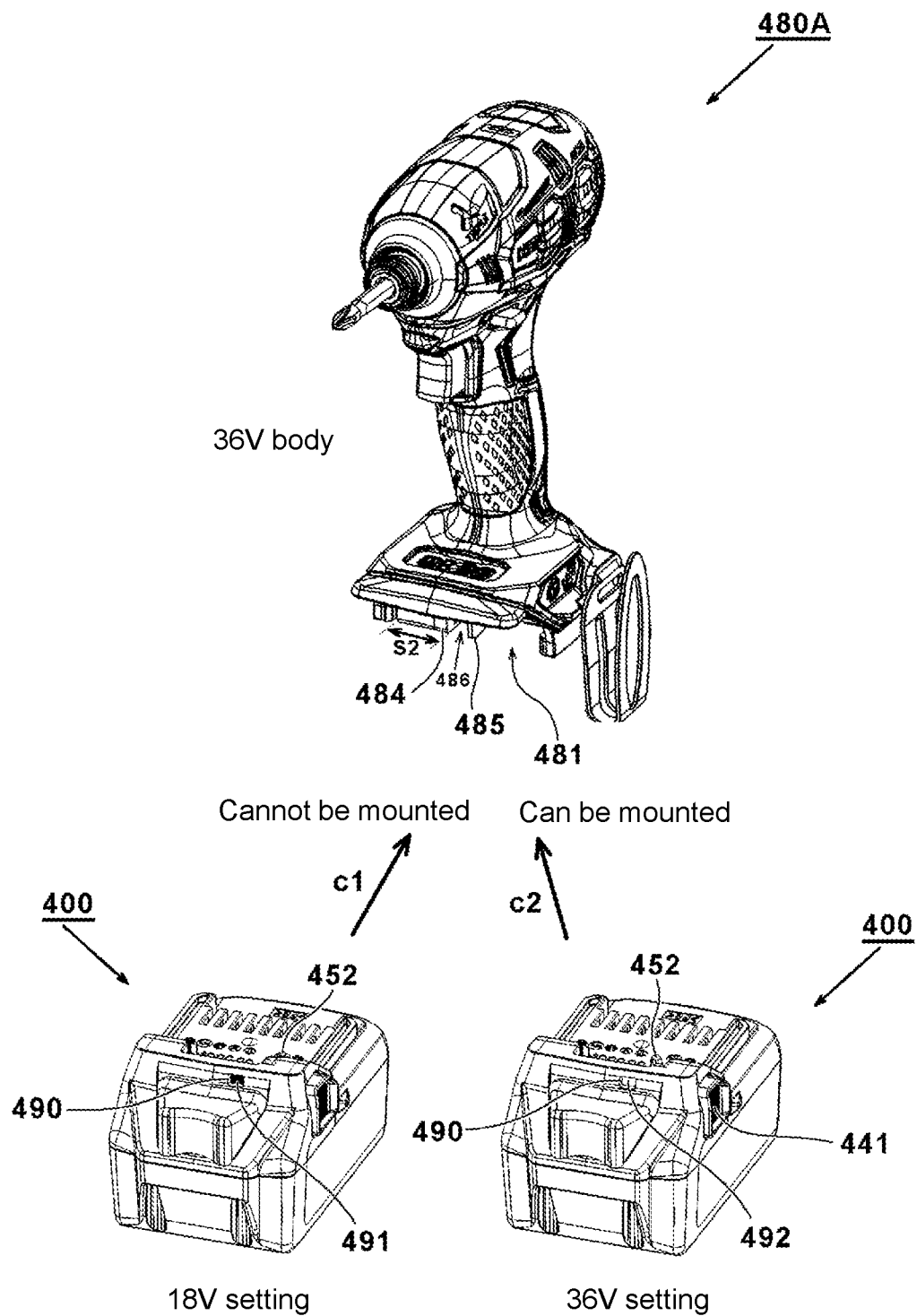

FIG. 29 shows a modified example of the fourth example and is a diagram showing an electric tool body 480A in which the battery pack 400 set to a low voltage cannot be mounted in an electric appliance body for a high voltage.

Figure 30:
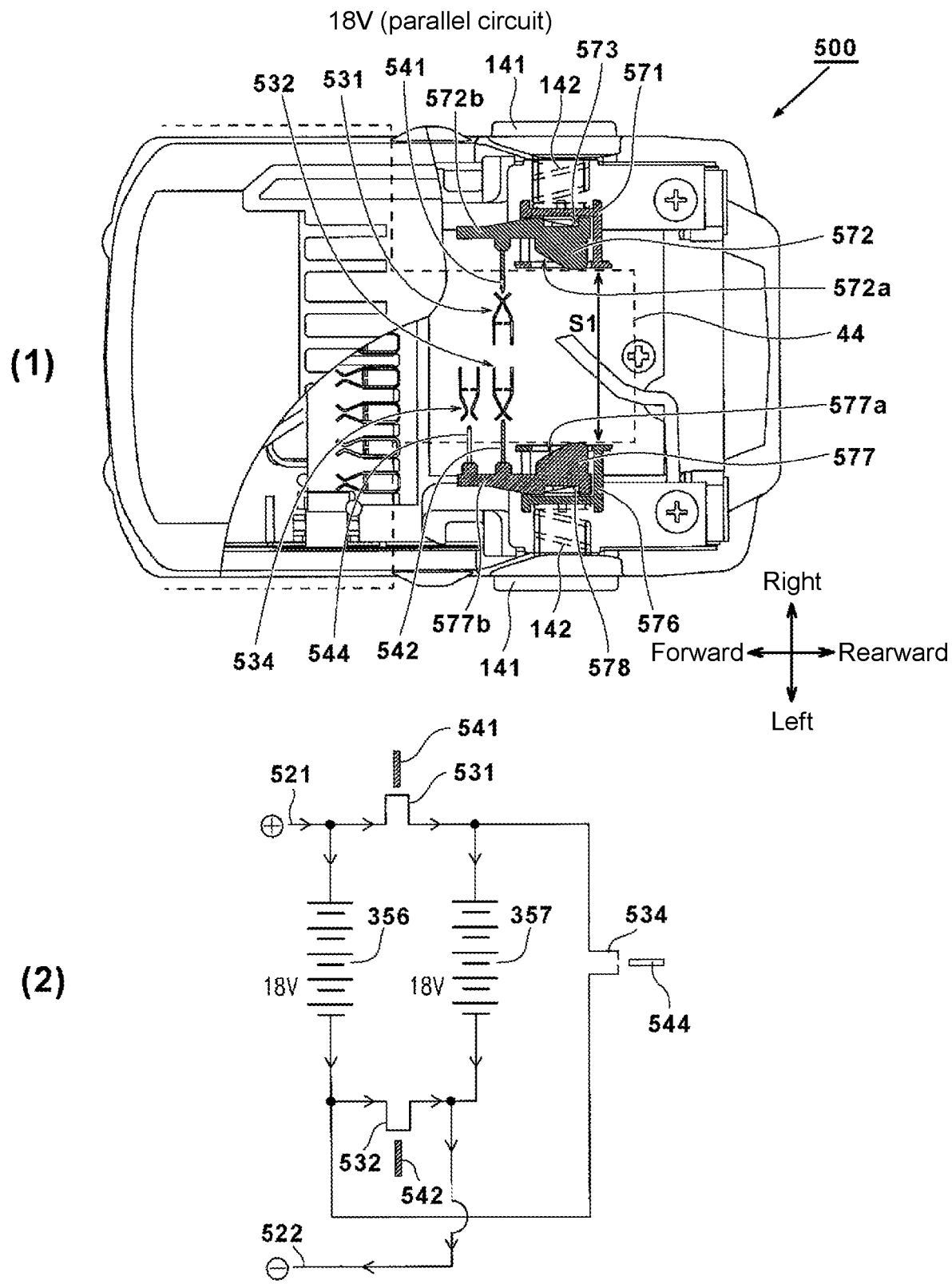

FIG. 30 shows diagrams of a state in which a battery pack 500 according to a fifth example of the present invention outputs 18 V.

Figure 31:
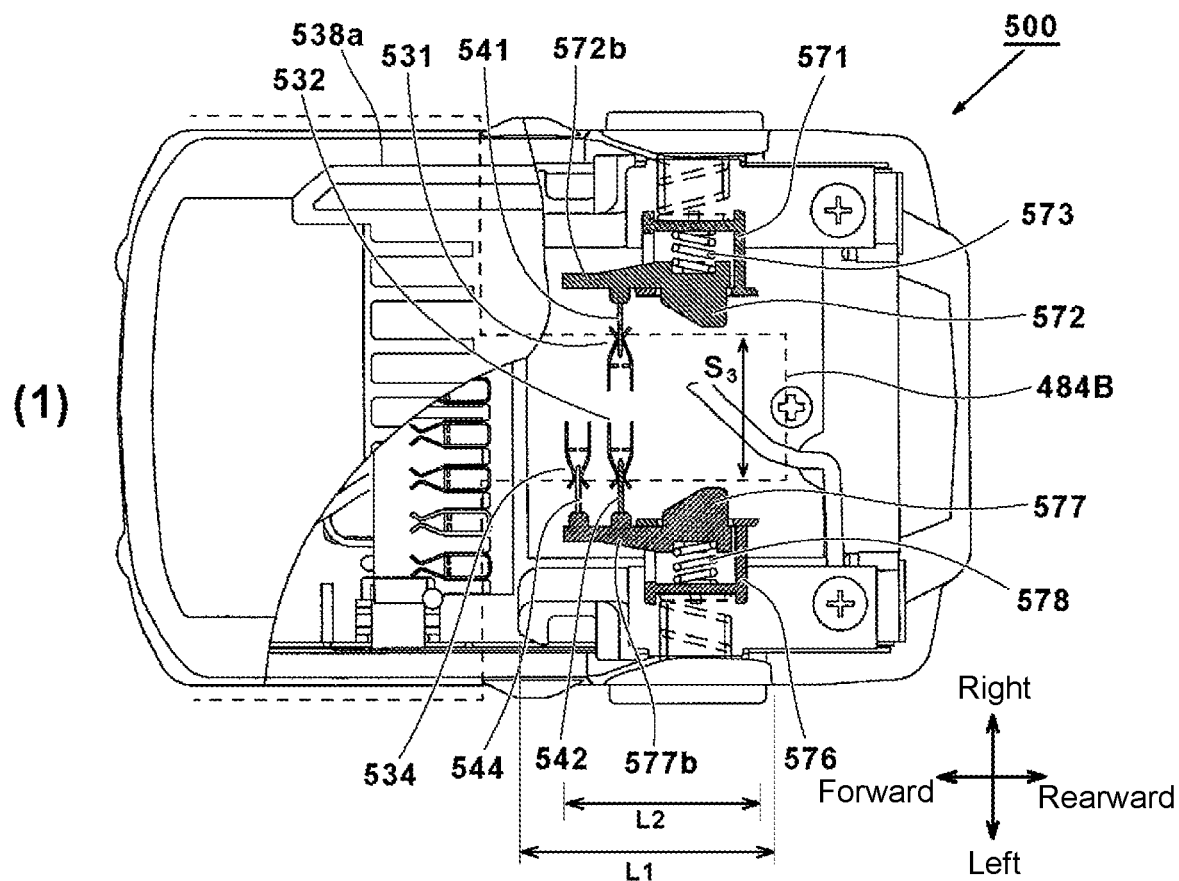
Figure 31:
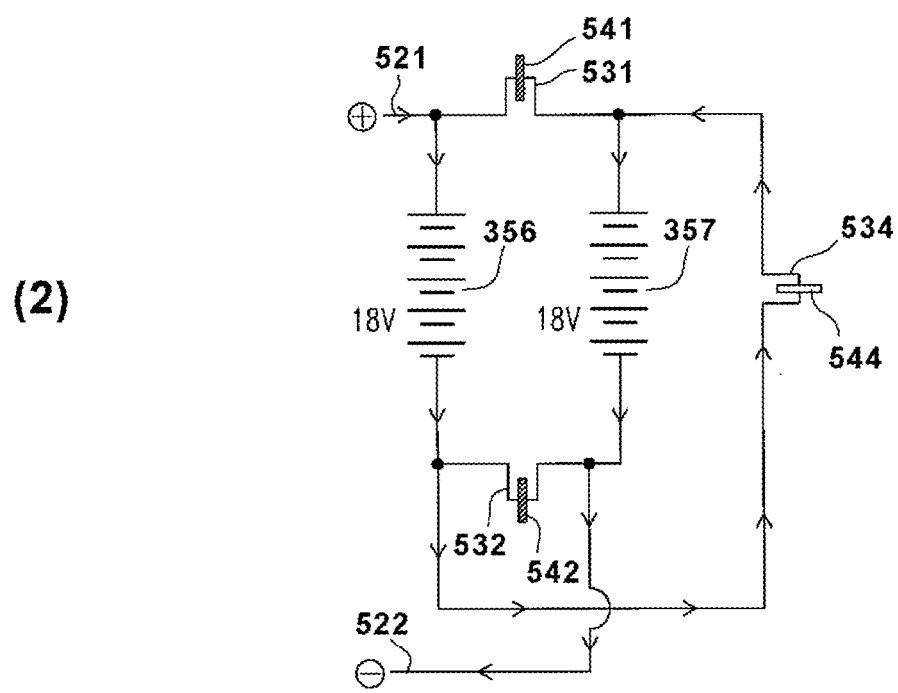

FIG. 31 shows diagrams of a state in which the battery pack 500 according to a fifth example of the present invention outputs 36 V.

DESCRIPTION OF EMBODIMENTS

Example 1

Examples of the present invention will be described below with reference to the drawings. In the following drawings, the same components will be denoted with the same reference numerals, and repeated descriptions will be omitted. In this specification, as an example of an electric appliance, an electric tool that operates with a battery pack will be exemplified. The forward, rearward, left, and right directions on the side of a body of the electric tool are shown as directions in FIG. 2, and forward, rearward, left, right, up and down directions when viewed as a single battery pack are shown as directions in FIG. 3 based on the mounting direction of the battery pack. In addition, for convenience of description, the mounting direction of the battery pack will be described as a direction based on a state in which the battery pack side is moved without moving the electric tool body side.

Figure 1:
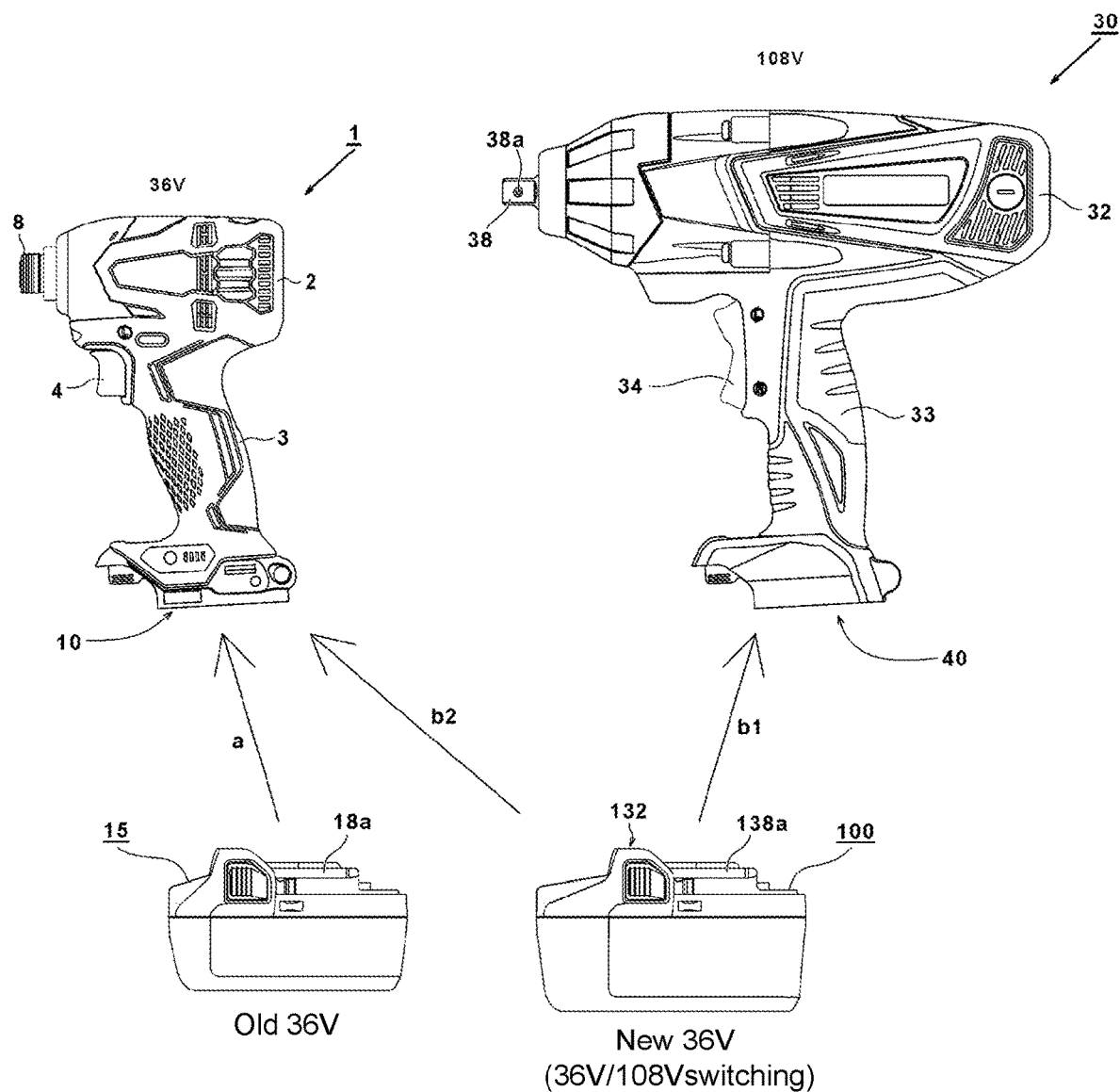
FIG. 1 is a diagram for explaining a state in which a battery pack according to the present invention is mounted in an electric tool.

FIG. 1 is a diagram for explaining a state in which a battery pack according to the present example is mounted in an electric tool. An electric tool, which is a form of an electric appliance, has a battery pack, and is a tool that fastens a bolt, a nut, a screw and the like using a tip tool such as a bit, and is referred to as a so-called impact tool. At the tip of an electric tool body 1, a tip tool holding part 8 which has an output shaft having a hexagonal mounting hole with a cross-sectional shape perpendicular to the axial direction and allows a tip tool 9 such as a driver bit to be attached to or detached from a mounting hole with one touch using a sleeve held movably in the front to rear direction on the outer circumferential side of the output shaft is formed. An electric tool body 30 is a tool that performs a tightening operation on a bolt, a nut and the like (not shown) by applying a rotation force or a striking force in the axial direction to a tip tool such as a socket wrench (not shown). These electric tool bodies 1 and 30 include housings 2 and 32 serving as outer frames that form an external form, and handle parts 3 and 33 are formed in the housings 2 and 32. The operator performs an operation by holding the electric tool bodies 1 and 30 with one hand or while gripping with one hand and supporting with the other hand. The electric tool bodies 1 and 30 drive a motor (not shown) housed in the housings 2 and 32 using a direct current supplied from a battery pack 15 or 100 as a power supply. Trigger-like operation switches 4 and 34 are provided in the vicinity of a part of the handle parts 3 and 33 touched by an index finger when an operator grips, and battery pack mounting parts 10 and 40 for mounting the battery packs 15 and 100 are formed below the handle parts 3 and 33.

The electric tool body 1 is an electric appliance using the battery pack 15 at a rated voltage of 36 V of the related art, and drives a motor as a load device. Therefore, as in a combination indicated by an arrow a, the battery pack 15 can be mounted in the battery pack mounting part 10 of an electric appliance (the electric tool body 1) supporting 36 V. On the other hand, the electric tool body 30 requires a high voltage equal to a commercial voltage such as a rated voltage of 108 V, and as indicated by an arrow b1, the battery pack 100 that can output 108 V is mounted in the battery pack mounting part 40. 30 lithium ion battery cells with a rated voltage of 3.6 V are housed in the battery pack 100 that can output a high voltage. As described above, the dedicated battery packs 15 and 100 are generally mounted in the electric tool bodies 1 and 30 according to a rated voltage. However, in the present example, the battery pack 100 supports a plurality of voltages, and can output at a low voltage, and as indicated by an arrow b2, the battery pack 100 can also be mounted in the electric tool body 1 supporting 36 V. In order for the battery pack 100 to be mounted in the electric tool bodies 1 and 30 with different voltages as indicated by the arrows b1 and b2, it is important to make the shapes of the battery pack mounting parts 10 and 40 substantially the same, and the voltage of the battery pack 100 can be switched. In addition, when the voltage set in the battery pack 100 does not correspond to a voltage of an electric appliance or electric tool to be mounted, it is important that the battery pack 100 be not able to be mounted or not operate even if mounted. In addition, in the example in FIG. 1, the electric tool bodies 1 and 30 are shown as examples of the electric appliance body, but any electric appliance that converts electric energy into kinetic energy, thermal energy, magnetic energy, or light energy is conceivable as a load device that operates using the power of a battery pack.

Figure 2:
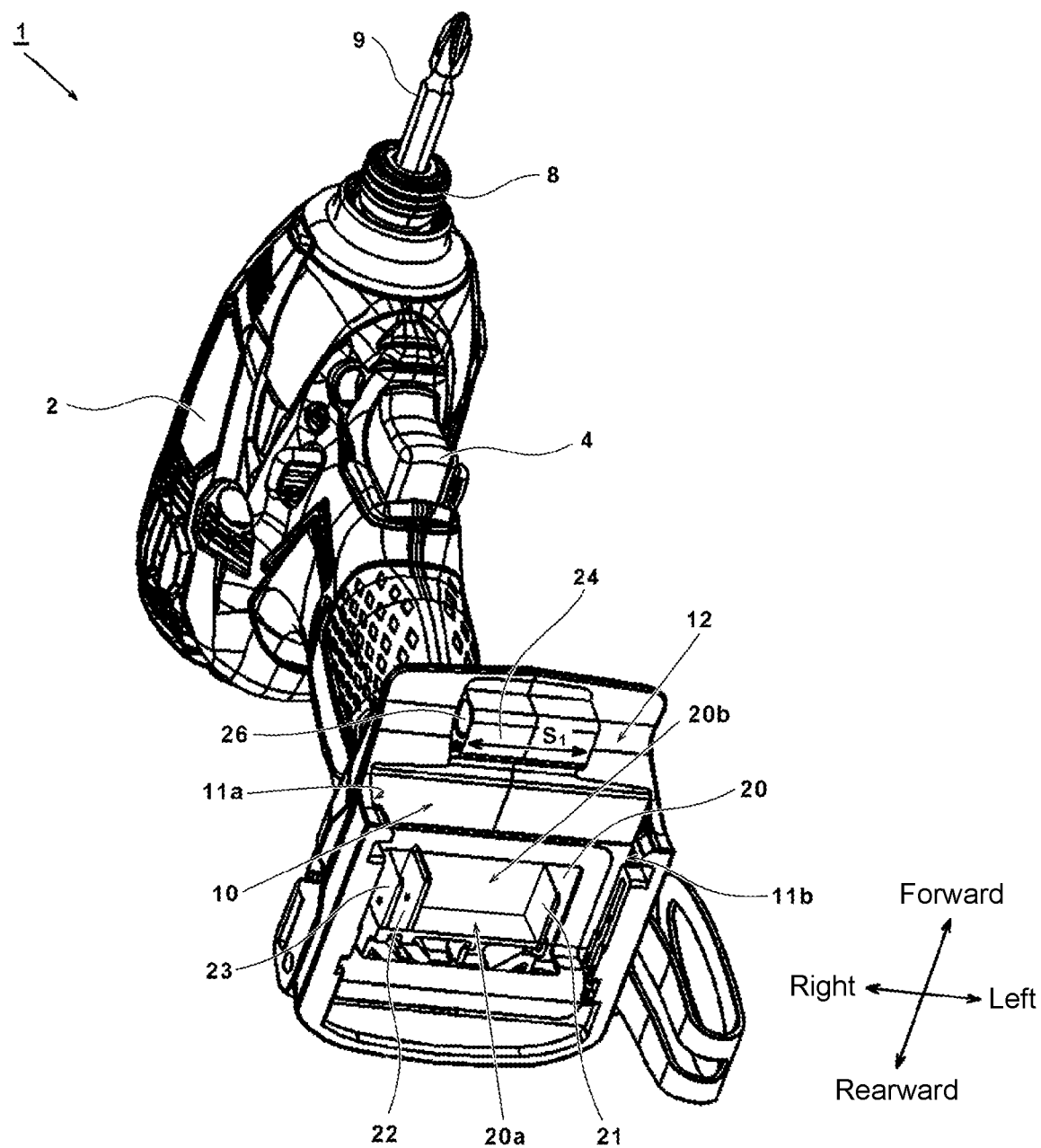
FIG. 2 is a perspective view showing the shape of a battery pack mounting part 10 of an electric tool body 1 in FIG. 1.

FIG. 2 is a perspective view showing the shape of the battery pack mounting part 10 of the electric tool body 1. The electric tool body 1 shown here is an impact driver, and a handle part that extends downward form a body part of a housing 2 is provided and the battery pack mounting part 10 is formed below the handle part. A trigger switch 4 is provided in the handle part. An anvil (not shown) serving as an output shaft is provided on the front side of the housing 2, and the tip tool holding part 8 for mounting the tip tool 9 is provided at the tip of the anvil. Here, a plus driver bit is mounted as the tip tool 9. The battery pack mounting part 10 corresponding to the shape of a battery pack to be mounted is formed not only in the electric tool, but also in all electric appliances using this battery pack, and a battery pack that is not compatible with the battery pack mounting part 10 cannot be mounted. In the battery pack mounting part 10, rail grooves 11a and 11b that extend parallel to each other in the front to rear direction are formed in an inner wall part on both left and right sides, and a terminal part 20 is provided therebetween. The terminal part 20 is produced by integrally molding a non-conductive material such as a synthetic resin, and a plurality of metal terminals, for example a positive electrode input terminal 21, a negative electrode input terminal 22, an LD terminal (abnormal signal terminal) 23 are cast therein. In the terminal part 20, a vertical surface 20a serving as an abutment surface in the mounting direction (the front to rear direction) and a horizontal surface 20b are formed. The horizontal surface 20b is a surface that is adjacent to and faces an upper step surface 115 (to be described below in FIG. 7) when the battery pack 100 is mounted. On the front side of the horizontal surface 20b, a curved part 12 in contact with a ridge part 132 (to be described below in FIG. 7) of the battery pack 100 is formed, and a protrusion part 24 is formed in the vicinity of the center of the curved part 12 to the left and right thereof. The protrusion part 24 serves as a screwing boss for a housing of the electric tool body 1 formed in two parts in the left to right direction and also serves as a stopper for restricting a relative movement of the battery pack 100 in the mounting direction. A width S1 of the protrusion part 24 in the left to right direction is a width corresponding to a stopper part 131 (to be described below in FIG. 7) formed on the side of the battery pack 100.

Figure 3:
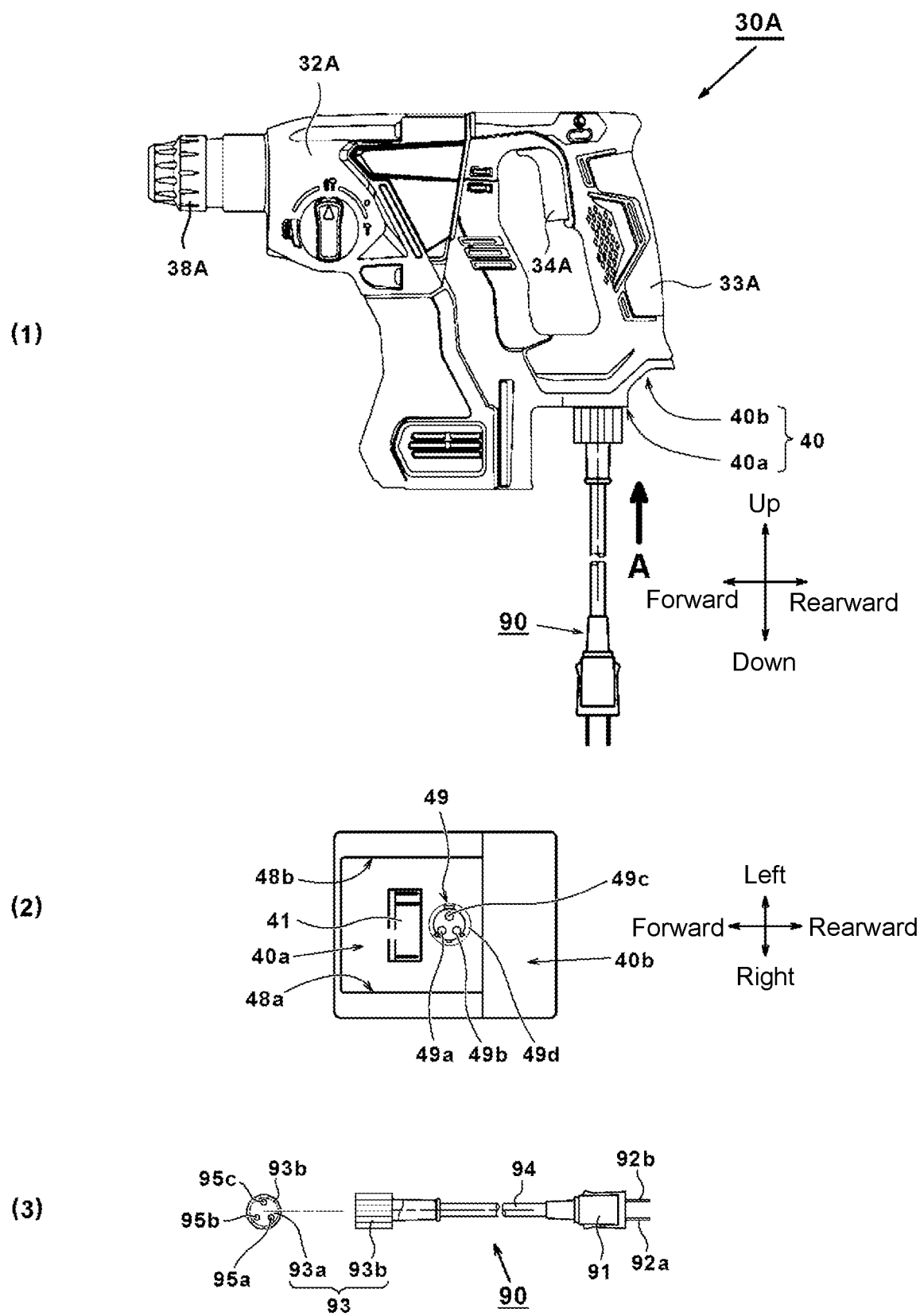
FIG. 3 shows diagrams of an electric tool body 30A, (1) of FIG. 3 is a side view showing a state in which power is supplied from a power supply cord 90, (2) of FIG. 3 is a bottom view of a battery pack mounting part 40, and (3) of FIG. 3 is a diagram showing the shapes of the power supply cord 90 and a connector part 93.

FIG. 3 shows diagrams of another electric tool body 30A supporting 108 V, FIG. 3(1) is a side view showing a state in which power is supplied from a power supply cord 90, FIG. 3(2) is a bottom view of the battery pack mounting part 40, and FIG. 3(3) is a diagram showing the shapes of the power supply cord 90 and a connector part 93. In the electric tool body 30A, a motor used is a brushless motor with specifications corresponding to an alternating current of 100 V, for example, a brushless DC motor driven by an inverter circuit (to be described below in FIG. 4). Therefore, a direct current of 108 V output from the battery pack 100 is input to the inverter circuit, or a commercial power supply (AC power supply device) such as an alternating current of 100 V (60 Hz) is rectified by a rectification circuit to be described below and is then input to the inverter circuit. In this manner, when an output voltage of the battery pack 100 is increased to the same level as a commercial voltage, it is possible to realize an AC/DC compatible high output electric tool body 30A that operates with a battery pack and with a commercial voltage. The power supply cord 90 mounted in the electric tool body 30A holds two terminals 92a and 92b on one side of a connection cord 94 and has a plug part 91 for mounting in an outlet of a commercial power supply, and the connector part 93 connected to the electric tool body 30A is formed on the other side. In the present example, a part to which the connector part 93 is connected is disposed in the battery pack mounting part 40 after the battery pack 100 is removed. That is, when the power supply cord 90 is connected to the electric tool body 30A, it is necessary to remove the battery pack 100 from the electric tool body 30A, and on the other hand, when the battery pack 100 is mounted in the electric tool body 30A, it is necessary to remove the power supply cord 90.

FIG. 3(2) is a diagram of the battery pack mounting part 40 of the electric tool body 30A when viewed from below, and is a diagram in a direction of an arrow A in FIG. 3(1). This figure shows a state in which both the battery pack 100 and the power supply cord 90 are removed. In the battery pack mounting part 40, the battery pack 100 is mounted so that the battery pack 100 slides from the rear side to the front side (from the right to the left in the drawing). Therefore, on a mounting surface 40a, an opening part is formed on the upstream side in the mounting direction, and two rail grooves (device side rails) 48a and 48b are formed on the lateral side. In addition, a recess part 40b formed to be recessed upwardly is formed on the side upstream (rear side part) from the opening part. A terminal part 41 connected to a positive electrode terminal and a negative electrode terminal of the battery pack 100 is provided in the vicinity of substantially the center of a part interposed between the rail grooves 48a and 48b of the mounting surface 40a. In the present example, an AC socket 49 is provided slightly behind the terminal part 41. In the AC socket 49, in the circumferential direction, a first device side terminal 49a, a second device side terminal 49b, and a third device side terminal 49c, which have a pin shape, are formed.

FIG. 3(3) is a diagram showing the shape of the connector part 93 of the power supply cord 90, and the left side diagram is a view of the connector part 93 when viewed from the outside in the longitudinal direction and the right side diagram is a side view of the entire shape of the power supply cord 90 including the connector part 93. A male screw is formed on the outer circumferential surface of a connector body 93a, and a cylindrical fixing screw 93b is held in a state in which it is relatively rotatable on the outer circumferential side of the male screw, and an amount of movement in the axial direction is limited. The external form of the connector part 93 is a circle, and in the inner circumferential part, three female type terminals including a first cord side terminal 95a, a second cord side terminal 95b, and a third cord side terminal 95c are disposed side by side in the circumferential direction. Here, in order to supply commercial power, it is sufficient to connect only two of the first cord side terminal 95a and the second cord side terminal 95b, it is sufficient that the third device side terminal 49c connected to the third cord side terminal 95c be in a non-wiring state in the electric tool body 30A, and be used as a ground wire. The fixing screw 93b holds the power supply cord 90 so that it does not fall off from the electric tool body 30A, and a female screw part on the inner circumferential side of the fixing screw 93b is screwed into a male screw part 49d formed on the outer circumferential surface of the AC socket 49. In this manner, after the connector body 93a is inserted into the AC socket 49, the fixing screw 93b is tightened and screwed into a male screw on the side of the AC socket 49, and thus the power supply cord 90 can be fixed so that it does not fall off from the electric tool body 30A. In addition, in FIG. 3, while the electric tool body 30A has been described as an example of the electric appliance body, a configuration in which the power supply cord 90 is connected to a part that is not exposed to the outside when the battery pack is mounted in the battery pack mounting part 40 can be used for any electric appliance body which has the battery pack mounting part 40 and in which the battery packs 1 and 30 can be mounted. In addition, in FIG. 3, the power supply cord 90 corresponds to an AC power supply device of the present invention. However, a method of fixing the power supply cord 90 and the electric tool body 30A is not limited to a screw method, and a power supply cord that is held by a fitting pressure of a terminal part may be used and a power supply cord using other known fixing or holding methods may be used.

Figure 4:
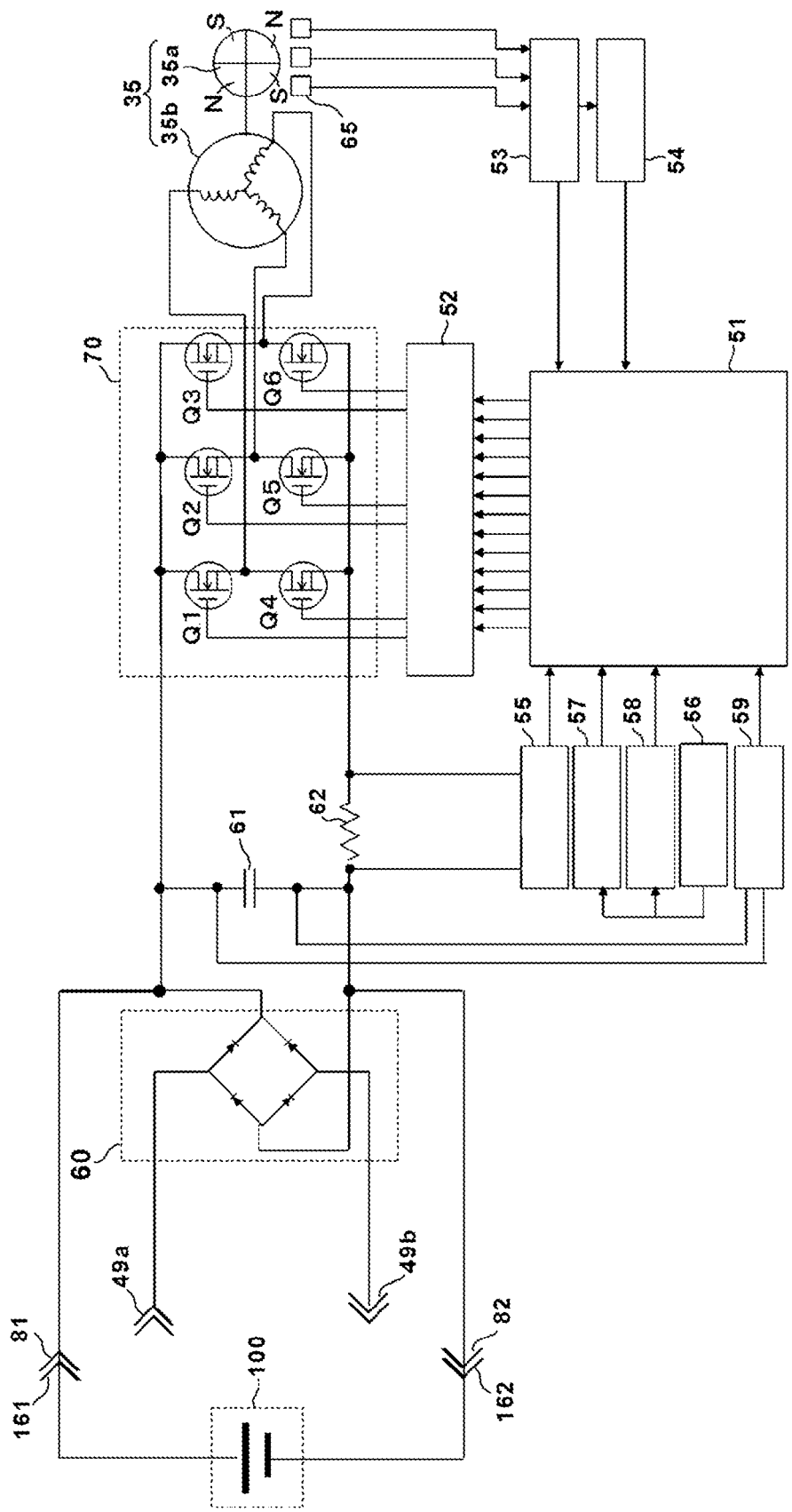
FIG. 4 is a block diagram showing a configuration of a drive control system of a motor 35.

Next, the configuration and operation of a drive control system of a motor 35 will be described with reference to FIG. 4. FIG. 4 is a block diagram showing the configuration of the drive control system of the motor 35. In the electric tool of the present example, a direct current supplied from the battery pack 100 is used to generate an exciting current using an inverter circuit 70, flows through a predetermined coil of the motor 35 while switching an exciting current, and thereby a brushless type motor 35 rotates. An input from the battery pack 100 is input through a positive electrode input terminal 81 connected to a positive electrode terminal 161 of the battery pack 100 and a negative electrode input terminal 82 connected to a negative electrode terminal 162 of the battery pack 100. The motor 35 can be, for example, an inner rotor type, and includes a rotor 35a including a permanent magnet (magnet) having a plurality of sets (2 sets in the present example) of N pole and S pole, a stator 35b including 3-phase stator windings U, V, and W in a star connection, and three rotating position detecting elements (Hall elements) 65 that are disposed at predetermined intervals in the circumferential direction, for example, every 60°, in order to detect a rotation position of the rotor 35a. Such an output is converted into a pulse train by a rotation position detection circuit 53 and is output to a calculation portion 51. A rotational speed detection circuit 54 detects a rotational speed of the motor 35 using an output of the rotation position detection circuit 53 and outputs it to the calculation portion 51. In the calculation portion 51, a direction and time for supplying a current to the stator windings U, V, and W are determined using such an output.

A control signal output circuit 52 generates a drive signal for switching predetermined switching elements Q1 to Q6 according to an instruction from the calculation portion 51 based on output signals of an applied voltage setting circuit 58 and the rotation position detection circuit 53, and outputs the drive signal to the inverter circuit 70. The inverter circuit 70 includes six switching elements Q1 to Q6 such as IGBTs connected as a 3-phase bridge type. Respective gates of the switching elements Q1 to Q6 are connected to the control signal output circuit 52, and respective emitters or respective collectors are connected to the stator windings U, V, and W in a star connection. Therefore, the six switching elements Q1 to Q6 perform a switching operation by switching element drive signals (drive signals such as H1 to H6) input from the control signal output circuit 52, and direct current voltages of the battery pack 100 applied to the inverter circuit 70 are applied as 3-phase (a U-phase, a V-phase, and a W-phase) voltages Vu, Vv, and Vw to the stator windings U, V, and W.

The calculation portion 51 sets whether or not to operate a trigger 34A for operating an operation switch 56 (or the operation switches 4 and 34 in FIG. 1) by a switching operation detection circuit 57, changes a pulse width (duty ratio) of a PWM signal based on a signal from the applied voltage setting circuit 58 which varies according to the magnitude of an operation amount (stroke), and drives respective gates of the six switching elements Q1 to Q6 through the control signal output circuit 52. According to the drive control, an amount of power supplied to the motor 35 is adjusted, and start/stop and a rotational speed of the motor 35 are controlled. Here, the PWM signal is supplied to any of the positive power supply side switching elements Q1 to Q3 or the negative power supply side switching elements Q4 to Q6 of the inverter circuit 70, and when the switching elements Q1 to Q3 or the switching elements Q4 to Q6 are switched at a high speed, an amount of power supplied to the stator windings U, V, and W from a direct current voltage of the battery pack 100 is controlled.

Although not shown, the calculation portion 51 includes a microcomputer for outputting a drive signal based on processing programs and data. The calculation portion 51 includes a ROM for storing processing programs and control data, a RAM for temporarily storing data, a timer, and the like. A voltage between both ends of a condenser 61 is detected as a voltage of an input power supply by a voltage detection circuit 59, and is output to the calculation portion 51.

A power supply of the electric tool body 30A can be supplied using not only the battery pack 100 but also the power supply cord 90, and the first device side terminal 49a and the second device side terminal 49b of the AC socket 49 for an AC input provided in the electric tool body 30A are connected to an input side of a diode bridge 60. The diode bridge 60 is a rectification circuit that allows a current to flow to only one side by performing full-wave rectification using four diodes for rectification, and converts an alternating current voltage into a direct current voltage. An output of the diode bridge 60 is connected to the inverter circuit 70. Since an output of the diode bridge 60 is a pulsating current, a smoothing circuit may be interposed between the diode bridge 60 and the inverter circuit 70. A magnitude of a current flowing through the inverter circuit 70 is measured by a current detection circuit 55 using a shunt resistor 62, a value thereof is fed-back to the calculation portion 51, and adjusted so that set driving power is applied to the motor 35.

Figure 5:
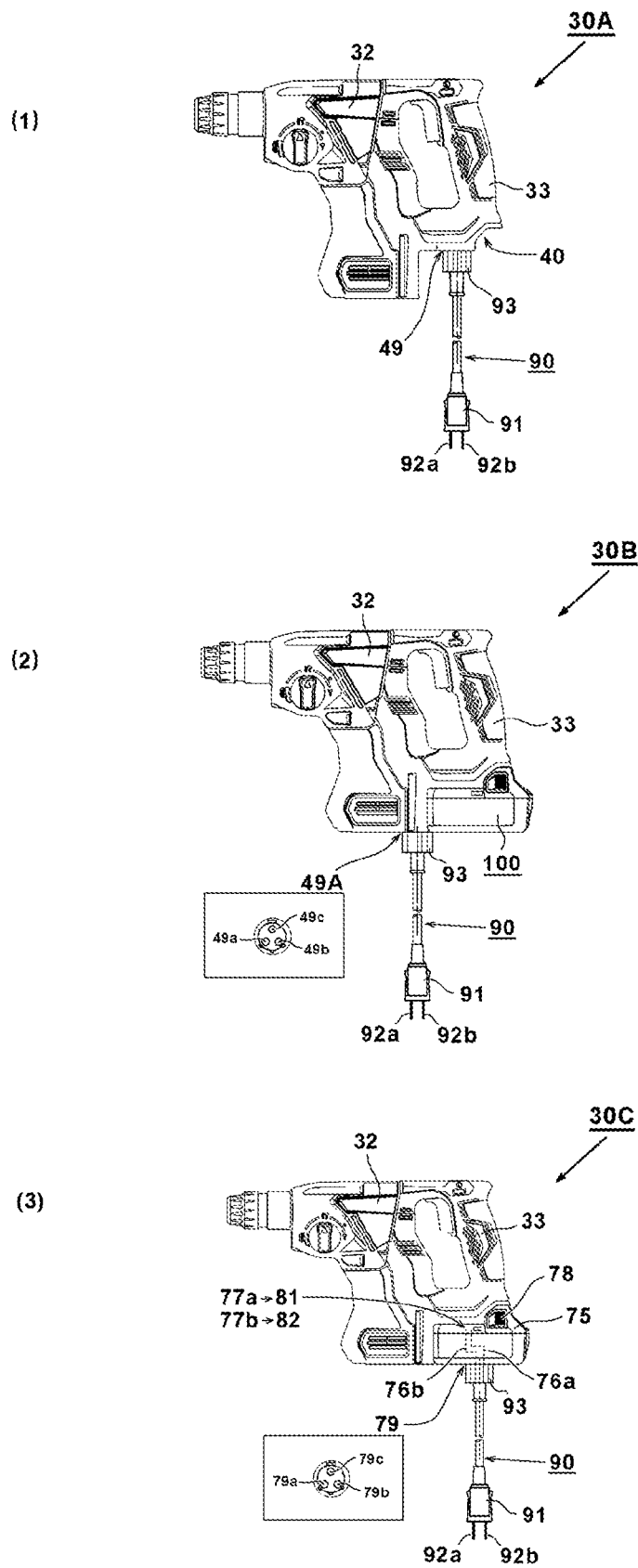
FIG. 5 shows diagrams for explaining a state in which the power supply cord 90 is connected to an electric tool body, (1) of FIG. 5 shows an example of connection to the electric tool body 30A, and (2) of FIGS. 5 and (3) of FIG. 5 are diagrams showing an example of connection to electric tool bodies 30B and 30C according to a modified example thereof.

FIG. 5 is a diagram for explaining a state in which the power supply cord 90 is connected to an electric tool body, FIG. 5(1) is an example of connection to the electric tool body 30A, and FIGS. 5(2) and 5(3) are diagrams showing an example of connection to electric tool bodies 30B and 30C according to a modified example thereof. The electric tool bodies 30B and 30C are different only in a connection position and a connection method for the power supply cord 90 from the electric tool body 30A shown in FIG. 3, and other configurations not related to connection to the power supply cord 90 are the same as those of the electric tool body 30A. Therefore, the voltage switching type battery pack 100 shown in FIG. 1 can be mounted in any of the electric tool bodies 30A to 30C. In addition, although not shown here, a fixed voltage type 108 V battery pack and battery packs 200 and 300 to be described in the following Examples 2 and 3 can be attached to the electric tool bodies 30A to 30C. In addition, of course, it is necessary to form the shape of the battery pack mounting part 40 to conform to a battery pack to be mounted so that the battery packs 200 and 300 can be mounted.

In the form of the present example shown in FIG. 5(1), since the AC socket 49 (refer to FIG. 3) is provided in the battery pack mounting part 40, the power supply cord 90 cannot be attached when the battery pack 100 is mounted. In addition, when the power supply cord 90 is mounted, the battery pack 100 needs always to be removed. In this manner, since the AC socket 49 for the power supply cord 90 is provided at a position inaccessible when the battery pack 100 is mounted, it is possible to reliably distinguish a power supply from the battery pack 100 and a power supply from the power supply cord 90 and select either thereof without mistakes. In addition, since a brushless motor with a rated input voltage of 100 V or more is mounted in the electric tool body 30, it is possible to realize an AC/DC compatible electric tool that can be driven by a commercial AC power supply and driven by the battery pack 100.

The power supply cord 90 may have a length sufficient for an operator to perform an operation while he or she grips the handle part 33 of the electric tool body 30A with one hand. In a temporary operation at a location that the length of the power supply cord 90 does not reach, when the power supply cord 90 is removed and the battery pack 100 is mounted, the same operation can be performed without concern regarding a decrease in the output of the electric tool body 30A. In addition, a method of connecting the power supply cord 90 to the electric tool body 30A in the form shown in FIG. 5(1) has an advantage in that the weight of the electric tool body 30A is reduced because the battery pack 100 is always removed during an operation with an AC power supply. In addition, while switching from the power supply cord 90 to an operation using the battery pack 100, since the battery pack 100 cannot be mounted unless the power supply cord 90 is removed, it is possible to reliably prevent forgetting removal of the power supply cord 90. In addition, when the battery pack 100 is mounted, since the AC socket 49 is not exposed to the outside, a risk of the AC socket 49 being exposed to dust, water, and the like can be significantly reduced, and installation of a cover covering the AC socket 49 can be omitted.

FIG. 5(2) shows the electric tool body 30B according to a modified example of the electric tool body 30A in FIG. 5(1). Here, the position of the AC socket 49A is formed on the lower surface of a housing of the electric tool body 30B and at a point on the front side relative to the battery pack 100. In the frame below the reference numeral 49A, a bottom view of the AC socket 49A is shown. As can be understood here, the shape of the AC socket 49A is completely the same as the AC socket 49 shown in FIG. 3(2), and the third device side terminal 49c is provided in addition to the first device side terminal 49a and the second device side terminal 49b connected for supplying commercial power. It is optional whether the third device side terminal 49c is wired or not wired in the electric tool body 30B. In such a disposition, the power supply cord 90 can be connected while the battery pack 100 is mounted. When the power supply cord 90 is removed, any cap or cover that blocks an opening of the AC socket 49A may be provided in order to prevent the AC socket 49A from being exposed to the outside. In the present example, since an output voltage of the battery pack 100 is 108 V in a direct current connection, and a commercial AC power is an alternating current of 100 V to 120 V, the electric tool body 30B can be driven using both inputs arbitrarily. However, when it is possible to use both power supplies, use of commercial AC power supplied from the power supply cord 90 is preferable because it is then possible to prevent discharging of the battery pack 100. Thus, in the electric tool body 30B in FIG. 5(2), an input automatic switching member is provided so that, when it is possible to use both the battery pack 100 and commercial AC power, the commercial AC power side is used. In FIGS. 5(1) and 5(2), the power supply cord 90 corresponds to an AC power supply device of the present invention.

FIG. 6(1) is a circuit block diagram of a drive control system of the electric tool body 30B shown in FIG. 5(2). Basically, this circuit is the same as the circuit shown in FIG. 4, but a semiconductor switching element 66 such as an insulated gate bipolar transistor (IGBT) is inserted midway along a positive electrode side input line from the battery pack 100. A gate signal of the switching element 66 is connected to a control signal line 66a from the calculation portion 51, and the calculation portion 51 controls connection or disconnection between source and drain terminals of the switching element 66. In addition, a battery voltage detection circuit 67 that monitors a voltage of the battery pack 100 and a commercial power supply detection circuit 68 that monitors whether an AC voltage (or a voltage) is applied are provided, and outputs thereof are input to the calculation portion 51. When it is possible to use a commercial power supply 99, the calculation portion 51 turns a gate signal of the switching element 66 off, and disconnects an input circuit from the battery pack 100. On the other hand, when it is not possible to use the commercial power supply 99, the calculation portion 51 turns a gate signal of the switching element 66 on, and connects an input circuit from the battery pack 100.

In such a circuit configuration, in the electric tool body 30B, when the battery pack 100 is connected, a direct current of 108 V (rated voltage) is supplied, and in this state, when connected to an AC outlet via the power supply cord 90, AC power is automatically supplied, and when the power supply cord 90 is removed, driving is automatically switched to driving by the battery pack 100, and thereby the user-friendly electric tool body 30B can be realized. In addition, since there is no need to worry about detachment of the battery pack 100 and a connection state of the power supply cord 90, and particularly, forgetting of removing the other when one is connected, handling of mounting or removing the battery pack 100 also becomes easier. In addition, in the example in FIG. 6, a configuration in which an automatic switching member for an input voltage is used for the switching element 66, and the calculation portion 51 performs control is used, but other methods may be used. For example, using a relay member that operates by an output voltage of the diode bridge 60, when there is an output of the diode bridge 60, the output of the diode bridge 60 is connected to the inverter circuit 70, and connection between the battery pack 100 and the inverter circuit 70 is disconnected. On the other hand, when the plug part 91 (refer to FIG. 5) of the power supply cord 90 is unplugged from the outlet, since an output voltage from the inverter circuit 70 becomes zero, connection between the diode bridge 60 and the inverter circuit 70 may be disconnected by a switching operation of the relay member, and an output of the battery pack 100 may be connected to the inverter circuit 70. A configuration in which an indicating member indicating which power is operated for the electric tool body 30B during use, for example, an LED, is displayed during driving by commercial AC power may be used.

FIG. 5 will be referred to again. FIG. 5(3) shows the electric tool body 30C according to another modified example of the present example. The electric tool body 30C is the same as those shown in FIGS. 5(1) and 5(2) in that it can be driven by the battery pack 100 with a direct current of 108 V and driven by AC power supply via the power supply cord 90, but the power supply cord 90 is connected via the connection adapter 75. Here, the connection adapter 75 is a so-called dummy case for connecting two output lines from the power supply cord 90 to the positive electrode input terminal 81 and the negative electrode input terminal 82 for the battery pack 100. The external form of the connection adapter 75, and particularly, the upper half shape (upper case), is configured to be compatible with the battery pack 100, but no battery cell is housed therein. The lower case of the connection adapter 75 may have any shape, but the shape of the case of the connection adapter 75 with an upper case and a lower case may be the same as that of the battery pack 100. In addition, since a rectification circuit using the diode bridge 60 is included in the electric tool bodies 30A to 30C, there is no need to include a rectification circuit in the connection adapter 75. In addition, it does not exclude disposition of an auxiliary electrical circuit for assisting an operation of an electrical circuit included in the electric tool bodies 30A to 30C in the connection adapter 75. In the connection adapter 75, rails (adapter side rails, not shown) are formed on both left and right sides of the upper step surface, and adapter side rails are engaged with a rail groove (its shape is the same as those of the rail grooves 48a and 48b shown in FIG. 3(2)) formed on the side of the electric tool body 30B. The same latch mechanism as in the battery pack 100 is provided in the connection adapter 75, and a latch button 78 for operating it is provided. In an area surrounded by rails disposed on both left and right sides, a plurality of slots (not shown) are formed, and in a part accessible from two slots among them, only two of a positive electrode terminal and a negative electrode terminal are formed (to be described below in FIG. 6(2)). An AC socket 79 having the same shape as the AC socket 49 shown in FIG. 3(2) is provided on the lower surface of the case of the connection adapter 75. In the frame below the reference numeral 79 in FIG. 5(3), a bottom view of the AC socket 79 provided on the lower surface of the connection adapter 75 is shown. As can be understood here, the shape of the AC socket 79 is completely the same as that of the AC socket 49 shown in FIG. 3(2), and a third adapter side terminal 79c is provided in addition to a first adapter side terminal 79a and a second adapter side terminal 79b connected for supplying commercial power. It is optional whether the third adapter side terminal 79c is wired in the connection adapter 75 and connected to any terminal on the side of the electric tool body or not wired. Here, the first adapter side terminal 79a of the AC socket 79 is connected to the positive electrode input terminal 81 (refer to FIG. 4) on the side of the electric tool body 30C through an adapter side positive electrode terminal 77a using a power line 76a wired in the connection adapter 75. Similarly, the second adapter side terminal 79b is connected to the negative electrode input terminal 82 (refer to FIG. 4) on the side of the electric tool body 30C through an adapter side negative electrode terminal 77b using a power line 76b wired in the connection adapter 75. In FIG. 5(3), the power supply cord 90 and the connection adapter 75 correspond to an AC power supply device of the present invention. In addition, the power supply cord 90 is configured to be detachable using the AC socket 79 and the connector part 93 on a lower surface of the connection adapter 75. However, a configuration in which the connection adapter 75 and a connection cord 44 are directly connected, and the connection cord 44 extends directly from the case of the connection adapter 75 may also be used. In addition, when the power supply cord 90 is removed, any cap or cover that blocks an opening of the AC socket 79 may be provided in order to prevent the AC socket 79 from being exposed to the outside.

In the circuit diagram of the electric tool body 30C, in the block diagram shown in FIG. 4, an input path of the battery pack 100 is changed, and connection to the inverter circuit 70 via the diode bridge 60 is performed even when the battery pack 100 is used. FIG. 6(2) is a circuit block diagram of a drive control system of the electric tool body 30C shown in FIG. 5(3). Basically, this circuit is the same as the circuit shown in FIG. 4, but it is wired so that the positive electrode terminal 161 and the negative electrode terminal 162 of the battery pack 100 are mounted in the input terminals 81 and 82 of the diode bridge 60. Since the battery pack 100 has a direct current of 108 V, there is no problem when it is connected to the inverter circuit 70 via the diode bridge 60. In addition, even if the connection adapter 75 is mounted, the adapter side positive electrode terminal (first terminal) 77a formed in the connection adapter 75 is connected to the positive electrode input terminal 81, and the adapter side negative electrode terminal (second terminal) 77b is mounted in the negative electrode input terminal 82, since an alternating current is rectified by the diode bridge 60, the motor 35 can be driven by operating the inverter circuit 70 in the same manner. Since no battery cell is included in the connection adapter 75, it is not necessary to provide a connection terminal for signal transmission other than the adapter side positive electrode terminal 77a and the adapter side negative electrode terminal 77b. However, one of the connection terminals may be used in order to notify the electric tool body 30C of the fact that the connection adapter 75 is connected. In the present example, a brushless DC motor is driven using a direct current input with a direct current of 108 V and the inverter circuit 70. However, the type of the motor used is not limited to the brushless motor, and other motors that are driven at about AC 100 to 120 V, for example, an alternating current commutator motor, may be used. In such a configuration, an electric tool using an alternating current commutator motor can be driven in the battery pack 100, and an AC/DC compatible electric tool can be easily realized.

Next, the battery pack 100 in which an output voltage can be switched between 36 V and 108 V will be described with reference to FIG. 7 to FIG. 9. FIG. 7 is a perspective view showing the external form of the battery pack 100. The frame of the battery pack 100 is formed of a lower case 101 and an upper case 110 which are divided in the vertical direction, and the lower case 101 and the upper case 110 are fixed by four screws (not shown). In the upper case 110, a mounting part in which two rails 138a and 138b are formed is formed for attachment to the battery pack mounting part 40. The rails 138a and 138b on the side of the battery pack are formed in a direction parallel to the mounting direction of the battery pack 100 and parallel to left and right side surfaces of the upper case 110. The rails 138a and 138b are formed to correspond to the rail grooves 48a and 48b (refer to FIG. 3(2)) formed in the battery pack mounting part 40 of the electric tool body 30, and while the rails 138a and 138b are fitted to the rail grooves 48a and 48b, when the latch mechanism operates, the battery pack 100 is fixed to the electric tool body 30. A flat lower step surface 111 is formed on the front side of the upper case 110, and the upper step surface 115 formed to be higher than the lower step surface 111 is formed in the vicinity of the center. A part connecting the lower step surface 111 and the upper step surface 115 becomes a step part 112 formed in a step shape, and a front side area from the step part 112 to the upper step surface 115 becomes a slot group disposition area 120 (refer to FIG. 7(2)). In the slot group disposition area 120, a plurality of slots (121 to 124) that extend to the rear side from the front step part 112 are formed. Here, the positive electrode terminal insertion port 121 is disposed on the side close to the left side rail 138b, and the negative electrode terminal insertion port 122 is formed on the side close to the right side rail 138a. A low voltage switching member insertion port 123 and a high voltage switching member insertion port 124 are formed in a part interposed between the positive electrode terminal insertion port 121 and the negative electrode terminal insertion port 122. Inside the positive electrode terminal insertion port 121 and the negative electrode terminal insertion port 122, a positive electrode terminal and a negative electrode terminal, which are invisible and made of a metal, are disposed. In addition, a voltage switching member (to be described below) is disposed in a part in which positions of the low voltage switching member insertion port 123 and the high voltage switching member insertion port 124 overlap (the internal space of the upper case 110). In addition, in FIG. 7, although only the four slots (121 to 124) provided in the slot group disposition area 120 is shown, and slots other than the four slots are not shown, slots for housing other connection terminals may be formed. In addition, in the internal space of the upper case 110 in which the slot group disposition area 120 is positioned as described above, since a terminal and a voltage switching member (for example, a switching terminal) are disposed, the slot group disposition area 120 serves as a terminal disposition area.

The ridge part 132 formed to be raised is formed on the rear side of the upper step surface 115. The ridge part 132 has an external form that is raised above the upper step surface 115 and the recessed stopper part 131 is formed in the vicinity of the center thereof. Since the stopper part 131 serves as a housing and an abutment surface when the battery pack 100 is mounted in the protrusion part 24 (refer to FIG. 2) of the battery pack mounting part 10, when the protrusion part 24 on the side of the electric tool body 1 is inserted until it abuts the stopper part 131, a plurality of terminals 21 to 23 (refer to FIG. 2) disposed in the electric tool body 1 and a terminal group disposed in the battery pack 100 are brought into contact with each other and are in a conductive state. A slit 134 serving as a cooling air inlet connected to the inside of the battery pack 100 is provided inside the stopper part 131. In addition, a locking part of a latch 141 of the battery pack 100 projects vertically outward from a lower part of the rails 138a and 138b due to an action of a spring, and is engaged with a recess (not shown) formed in the rail grooves 48a and 48b of the electric tool body 30, and thereby it is prevented the battery pack 100 from falling off. When the battery pack 100 is mounted in the electric tool body 1, the slit 134 is covered so that it is invisible from the outside. The slit 134 is an air window used to forcibly flow cooling air inside the battery pack 100 when the battery pack 100 is connected to a charger (not shown) for charging, and when mounted in the electric tool body 30, the slit 134 serving as a cooling air inlet is in a closed state.

In FIG. 7(1), in a terminal part 20A on the side of the electric tool body 1 driven at 36 V, the positive electrode input terminal 21 and the negative electrode input terminal 22 which are made of a metal are fixed to a terminal attachment portion made of a synthetic resin. Here, a switching protrusion 24A for switching an output of the battery pack 100 to the low voltage side is additionally formed. The switching protrusion 24A is a switching element integrally formed with a base part of the terminal part 20A and is made of a synthetic resin. Since the switching protrusion 24A itself is simply used to move a rotary type terminal base 171 (refer to FIG. 9), and is not used as a terminal that transmits power or a signal, it is not necessary to form it using a conductive material, and it may be integrally formed using the same insulating material as that of the base part of the terminal part.

FIG. 7(2) shows a state when mounted in a terminal part 80 on the side of the electric tool body 30 driven at 108 V. The terminal part 80 is formed when the positive electrode input terminal 81 and the negative electrode input terminal 82 which are made of a metal are fixed at a base part made of a synthetic resin. Here, a switching protrusion 84 for switching an output of the battery pack 100 to the high voltage side is additionally formed. The switching protrusion 84 is a member integrally formed with a base part of the terminal part 80 and is made of a synthetic resin. According to the present example, the external form of the battery pack 100 is the same when it has an output of 36 V or an output of 108 V. Without worrying about setting of an output voltage of the battery pack 100, the operator simply mounts it in an electric appliance body for 36 V or an electric appliance body for 108 V, an output voltage optimal for an electric appliance body in which the battery pack 100 is mounted by the switching protrusion 24A or the switching protrusion 84 is selected (switched).

FIG. 8 shows perspective views of the appearance of the cell pack 150 which is housed in the battery pack 100 and in which a plurality of cells 151 are stacked to obtain one pack. FIG. 8(1) is a perspective view, and FIG. 8(2) is a side view when viewed in the axial direction of the cell 151. Here, a total of 30 cells 151 called a 14500 size of a secondary battery that can be charged and discharged a plurality of times and having a diameter of 14 mm and a length of 50 mm are stacked. Ten cells 151 are used as one unit, and three cell units 156 to 158 are formed. In the cell units 156 to 158, the cells 151 are stacked so that respective axes A1 are parallel to one another, and disposed so that directions of adjacent cells 151 are alternately reversed, and positive electrode terminals and negative electrode terminals of adjacent cells 151 are connected by a metal thin plate 159 to form 10 serial connections. The outermost cylindrical part of the stacked cells 151 is covered with a separator 152 which serves as an insulator and is made of a synthetic resin, and thus the cells 151 are held so that they do not move relative to the separator 152. When a lithium ion battery (one rated output of 3.6 V) is used as the cell 151, since an output with a rated voltage of 36 V is obtained from the cell units 156 to 158, an output from the battery pack 100 is obtained while + outputs (positive outputs, positive electrode terminals) and − outputs (negative outputs, negative electrode terminals) of the cell units 156 to 158 are connected in parallel, and thus it can be used as a power supply with a high capacity of 36 V. On the other hand, when + outputs and − outputs of the cell units 156 to 158 are connected in series, it can be used as a power supply with a high voltage of 108 V.

When 30 cells 151 of 14500 size are stacked, the length in the axial direction is 50 mm, the length in the width direction orthogonal to the axial direction is 124.8 mm, and the length in the height direction orthogonal to the axial direction is 57.3 mm. In addition, since a unit weight of the cells 151 is about 23 g, a total weight of the cells 151 is 690 g. Regarding the volume, a volume of a part occupied by the cells 151 is 230,907 mm$^3$, a volume occupied by the separator 152 is 67,392 mm$^3$, and a total volume is 298,299 mm$^3$. Therefore, a total weight of the battery pack 100 can be reduced to less than 800 g or 2 lb (pounds). Currently, regarding lithium ion batteries that are widely used for battery packs of electric tools, there is a so-called 18650 size. The 18650 size has a diameter of 18 mm and a length of 65 mm, has a volume that is slightly larger than twice the 14500 size, and has a weight of 46 g that is twice that of the 14500 size cell. If 30 cells of 18650 size are stacked in order to obtain a direct current of 108 V, since the weight of only the cells is 1380 g, and the weight of the battery pack itself becomes heavy, its size and weight become impractical for an electric tool by which an operator performs an operation while gripping it with one hand.

The inventors conducted experiments and found that an upper limit at which an operator can perform an operation comfortably with one hand is 2 kg or 5 lb in total weight of an electric tool after a battery pack is mounted. Therefore, when 30 cells of 18650 size are used to obtain an output of 108 V, it is difficult to realize a portable electric tool that can be operated with one hand. In the present example, when 14500 size lithium ion batteries with the same size as a so called AA-size battery are stacked, it is possible to realize an electric tool having a high voltage while maintaining portability. In the battery pack 100 of the present example, it is possible to reliably secure an output voltage of 100 V or more corresponding to that of an AC power supply, and the cell weight of the cell pack 150 can be reduced to 0.69 kg. Since a current of about 15 A can be obtained from this lithium ion battery, the power-to-weight ratio as the battery pack is a value of 100 V×15 A/0.69 kg=2173 W/kg or more, and 100 V/0.69 kg=144 V/kg or more. In addition, when the battery capacity is more important than portability for holding with one hand at the expense of the weight, 18650 size battery cells or other size battery cells may be used to obtain a battery pack.

FIG. 9(1) is a diagram showing a state when the battery pack 100 is mounted in an electric tool body or electric appliance body with a rated voltage of 36 V. The battery pack 100 includes a voltage switching mechanism 170 for switching whether outputs of the cell units 156 to 158 are connected in parallel or connected in series. The voltage switching mechanism 170 which is a voltage switching element for switching output voltage of the battery pack 100 includes the rotary type terminal base 171 supported by a swing shaft 172 fixed on a substrate 160, and is provided in a terminal disposition area in which a connection terminal for power supply is disposed in the mounting direction of the battery pack 100. The rotary type terminal base 171 is a member for short circuiting or opening a plurality of contact points positioned on the inner circumferential side of the connection terminals 173a to 173d and contact points positioned on the outer circumferential side thereof by installing a plurality of square bar-like connection terminals 173a to 173d in a member that extends from the swing shaft 172 in two directions. The rotary type terminal base 171 is made of a synthetic resin, and is formed by casting each two connection terminals 173a to 173d made of a metal on one side and the other side of the swing shaft 172 with a gap. The connection terminals 173a and 173b are disposed on the side close to the negative electrode terminal 162 so that one surface facing the substrate 160 is exposed. The connection terminals 173c and 173d are disposed on the side close to the positive electrode terminal 161 so that one surface facing the substrate 160 is exposed.

The substrate 160 is use to fix the positive electrode terminal 161 and the negative electrode terminal 162, and dispose a plurality of electrodes (contact points) 176a to 176j that are used to establish or change an electrical connection path from these terminals to the cell units 156 to 158. The plurality of contact points 176a to 176j are provided in an area that partially overlaps a rotating area of the rotary type terminal base 171 in an upper part of the substrate 160. When the connection terminals 173a to 173d exposed on the lower surface of the rotary type terminal base 171 are brought into contact with any of the contact points 176a to 176j, an electrical connection path from the positive electrode terminal 161 to the negative electrode terminal 162 changes. In the electric tool body 1 for 36 V, the switching protrusion 24A is formed in the terminal part 20A. The switching protrusion 24A functions as a switching element for switching output voltage or a connection element and is inserted into the third slot 123 or 124 which is positioned between the first slot 121 into which a positive electrode input terminal is inserted and the second slot 122 into which a negative electrode input terminal is inserted. When the battery pack 100 is mounted in an electric tool body, the switching protrusion 24A pushes the rotary type terminal base 171 at a position of an arrow 25, the rotary type terminal base 171 rotates counterclockwise in a top view and is positioned at a first position shown in FIG. 9(1). It can be understand that, at the first position, the connection terminal 173a short-circuits the electrodes (contact points) 176d and 176b, and the connection terminal 173b short-circuits the electrodes (contact points) 176e and 176c. Similarly, it can be understand that the connection terminal 173c short-circuits the contact points 176i and 176g, and the connection terminal 173d short-circuits the contact points 176j and 176h. The voltage switching mechanism 170 which is a voltage switching element is disposed at substantially the same height as positions at which the positive electrode terminal 161 and the negative electrode terminal 162 are disposed. Therefore, there is no need to change a positional relationship of steps from the lower step surface 111 to the upper step surface 115 of the battery pack 100.

FIG. 9(2) shows connection in a state at a position at which the rotary type terminal base 171 rotates counterclockwise in a top view by the switching protrusion 24A as shown in FIG. 9(1), that is, at a first position. The + side output of the cell unit 156 is directly connected to the positive electrode terminal 161. The + side output of the cell unit 157 is connected to the contact point 176*b*, and the + side output of the cell unit 158 is connected to the contact point 176*g*. The − side output of the cell unit 156 is connected to the contact point 176*e*, the − side output of the cell unit 157 is connected to the contact point 176*j*, and the − side output of the cell unit 158 is directly connected to the negative electrode terminal 162. In this state, the contact points 176*d* and 176*b*, the contact points 176*e* and 176*c*, the contact points 176*i* and 176*g*, and the contact points 176*j* and 176*h* are in a connection state. As a result, the cell units 156 to 158 are in a parallel connection state, and a direct current with a rated voltage of 36 V is output between the positive electrode terminal 161 and the negative electrode terminal 162. In addition, when the rotary type terminal base 171 is not at the first position, if the battery pack is connected to an electric appliance body for 18 V (a first electric appliance body), the switching protrusion 24A is engaged with the rotary type terminal base 171 during mounting and moved to the first position.

FIG. 10(1) is a diagram showing a state when the battery pack 100 is mounted in an electric tool body or electric appliance body with a rated voltage of 108 V. In an electric tool with a rated voltage of 108 V, the switching protrusion 84 is formed in the terminal part 80, and no protrusion is formed at a position of the switching protrusion 24A of the terminal part 20 of a 36 V device. The switching protrusion 84 functions as a switching element for switching output voltage or a connection element, and is inserted into the third slot 124 which is positioned between the first slot 121 into which a positive electrode input terminal is inserted and the second slot 122 into which a negative electrode input terminal is inserted. In this state, when the battery pack 100 is mounted in an electric tool body or an electric appliance body, the positive electrode input terminal 81 comes in contact with the positive electrode terminal 161, and the negative electrode input terminal 82 comes in contact with the negative electrode terminal 162, and at the same time, the switching protrusion 84 comes in contact with one arm of the rotary type terminal base 171 as indicated by an arrow 84*a*, and thereby the rotary type terminal base 171 rotates clockwise in a top view and is positioned at a second position. According to this rotation, connection relationships between the connection terminals 173*a* to 173*d* of the rotary type terminal base 171 and the contact points 176*a* to 176*j* are switched. FIG. 10(2) shows a connection state after switching. Here, when the position of the rotary type terminal base 171 is switched from the first position in FIG. 9(2) to the second position in FIG. 10(2), the contact points 176*d* and 176*a*, the contact points 176*e* and 176*b*, the contact points 176*i* and 176*f*, and the contact points 176*j* and 176*g* are in a connection state. As a result, the cell units 156 to 158 are in a serial connection state, and a direct current with a rated voltage of 108 V is output from the positive electrode terminal 161 and the negative electrode terminal 162. In addition, a configuration in which a click mechanism or a latch mechanism is provided on the swing shaft 172 of the rotary type terminal base 171 as a swing member, and no swing occurs if the switching protrusion 24A or the switching protrusion 84 does not apply a predetermined rotation torque or more to the swing member by may be used. In addition, since the contact points 176*a* and 176*f* are points of electrodes that are not connected to any part, these are removed, and electrode gaps between the contact points 176*b* and 176*c*, and the contact points 176*g* and 176*h* increase, and thereby a risk of short-circuiting between adjacent electrodes during switching may be reduced.

According to the present example, in a cordless electric tool also, a high voltage corresponding to that of a commercial power supply driven electric tool can be obtained from the battery pack 100, and a high output portable electric tool or electric appliance can be realized. In addition, even if the number of cells is increased in order to increase the voltage, 30 14500 size lithium cells are used in place of 18650 size cells, it is possible to increase the output, reduce the size, and weight, and increase the power-to-weight ratio. In addition, in the battery pack 100 of the present example, a voltage switching element (the voltage switching mechanism 170) for switching between a parallel connection and a serial connection is disposed inside the battery pack 100, and switches between connections of the cell units 156 to 158. Therefore, since outputs of 36 V and 108 V can be switched, it is possible to operate an electric tool or electric appliance with a rated voltage of 36 V widely used. In addition, in the battery pack 100 of the present example, the voltage switching mechanism 170 functioning as a voltage switching element is disposed at a position with substantially the same height as positions at which the positive electrode terminal 161 and the negative electrode terminal 162 functioning as power supply terminals are disposed. The size of the battery pack 100 in the vertical direction can be made compact.

Example 2

Next, a second example of the present invention will be described with reference to FIG. 11 to FIG. 14. In the second example, as in the first example, the battery pack 200 that can switch output voltage between two levels of 36 V on the low voltage side and 108 V on the high voltage side is provided. FIG. 11 is a perspective view showing the shapes of the battery pack 200 and a terminal part connected thereto, FIG. 11(1) shows a state when connected to an electric appliance with a rated voltage of 36 V, and FIG. 11(2) shows a state when connected to an electric appliance with a rated voltage of 108 V. The external form of the battery pack 200 is basically the same as the shape of the battery pack 100 of the first example shown in FIG. 1 to FIG. 8 except a part (a shape near a disposition area of a slot group).

In the battery pack 200, in a housing formed by bonding a lower case 201 and an upper case 210, 30 cells 151 of 14500 size lithium ion batteries are housed in the same manner as shown in FIG. 8. If the housing is allowed to be large, 18650 size cells may be used, or cells with other shapes and sizes may be used. In the upper case 210 of the battery pack 200, an attachment mechanism for mounting on the side of the electric tool body 1 or the electric tool body 30 is formed, but its configuration and shape are almost the same as those of the battery pack 100 of the first example shown in FIG. 7. In the upper case 210, a lower step surface 211 for guiding a terminal part on the side of the electric appliance and an upper step surface 215 disposed thereabove are formed, and a plurality of terminal insertion ports (slots) are formed at a step part 212 serving as a boundary between the lower step surface 211 and the upper step surface 215. At both left and right side edges of the upper step surface 215, rail parts 238*a* and 238*b* fitted into electric appliance body side groove rail grooves are formed. Here, although five terminal insertion ports are shown in the left to right direction, the number of terminal insertion ports disposed is arbitrary, and may be further increased. A ridge part 240 is formed above the upper step surface 215, and latch parts 241 are provided on both left and right sides of the ridge part 240. The latch part 241 is interlinked with a latch claw 241a. While a stopper part and a slit as a cooling air inlet are formed in the ridge part 240, since its shape is the same as that of the first example shown in FIG. 7, description thereof is omitted here.

FIG. 11(1) shows a state when connected to an electric appliance body or electric tool body 1 with a rated voltage of 36 V, or the like. A terminal part 270 provided on the side of an electric tool body 1 has a narrow width in the left to right direction, and the battery pack 200 is moved so that a positive electrode input terminal 271 and a negative electrode input terminal 272 are inserted into two terminal insertion ports 222 and 224 closer to the center. FIG. 11(2) shows a state when connected to an electric appliance body, or electric tool body 30 with a rated voltage of 108 V or the like. The terminal part 280 of the electric tool body 30 has a wide width in the left to right direction with respect to the terminal part 270, and an area between them becomes a terminal disposition area. In the terminal disposition area, a positive electrode input terminal 281 and a negative electrode input terminal 282 disposed closer to both left and right ends are provided, and a connection element 283 is formed substantially at the center in the left to right direction. The length of the connection element 283 in the longitudinal direction is substantially the same (strictly slightly shorter than) as that of the positive electrode input terminal 281 and the negative electrode input terminal 282. In addition, the size in the height direction is the same. This is because, when the connection element 283 for operating a voltage switching element is added, it is not necessary to change a dimensional relationship between the positive electrode input terminal 281 and the negative electrode input terminal 282, and thus it is possible to avoid an increase in the size of the battery pack 200 due to addition of the voltage switching element. When the battery pack 200 is mounted in the electric tool body 30, the positive electrode input terminal 281 and the negative electrode input terminal 282 are inserted into terminal insertion ports 221 and 225, and the connection element 283 is inserted into a terminal insertion port 223.

FIG. 12 is a connection circuit diagram of the battery pack 200. Three cell units 156 to 158 (refer to FIG. 8(2)) are housed in the battery pack 200. The cell units 156 to 158 are formed as the cell pack 150 shown in FIG. 8, and held by the separator 152, and each includes 10 cells 151 of 14500 size lithium ion batteries connected in series. In addition, note that a total of 10 cells are shown as one battery in FIG. 12. In the terminal insertion ports (slots) 221 to 225 into which input terminals on the side of the terminal parts 270 and 280 are inserted, one to four connection terminals are disposed side by side in an inserting direction of the terminal parts 270 and 280. The connection terminal group disposed here serves as a voltage switching element that switches between a parallel connection and a serial connection of the battery pack 200. A group of the terminal insertion port 222 and the terminal insertion port 224 corresponds to the terminal part 270 for 36 V, and a switching terminal group (a terminal group 232 and a terminal group 234) for outputting a low voltage is disposed there. The positive electrode input terminal 271 is mounted in contact with three terminals of the terminal group 232, and the negative electrode input terminal 272 is mounted in contact with three terminals of the terminal group 234.

A group of the terminal insertion port 221 and the terminal insertion port 225 corresponds to the terminal part 280 for 108 V, and a switching terminal (a terminal 231 and a terminal 235) for outputting a high voltage is disposed there. The positive electrode input terminal 281 is mounted in contact with the terminal 231, and the negative electrode input terminal 282 is mounted in contact with the terminal 235. The connection element 283 for switching output voltage is additionally provided at the center parts of the terminal part 280 to the left and right thereof. The connection element 283 serving as a voltage switching element that switches between a parallel connection and a serial connection is inserted into the terminal insertion port 223. The connection element 283 has a conducting part 283a on the tip side (in the drawing, side close to the battery pack 200) and a conducting part 283c on the rear end side, and when an insulator 283b is disposed between the conducting parts 283a and 283c, the conducting part 283a and the conducting part 283c are in an electrically non-conductive state. The object of the conducting parts 283a and 283c is to function as a short-circuiting component that causes predetermined terminals in a terminal group 233 to be short-circuited, and there is no need to provide a wiring from the conducting parts 283a and 283c on the side of the electric appliance body. Therefore, the connection element 283 may be produced by casting a metal plate forming the conducting parts 283a and 283c in a non-conductive connection element base formed by integral molding with the terminal part 280 or produced by attaching a metal plate to the outer circumferential surface of a non-conductive connection element base or performing a conducting treatment on the outer circumferential surface according to metal plating or the like. In this manner, in the terminal part 280, a short-circuiting component that connects a plurality of cell units in series is added and formed.

FIG. 13 shows diagrams of the shapes of the terminals 231 to 235, FIG. 13(1) is a top view, and FIG. 13(2) is a side view of the terminal group 232 (a diagram in a direction of an arrow B in FIG. 13(1)). Here, the terminals 231 and 235, and the terminals 232a, 233a, and 234a have the same shape as terminals that are widely used in the related art, and a flat plate is bent in a U-shape, both side surfaces in the vicinity of an opening end are recessed inward in a convex shape, and the narrowest part according to the convex part is formed in contact with both surfaces of a plate-like terminal on the side of the terminal part. The terminals 231, 235, 232a, 233a, and 234a have a shape of which the rear side is closed because a metal terminal on the side of a terminal part to be fitted does not penetrate through the rear side. On the other hand, since the other terminal groups, that is, the terminals 232b, 232c, 233b to 233d, 234b, and 234c, are fitted while a metal terminal on the side of a contacting terminal part is penetrated from the front to the rear, an opening is formed not only on the front side but also on the rear side. In the side view in FIG. 13(2), a specific shape is shown, and an upper end of the terminal 232a near the rear side (an arrow 236a) is closed, but the terminals 232b and 232c have a shape of which not only the front side but also the rear side (near indicated by arrows 236b and 236c) are opened. Therefore, when the terminal part 270 as shown in the drawing is inserted in a direction of an arrow 265, the positive electrode input terminal 271 comes in contact with the three terminals 232a to 232c at the same time, and thus they are in an electrically conductive state. This connection state is the same as in the negative electrode input terminal 272 and the three terminals 234a to 234c. In this manner, in one terminal insertion port, a plurality of terminals are arranged in the same direction (parallel direction) as the mounting direction, and a connection state of the cell units 156 to 158 in the battery pack 200 can be set to either a parallel connection or a serial state using the electrode plate of the terminal part.

FIG. 14 shows diagrams of states when the battery pack 200 is mounted in the terminal parts 270 and 280, FIG. 14(1) shows a state of an output voltage of 36 V, and FIG. 14(2) shows a state when 108 V is output. The terminal part 270 when 36 V is output shown in FIG. 14(1) includes the positive electrode input terminal 271 and the negative electrode input terminal 272. The positive electrode input terminal 271 comes in contact with the terminals 232a, 232b, and 232c, and thus they are conductive. The terminal 232a is connected to the + terminal (positive electrode) of the cell unit 156, the terminal 232b is connected to the + terminal of the cell unit 157, and the terminal 232c is connected to the + terminal of the cell unit 158. Therefore, the positive electrode input terminal 271 is connected to the + terminals of the three cell units 156 to 158. Similarly, the negative electrode input terminal 272 comes in contact with the terminals 234a, 234b, and 234c, and thus they are conductive. The terminal 234a is connected to the − terminal (negative electrode) of the cell unit 156, the terminal 234b is connected to the − terminal of the cell unit 157, and the terminal 234c is connected to the − terminal of the cell unit 158. Therefore, the negative electrode input terminal 272 is connected to the − terminals of the three cell units 156 to 158. In addition, because there is nothing that is connected to the terminal group 233, the terminals 233a to 233d are opened. As a result, the cell units 156 to 158 are connected in parallel, that is, a direct current with a rated voltage of 36 V is output to the positive electrode input terminal 271 and the negative electrode input terminal 272.

FIG. 14(2) is a diagram showing a state in which the battery pack 200 is mounted in the terminal part 280. The terminal part 280 when 108 V is output includes the positive electrode input terminal 281, the negative electrode input terminal 282, and the connection element 283. The positive electrode input terminal 281 comes in contact with only the terminal 231 connected to the + terminal of the cell unit 156. Similarly, the negative electrode input terminal 282 comes in contact with only the terminal 235 connected to the − terminal of the cell unit 158. In addition, the connection element 283 (connection terminal) is inserted in contact with four terminal groups (serial terminal elements 233a to 233d). According to the connection element 283, the terminal 233a and the terminal 233b are short-circuited due to the conducting part 283a (refer to FIG. 12), and the terminal 233c and the terminal 233d are short-circuited due to the conducting part 283c (refer to FIG. 12). Here, a gap between the terminal 233b and the terminal 233c remains in a non-conductive state due to the insulator 283b (refer to FIG. 12) formed in the connection element 283. Since the terminal 233a is connected to the − terminal of the cell unit 156, and the terminal 233b is connected to the + terminal of the cell unit 157, a serial connection state between the cell units 156 and 157 is established. Similarly, since the terminal 233c is connected to the − terminal of the cell unit 157, and the terminal 233d is connected to the + terminal of the cell unit 158, a serial connection state between the cell units 157 and 158 is established. As a result of these conductive states, the cell units 156 to 158 are connected in series, and a direct current with a rated voltage of 108 V is output to the terminal 231 of the positive electrode and the terminal 235 of the negative electrode. In addition, respective terminals of the terminal group 232 and the terminal group 234 are opened.

As above, in the second example, a plurality of terminals (terminal group) for switching voltages are provided, a switching terminal group is configured by disposing terminals extending from the plurality of cell units adjacently, and thus the battery pack 200 that can support a plurality of power supplies is realized. In particular, since serial terminal groups (the serial terminal elements 233a to 233d) that are connected to positive electrodes or negative electrodes of the plurality of cell units in the slot 223 and for connecting the plurality of cell units in series are provided, the battery pack 200 that can be switched between 36 V and 108 V us realized. In this case, when the terminal part 270 or 280 on the side of the electric tool body (electric appliance body) is set to have the shape as shown, the third slot (223) into which a switching element (the connection element 283) for switching output voltage is inserted is provided separately from the slot (221 or 222) into which a positive electrode input terminal is inserted and slots (224 and 225) into which a negative electrode input terminal is inserted. Therefore, an output voltage from the side of the battery pack 200 is automatically switched simply by mounting the battery pack 200. Therefore, there is no need for the operator to be careful about an operation of switching battery voltages, and there is no risk of the side of the electric appliance body being damaged due to a set voltage error. In addition, when the battery pack 200 is removed, since the three cell units 156 to 158 are opened (in a non-connection state), an optimal state during storage and transportation can be brought into. In the battery pack 200 of the second example, since the terminal group 232, the terminal group 234, and the connection element 283 functioning as voltage switching elements, and the terminal 231, the terminal 235, the terminal group 232, and the terminal group 234 functioning as power supply terminals are disposed at positions with substantially the same height in the vertical direction. Therefore, the size of the battery pack 200 in the vertical direction can be made compact.

The structure of the battery pack 200 used in the second example can be effectively applied to not only a voltage switching type battery pack but also a fixed voltage type battery pack. The structure of such a battery pack is show in FIG. 15. FIG. 15 shows diagrams for explaining a circuit diagram of a 108 V dedicated battery pack 200A. Here, this structure is the same as the structure in which the terminal groups 232 and 234 in FIG. 14(2) are removed, and the terminal insertion ports 222 and 224 (refer to FIG. 11 for both) formed at insertion positions of the terminal groups 232 and 234 are closed. The electric device body for 108 V uses the terminal part 280 including the positive electrode input terminal 281, the negative electrode input terminal 282, and the connection element 283. The structure of the terminal part 280 is the same as the structure shown in FIG. 12, and the connection element 283 has the conducting part 283a on the tip side and the conducting part 283c on the rear end side, and the conducting parts 283a and 283c are connected in an electrically non-conductive state by the insulator 283b. In this manner, since a serial connection state of the cell units 156 to 158 is established when the terminal part 280 is connected using a plurality of terminal groups. Therefore, when the battery pack 200A is not mounted in the electric appliance (when removed), since the three cell units 156 to 158 are in a non-connection state, an optimal state during storage and transportation can be brought into. In addition, when opening parts of the slots 222 and 224 are closed, the battery pack 200A for 108 V cannot be mounted in the electric appliance body for 36 V, it is possible to effectively prevent erroneous attachment.

FIG. 15(2) is a circuit diagram showing a battery pack 200B of another modified example. The terminal shape and the fitting target (the terminals 231 and 235) of a positive electrode input terminal 281A and a negative electrode input terminal 282A are same as those of the structure in FIG. 15(1) except that a gap in the left to right direction is broader. However, FIG. 15(2) shows a state in which the connection element 283 in FIG. 15(1) is divided into two parts in the left to right direction, and divided into a first connection terminal 285 and a second connection terminal 286. According to this division, the terminals 233a to 233d are separately disposed in the lateral direction. The first connection terminal 285 is a metal plate for short-circuiting the terminal 233b connected to the + terminal side of the cell unit 157 and the terminal 233a connected to the − terminal side of the cell unit 156. Similarly, the second connection terminal 286 is a metal plate for short-circuiting the terminal 233c connected to the − terminal side of the cell unit 157 and the terminal 233d connected to the + terminal side of the cell unit 158. In this modified example also, the same effects as in FIG. 15(1) can be obtained, and an installation space for the terminals 233a, 233b, 223c, and 233d can be reduced, which is advantageous for mounting an existing battery pack. In addition, in the modified example in FIG. 15(2), when six terminal insertion ports are provided in the lateral direction, the terminal groups 232 and 234 for outputting 36 V (refer to FIG. 13) can be disposed in the configuration in FIG. 15(2), and a battery pack in which the length of terminals in the front to rear direction is shortened can be realized.

Example 3

Next, a third example of the present invention will be described with reference to FIG. 16 to FIG. 20. The battery pack 300 of the third example and those of the first and second examples are the same in that output voltage of the battery pack can be switched between two levels on the low voltage side and the high voltage side. However, in the third example, a voltage ratio is not switched by 3 times such as 36 V and 108 V, but the voltage ratio is switched by twice such as 18 V and 36 V. FIG. 16 is a schematic perspective view showing the shapes of a battery pack 300 according to a third example of the present invention and terminal parts 370 and 380 mounted therein. There are two types of an electric appliance that can be mounted in the battery pack 300; a rated 18 V device having a terminal part 370 and a rated 36 V device having a terminal part 380. In the terminal part 370, a positive electrode input terminal 371 and a negative electrode input terminal 372 which are a first power supply input terminal group (a device side power supply terminal) are formed. In the terminal part 380, device side power supply terminals of a positive electrode input terminal 381 and a negative electrode input terminal 382 which are a second power supply input terminal group (a device side power supply terminal) are formed. These terminal parts 370 and 380 are provided in battery pack mounting parts on the side of the electric appliance body, and are electrically connected to a load device and the like inside the housing of the electric appliance. The positive electrode input terminals 371 and 381, and the negative electrode input terminals 372 and 382 are formed of a metal plate-like member, and a base part for fixing them is formed of a non-conductive molded article such as a synthetic resin.

The battery pack 300 shown here is a schematic diagram thereof and a plurality of slots 321 to 324 are formed from a step part 312 to the rear side between a lower step surface 311 and an upper step surface 315. The upper shape of the battery pack 300 including these slots 321 to 324 may have substantially the same shape as the shape of the battery pack 100 shown in FIG. 7, but a ridge part, a latch part, and the like are not shown here. The terminal part 370 for 18 V has a width that becomes narrower in the left to right direction, and the terminal part 380 for 36 V has a width that becomes wider in the left to right direction. According to a difference between widths of the terminal parts 370 and 380, a gap between the positive electrode input terminal 371 and the negative electrode input terminal 372 is formed narrow, and a gap between the positive electrode input terminal 381 and the negative electrode input terminal 382 is formed wide. In addition, an area occupied by the terminal groups (371 and 372) for a low voltage is set to be included in an area occupied by the terminal groups (381 and 382) for a high voltage. The positive electrode input terminal 371 and the negative electrode input terminal 372 are inserted into the slot 322 and the slot 323, respectively, and the positive electrode input terminal 381 and the negative electrode input terminal 382 are inserted into the slot 321 and the slot 324, respectively. The positions of these terminals and slots are appropriately guided by rail grooves formed in the battery pack mounting parts on the side of the electric tool body and rail parts (not shown here) formed in the battery pack 300. In this manner, slots into which clips (the positive electrode input terminals 371 and 381 and the negative electrode input terminals 372 and 382) of terminal parts on the side of the electric appliance body are inserted are provided in two patterns, products for 18 V and 36 V having clips of terminal parts with different widths are attached, and thereby outputs can be switched. When the operator simply mounts the battery pack 300 in an electric appliance body such as an electric tool for 18 V or an electric appliance body for 36 V, an appropriate output voltage can be obtained from the battery pack 300.

FIG. 17 shows diagrams of constituent parts of a voltage switching mechanism (voltage switching element) 320 disposed near the positions of the slots 321 to 324 (terminal disposition area) inside the battery pack 300, and particularly, on the rear side of the step part 312 (refer to FIG. 16). The voltage switching mechanism 320 is a change-over switching member, and includes two movable guide members 330 and 340 made of a synthetic resin in which a metal terminal member is cast, and are biased by a biasing component such as a spring 348 so that they are separated from each other in a direction intersecting a direction in which the battery pack 300 is mounted in the electric appliance body. Four contact terminals (351 to 354) are provided near on both left and right sides and on the rear side near the center of the movable guide members 330 and 340. In the movable guide members 330 and 340, terminal mounting parts 331 and 341 into which the positive electrode input terminal 371 and the negative electrode input terminal 372 are inserted are formed. The left side drawing in FIG. 17(1) shows the positions of the movable guide members 330 and 340 when the battery pack 300 is not mounted in the electric appliance body, and in this state, the positive electrode input terminal 371 and the negative electrode input terminal 372 can be directly inserted into the terminal mounting parts 331 and 341. On the other hand, as shown in the left side drawing in FIG. 17(2), when the terminal part 380 is mounted, the state differs. When the battery pack 300 is moved relative to the positive electrode input terminal 381 and the negative electrode input terminal 382 which are connection elements of the terminal part 380, the positive electrode input terminal 381 comes in contact with an inclined part 332 of the movable guide member 330, and the negative electrode input terminal 382 comes in contact with an inclined part 342 of the movable guide member 340. This is because, due to the action of the spring 348, parallel surfaces 333 and 343 of the movable guide members 330 and 340 remain stationary at a position of a gap wider than a gap between the positive electrode input terminal 381 and the negative electrode input terminal 382.

When the terminal part 380 is pushed as indicated by an arrow 349 while the positive electrode input terminal 381 is brought into contact with the inclined part 332 and the negative electrode input terminal 382 is brought into contact with the inclined part 342, that is, when the positive electrode input terminal 381 and the negative electrode input terminal 382 are inserted into the slots 321 and 324 (refer to FIG. 16), respectively, the movable guide members 330 and 340 move inward in directions of arrows 336 and 346 (direction approaching each other) while compressing the spring 348. In addition, in the description of the present example, the meaning of the arrow 349 indicating that the terminal part 380 is brought close to the battery pack 300 simply refers to the fact that a distance from the side of the battery pack 300 is reduced, and the direction is shown only for convenience, and refers to both a case in which the battery pack 300 is moved toward a fixed electric appliance body and a case in which the electric appliance body is moved toward the battery pack 300. In the present example, in order to facilitate understanding, such a relative movement has been described as a movement of the terminal part 380 toward the battery pack 300 as indicated by the arrow 349, but the state after mounting is the same regardless of which side is moved.

When the terminal part 380 is further inserted while the movable guide members 330 and 340 move in directions of the arrows 336 and 346, the spring 348 is further compressed and the movable guide members 330 and 340 further approach each other. Therefore, the positive electrode input terminal 381 is inserted between the parallel surface 333 outside (right side) the movable guide member 330 and the first + terminal (first positive electrode terminal) 351, and similarly, the negative electrode input terminal 382 is inserted between the parallel surface 343 outside (left side) the movable guide member 340 and the second – terminal (second negative electrode terminal) 354. In this inserted state, when the terminal part 380 moves to a predetermined position in the direction of the arrow 349, mounting of the battery pack 300 is completed, and this state is shown in the right side drawing in FIG. 17(2). When the movable guide members 330 and 340 move, the positions of intermediate terminals 335 and 345 move also at the same time, and their closest point changes from a "non-contact" state to a "contact" state, and a gap between the intermediate terminals 335 and 345 becomes conductive. In addition, contact states between the movable guide members 330 and 340, and the terminals 351 to 354 change, and as a result, a direct current with a rated voltage of 36 V is output to the terminal part 380.

FIG. 18 shows diagrams for explaining the voltage switching mechanism 320 using the movable guide members 330 and 340 and the terminals 351 to 354. FIG. 18(1) is a diagram showing a housing position of the voltage switching mechanism 320 in the battery pack 300. In FIG. 18(1), the voltage switching mechanism 320 is housed on the rear side relative to the step part 312 formed by the lower step surface 311 and the upper step surface 315 of the battery pack and at a position overlapping positions at which the plurality of slots 321 to 324 (refer to FIG. 16) are disposed in a top view. The movable guide members 330 and 340 are movable members that move in the left to right direction on a terminal board 360 (refer to FIG. 18(3)), and four contact terminals (351 to 354) are non-movable members that are fixed to the terminal board 360 and immovable.

FIG. 18(2) is a development view of the voltage switching mechanism 320 when viewed form the top, and shows components that are separated by distances at which configurations thereof can be easily recognized. In FIG. 18(2), the movable guide member 330 has a basic shape in which a rectangular member and a triangular member are connected in a top view, and the basic shape part is made of a synthetic resin such as a plastic. The metal intermediate terminal 335 is cast in the synthetic resin part, and they are firmly fixed. Two contactors 335c and 335d are formed on the rear side of the intermediate terminal 335, and a contactor 335a that extends to the front side so that it extends between the terminal mounting parts 331 and is bent in a convex shape from the inside to the outside in order to come in contact with the positive electrode input terminal 371 of the terminal part 370 is formed, and in the inner part (in the drawing, on the left side of the movable guide member 330), a contactor 335b that comes in contact with a contactor 345b of the intermediate terminal 345 on the side of the other movable guide member 340 is formed. The movable guide member 340 and the intermediate terminal 345 cast therein are formed bilaterally symmetrical with respect to the movable guide member 330 and the intermediate terminal 335. Two contactors 345c and 345d are formed on the rear side of the intermediate terminal 345, and a contactor 345a that extends to the front side so that it extends between the terminal mounting parts 341 and is bent in a convex shape from the inside to the outside in order to come in contact with the negative electrode input terminal 372 of the terminal part 370 is formed, and in the inner part (in the drawing, on the right side of the movable guide member 340), the contactor 345b that comes in contact with the contactor 335b of the other intermediate terminal 335 is formed. The contactors 335a and 345a constitute a first power supply terminal which is a low voltage terminal group that outputs a low voltage. The spring 348 (not shown in FIG. 18(2)) is cast between the movable guide members 330 and 340, and the movable guide members 330 and 340 are connected via an elastic component during molding. The spring 348 is a compression coil spring made of a metal.

The four terminals 351 to 354 are disposed on the rear side of the intermediate terminals 335 and 345. A second + terminal (second positive electrode terminal) 352 connected to the + terminal (positive electrode terminal) of the first cell unit and a first terminal (first negative electrode terminal) 353 connected to the – terminal (negative electrode terminal) of the first cell unit are disposed near the center in the left to right direction. In the second + terminal 352, the contactors 352a and 352b that are bent in a convex shape on the front side and disposed side by side in the left to right direction are formed. In the first terminal 353, contactors 353a and 353b that are bent in a convex shape on the front side and disposed side by side in the left to right direction are formed. The contactor 335c comes in alternatively contact with any of the contactors 352a and 352b, and the contactor 345c comes in alternatively contact with any of the contactors 353a and 353b.

The first + terminal (first positive electrode terminal) 351 is disposed on the right side of the intermediate terminal 335, and the second terminal (second negative electrode terminal) 354 is disposed on the left side of the intermediate terminal 345. The first + terminal 351 is a member bent in a substantially L-shape in a top view, and at one end positioned on the front side, a contactor 351*a* that is bent in a convex shape from the outside to the inside in order to come in contact with the positive electrode input terminal 381 (refer to FIG. 17) of the terminal part 380 is formed, and at the other end positioned on the rear side, a contactor 351*b* that is bent in a convex shape on the front side in order to come in contact with the contactor 335*d* of the intermediate terminal 335 is formed. The second terminal 354 has a shape bilaterally symmetrical with respect to the first + terminal 351, and at one end positioned on the front side, a contactor 354*a* that is bent in a convex shape in order to come in contact with the negative electrode input terminal 382 (refer to FIG. 17) of the terminal part 380 is formed, and at the other end positioned on the rear side, a contactor 354*b* that is bent in a convex shape in order to come in contact with the contactor 345*d* of the intermediate terminal 345 is formed. The contactors 351*a* and 354*a* constitute a second power supply terminal which is a high voltage terminal group that outputs a high voltage.

FIG. 18(3) is a cross-sectional view taken along the line C-C in FIG. 18(1). The upper side of the movable guide member 330 is covered by an upper case 310 of the battery pack 300, and the lower side thereof is held so that it is slidable by the terminal board 360 in the left to right direction. On the top surface of the terminal board 360, a guide rail 361 that protrudes upward in a convex shape and linearly extends in the left to right direction is formed. In addition, on the inner wall of the upper step surface 315 of the upper case 310, a guide rail 316 that is provided to linearly extend in the left to right direction is formed. On the other hand, on the upper side surface of the movable guide member 330, a guide groove 334*a* formed continuously in the left to right direction is formed, and on the lower side surface, a guide groove 334*b* formed continuously in the left to right direction is formed. The guide groove 334*a* is engaged with the guide rail 316, and the guide groove 334*a* is engaged with the guide rail 361. In addition, note that the guide groove 334*a* of the movable guide member 330 and a guide groove 344*a* provided on the side of the movable guide member 340 are shown in FIG. 18(1), but they are omitted in FIG. 18(2).

In this manner, when the guide groove 334*b* is guided by the guide rail 361 and the guide groove 334*a* is guided by the guide rail 316, the movable guide member 330 is movable in a direction (the orthogonal direction here) intersecting the mounting direction of the battery pack 300. Similarly, a guide groove and a guide rail are formed on the side of the movable guide member 340, and according to guidance by them, the movable guide member 340 is smoothly slidable in a direction (left to right direction) intersecting the mounting direction of the battery pack 300, and dose not move in the same direction (front to rear direction) as the mounting direction. Since the intermediate terminal 335 is fixed to the movable guide member 330, it is disposed in substantially non-contact with the terminal board 360. In the second + terminal 352, a pin part 352*c* for positioning is fitted into the terminal board 360, and an electrical connection pin (not shown) penetrates through the terminal board 360 and soldered. Here, the pin part 352*c* and the terminal board 360 may be directly soldered in a wiring pattern without separating the pin part 352*c* and connection pin.

As described above, according to the third example, in a terminal disposition area which is on the top surface of the terminal board 360 and in which power supply terminals (a positive electrode terminal and a negative electrode terminal) are disposed, the voltage switching elements (330 and 340) as a plurality of movable guide members that are movable in a direction intersecting the mounting direction of the battery pack 300 can switch whether a plurality of cell units are connected in parallel or connected in series, and thus the battery pack 300 having a voltage automatic switching mechanism is realized. In addition, in the present example, the movement direction of the movable guide member 330 is orthogonal to the mounting direction of the battery pack 300, but the direction is not necessarily limited to a crossing angle of 90 degrees, and movement may be performed to intersect a direction diagonally by increasing or decreasing by a predetermined angle other than 90 degrees. In this manner, in the third example, since the movable guide members 330 and 340 are disposed within a range of the disposition area (the area in which the slots 321 to 324 are disposed) of the terminals 351 to 354, 335, and 345 in the mounting direction of the battery pack 300, voltages can be switched without increasing the size of the battery pack.

Next, a connection state of cell units by the voltage switching mechanism 320 when connected to an electric appliance body with a rated voltage of 18 V will be described with reference to FIG. 19. FIG. 19(1) shows a state before the terminal part 370 is mounted in the battery pack 300. FIG. 19(2) shows a state after mounting and shows a connection state from the four terminals 351 to 354 to cell units 356 and 357 as a circuit diagram. The two cell units 356 and 357 are housed in the battery pack 300. The cell units 356 and 357 are an assembly in which cells 151 of five lithium ion batteries are connected in series, and an output thereof is a rated voltage of 18 V. The + output (positive output) of the cell unit (first cell unit) 356 is wired to the first + terminal 351 by a lead wire and the − output (negative output) is wired to the first terminal 353 by a lead wire. Similarly, the + output of the cell unit (second cell unit) 357 is wired to the second + terminal 352 by a lead wire, and the − output is wired to the second terminal 354 by a lead wire.

When the terminal part 370 is not mounted, the movable guide members 330 and 340 are biased away from each other by the spring 348. In this state, the contactor 335*b* and the contactor 345*b* are separated from each other and in a non-contact state. When the terminal part 370 is mounted in a state in FIG. 19(1), as shown in FIG. 19(2), the positive electrode input terminal 371 of the terminal part 370 is housed in the terminal mounting part 331 via the slot 322 (refer to FIG. 16), and as a result, the contactor 335*a* and the positive electrode input terminal 371 come in contact with each other. Similarly, the negative electrode input terminal 372 is housed in the terminal mounting part 341 via the slot 323 (refer to FIG. 16), and as a result, the contactor 345*a* and the negative electrode input terminal 372 come in contact with each other. However, because the movable guide members 330 and 340 do not move in the same direction as the arrow 349 or in a direction orthogonal thereto (the left to right direction or the vertical direction), there is no change in the contact relationship between the intermediate terminals 335 and 345 and the four terminals 351 to 354. In this state, the contactors 335*d* and 351*b* come in contact with each other, the contactors 335*c* and 352*a* come in contact with each other, the contactors 345*c* and 353*a* come in contact with each other, and the contactors 345*d* and 354*b* come in contact with each other. As a result of contacts of these contactors, a connection path from the positive electrode input terminal 371 to the + output (positive output, positive electrode terminal) of the cell units 356 and 357 is established, a connection path from the negative electrode input terminal 372 to the − output (negative output, negative electrode terminal) of the cell units 356 and 357 is established, and the two cell units 356 and 357 are connected in parallel, and an output thereof, that is, a direct current with a rated voltage of 18 V, is output from the battery pack 300.

FIG. 20(1) shows a state before the terminal part 380 is mounted in the battery pack 300, and FIG. 20(2) shows a state after mounting, and shows a connection state from the four terminals 351 to 354 to the cell units 356 and 357 as a circuit diagram. As shown in FIG. 20(1), when the terminal part 380 is not mounted, the movable guide members 330 and 340 are biased away from each other by the spring 348. In this state, the contactor 335b and the contactor 345b are separated from each other and in a non-contact state. When the terminal part 380 is mounted in a state in FIG. 20(1), the positive electrode input terminal 381 comes in contact with the inclined part 332 via the slot 321 (refer to FIG. 16). However, when the terminal part 380 is pushed (or the battery pack 300 is moved toward the terminal part 380) in a contact state, since the inclined part 332 moves in such a manner that it escapes into the positive electrode input terminal 381, the movable guide member 330 moves in the direction of the arrow 336 while compressing the spring 348. Similarly, the negative electrode input terminal 382 is pushed in contact with the inclined part 342 via the slot 324 (refer to FIG. 16), since the inclined part 342 moves in such a manner that it escapes into the negative electrode input terminal 382, the movable guide member 340 moves in the direction of the arrow 346 while compressing the spring 348. When the movable guide member 330 moves inward, the positive electrode input terminal 381 is inserted between the parallel surface 333 positioned on the lateral side relative to the inclined part 332 and the first + terminal 351, and held in this state (a state shown in FIG. 20(2)) due to bias of the spring 348, and the positive electrode input terminal 381 favorably comes in contact with the contactor 351a of the first + terminal 351. Similarly, when the movable guide member 340 moves inward, the negative electrode input terminal 382 is inserted between the parallel surface 343 positioned on the lateral side relative to the inclined part 342 and the second terminal 354 and held in this state (a state shown in FIG. 20(2)), and the negative electrode input terminal 382 favorably comes in contact with the contactor 354a of the second terminal 354.

When the movable guide members 330 and 340 move inward, a contact relationship of other contactors also changes. First, when the contactor 335b of the intermediate terminal 335 comes in contact with the contactor 345b of the intermediate terminal 345, the intermediate terminals 335 and 345 are in a conductive state. In addition, a contactor that comes in contact with the contactor 335c of the intermediate terminal 335 is switched from the contactor 352a as shown in FIG. 20(1) to the contactor 352b as shown in FIG. 20(2), and a connection state between the contactor 335d of the intermediate terminal 335 and the contactor 351b of the first + terminal 351 is released. Similarly, a contactor that comes in contact with the contactor 345c of the intermediate terminal 345 is switched from the contactor 353a as shown in FIG. 20(1) to the contactor 353b as shown in FIG. 20(2), and a connection state between the contactor 345d of the intermediate terminal 345 and the contactor 354b of the second terminal 354 is released. As a result of switching contact states of these contactors, a connection path from the positive electrode input terminal 381 to the + output (positive output, positive electrode terminal) of the cell unit 356 is established, a connection path from the − output (negative output, negative electrode terminal) of the cell unit 356 to the + output of the cell unit 357 is established, and a connection path from the − output of the cell unit 357 to the negative electrode input terminal 382 is established. This connection is a serial connection of two cell units 356 and 357, and a direct current with a rated voltage of 36 V is output from the battery pack 300. In addition, since the movable guide members 330 and 340 of the voltage switching mechanism 320 are biased by the spring 348, when the terminal part 380 is removed in a state in FIG. 20(2), the state returns to its original state in FIG. 20(1). Therefore, a serial connection state of the cell units 356 and 357 is automatically released, and returns to a parallel connection state.

As described above, when the voltage switching mechanism 320 is realized using the movable guide members 330 and 340, the operator simply mounts the battery pack 300 in either an electric appliance body with a rated voltage of 18 V or an electric appliance body with a rated voltage of 36 V, and thus an output voltage optimal for the electric appliance body can be obtained. In addition, the above third example can also be realized in a battery pack that performs switching between other voltages, for example, 54 V/108 V, as long as the voltage ratio is doubled. In addition, a switch mechanism having a switching voltage ratio that is tripled may be realized using three movable guide members. In the battery pack 300 of the third example, the voltage switching mechanism 320 functioning as a voltage switching element and the contactor 335a and the contactor 345a functioning as power supply terminals are disposed at positions with substantially the same height in the vertical direction. Therefore, the size of the battery pack 300 in the vertical direction can be made compact.

Example 4

Next, a battery pack 400 according to a fourth example of the present invention will be described with reference to FIG. 21 to FIG. 28. FIG. 21 shows perspective views of the battery pack 400, FIG. 21(1) shows a state when 18 V is output, and FIG. 21(2) shows a state when 36 V is output. In the fourth example, the operator manually switches between output voltages of 18 V and 36 V according to a switching mechanism using a change-over switch. Therefore, an operation lever (operation portion) 452 of the change-over switch is provided in a part of the upper side of the battery pack 400. The other basic configuration is compatible with the configuration of a battery pack for 18 V used in the related art. On the upper side of the battery pack 400, a battery pack mounting mechanism including rail parts 438a and 438b, a plurality of slot groups, and a connection contact terminal is provided. The upper side of the rail parts 438a and 438b disposed on both left and right sides is an upper step surface 415, a boundary between the upper step surface 415 and a lower step surface 411 on the front side is a step part 412, a terminal disposition area 420 in which a plurality of slots are formed from the step part 412 toward the rear side is provided. In addition, at the rear part of the upper step surface 415, a ridge part 432 that protrudes upward from the top surface is provided in a substantially U-shape in a top view, and the operation lever 452 is disposed in a recessed area surrounded by the ridge part 432. The operation lever 452 is provided such that at least a part thereof protrudes upward from the upper step surface 415. In the terminal disposition area 420, 8 slots are formed, and various signals are output in addition to the + output and the − output. A stopper part 431 as a recess part in which a vent opening to the inside of the housing is disposed is formed on the same surface as the upper step surface 415 and in the vicinity of substantially the center on the left and right sides of the ridge part 432.

The operation lever 452 is provided at a position at which compatibility is not impaired for a battery pack used in an electric tool for 18 V of the related art. It is important for the operation lever 452 not to be operated while it is mounted in an electric appliance body and a current is supplied. In the present example, on the rear side of the upper step surface 415 of the battery pack 400, and within an area of a distance L in the front to rear direction on the rear side relative to the rail parts 438a and 438b, the operation lever 452 of the switch mechanism is provided. A position at which the operation lever 452 is provided is in a space used as the stopper part 431 and in an area overlapping a latch mechanism having a latch 441 in the front to rear direction. A cutout part 435 is formed on the wall of the upper cover case 410 for securing its movable range around the operation lever 452. A cooling air intake slit 434 is formed on a left side part of the recess part to avoid the cutout part 435. FIG. 21(1) shows a state when 18 V is output, and in this state, a width W1 of the right side part including up to the operation lever 452 is set to be the same as a width W3 of the left side part, and a width S1 of the stopper part 431 in the left to right direction may be the same as that of a battery pack for 18 V commercially available in the past. In order to obtain the width W1 of the right side part, the width W2 of the ridge part 432 of the right side part is formed to be slightly smaller than that in the related art. As a result of such a configuration, the battery pack 400 according to the present example can be directly mounted in an electric appliance for 18 V of the related art.

FIG. 21(2) shows a state when an output voltage of the battery pack 400 is set to 36 V. When 36 V is output, the swing type operation lever 452 is moved in the direction of an arrow 471 and is positioned at a second position. When the voltage returns to 18 V, the operation lever 452 is moved in a direction opposite to the arrow 471 from the state in FIG. 21(2). At the second position, the operation lever 452 protrudes into a substantially rectangular space formed near the center of the ridge part 432 to the right and left thereof. In a recessed area surrounded by the ridge part 432, the operation lever 452 is positioned in contact with a wall with the ridge part 432 in a top view at the first position, and is positioned so that one swing side of the operation lever 452 is largely separated from a wall with the ridge part 432 at the second position. When a fixing position of the operation lever 452 is changed and the operation lever 452 protrudes and is positioned at the second position using a phenomenon in which the operation lever 452 protrudes into the stopper part 431, that is, when an output of 36 V is set, the width of the stopper part 431 in the left to right direction is limited to be small such as $S_1$ to $S_2$. This means that, while the battery pack 400 is set to 36 V, it cannot be attached to a battery pack mounting part of an electric appliance body for 18 V. As described above, when an attachment position of a change-over switch is devised and the operation lever 452 is set to 36 V, it cannot be mounted in an electric appliance body for 18 V. In addition, since the installation position of the operation lever 452 is a position at which it cannot be operated while the battery pack 400 is mounted on the electric appliance body, it is possible to reliably prevent a risk of voltages being switched while an electric appliance operates.

FIG. 22 is a perspective view showing the shape of an electric tool body 1A which is an example of an electric appliance with a rated voltage of 18 V. The electric tool body 1A is an impact driver and has the handle part 3 that extends downward from a substantially cylindrical body part 2, and a battery pack mounting part 10A is formed on the lower side of the handle part 3. In a part of the battery pack mounting part 10A, in order to prevent a relative movement of the battery pack 400 in the mounting direction, a protrusion part 44 for positioning mounting of the battery pack is formed, and the protrusion part 44 is mounted in the battery pack 400 in contact with the stopper part 431. Here, the protrusion part 44 serves as a screwing boss of a housing of the electric tool body 1A formed into two parts in the left to right direction, and forms a convex part having a predetermined width $S_1$ in the left to right direction. Therefore, when the operation lever 452 is set to an 18 V mode side, the battery pack 400 can be smoothly mounted in the electric tool body 1A because it corresponds to a recess (recess part) formed in the ridge part 432. On the other hand, when the operation lever 452 is set to a 36 V mode side, since the operation lever 452 protrudes into the stopper part 431, and the width of the stopper part 431 in the left to right direction decreases to $S_2$ (refer to FIG. 21(2)), the stopper part 431 interferes with the protrusion part 44, and the battery pack 400 cannot be mounted in the electric tool body 1A. Therefore, it is possible to prevent the operator from mounting the battery pack 400 while a voltage different from that of the target electric tool body 1A is set.

FIG. 23 is a perspective view showing the shape of an electric tool body 480 which is an example of an electric appliance with a rated voltage of 36 V. In the present example, in order to realize the switching type battery pack 400 for 18 V and 36 V, the shape of a battery pack mounting part 481 of the electric tool body 480 for 36 V is set to be substantially the shape of the battery pack mounting part 481 shown in FIG. 22. However, only the width of a protrusion part 484 is formed smaller such as $S_2(<S_1)$, and even when the operation lever 452 is on the side of 36 V and protrudes in the left direction, the battery pack 400 can be mounted in the electric tool body 480.

FIG. 24 shows perspective views of states in which the upper case 410 (refer to FIG. 21) of the battery pack 400 is removed. The switch mechanism 450 is a switch for switching two sets of cell units each having five cells 151A connected in series between a parallel connection and a serial connection. The cells 151A are 18650 size lithium ion batteries, and a total of ten cells 151A including two layers in the up and down direction and five columns in the front to rear direction are housed. The cell 151A that is housed in a separator 152A made of a synthetic resin is disposed in a lower case 401. A terminal board (circuit board) 470 for fixing a plurality of terminals 421 to 427 is disposed on the upper side of the separator 152A, and the switch mechanism 450 is provided on the rear side of the terminal board 470. The switch mechanism 450 has four contact points 461, 462, and 464 and 465 to be described below in FIG. 25 and FIG. 26 that extend from the inside of a switch case 451 and are soldered to the terminal board 470. Here, regarding the relationship, when the switch case 451 is viewed from the battery pack 400, it is an inner case, and a contact member in the switch mechanism 450 is housed in the inner case. The switch mechanism 450 is obliquely disposed so that a longitudinal direction center line C1 of the switch case 451 has a predetermined angle with respect to a line B1 indicating the mounting direction of the battery pack 400. This is to house the switch mechanism 450 within a limited area in the housing formed by the upper case 410 and the lower case 401. Therefore, if a housing space is sufficient, the switch mechanism 450 may be disposed so that the longitudinal direction center line C1 matches the mounting direction line B1 or the longitudinal direction center line C1 is orthogonal to the mounting direction line B1. In addition, the switch mechanism 450 is disposed between the pair of rails 438a and 438b (refer to FIG. 21) when viewed in the left to right direction (direction intersecting the mounting direction) and disposed on the rear side relative to an area surrounded by the rail parts 438a and 438b when viewed in the front to rear direction (mounting direction). In addition, the top surface position of the housing (switch case) 451 of the switch mechanism 450 is the same as or lower than the upper end position of the plurality of terminals 421 to 427 when viewed in the vertical direction.

The terminal 422 among the plurality of terminals 421 to 427 serves as the + output terminal (positive electrode terminal), and the terminal 426 serves as the − output terminal (negative electrode terminal). FIG. 24(2) is a diagram showing a state in which the operator swings the operation lever 452 in the direction of an arrow θ, a first position is switched to a second position, and a circuit of the switch mechanism 450 is set from a parallel connection side to a serial connection side, that is, from the output 18 V side to the output 36 V side. Here, the operation lever 452 is formed such that the rear end side is a swing fulcrum and the front side is a moving end that moves. With such a shape of the operation lever 452, the front side of the operation lever 452 can be swung largely. When the operation lever 452 is at this position (second position), the housed cells 151A are in a 10 serial connection state, and a direct current with a rated voltage of 36 V is output from the terminals 422 and 426. Here, regarding the positional relationship, at least a part of the operation lever 452 protrudes upward from the positive electrode terminal 422 and the negative electrode terminal 426.

FIG. 25 shows a circuit diagram showing a connection state of the battery pack 400, FIG. 25(1) shows a state when 18 V is output, and FIG. 25(2) shows a state when 36 V is output. The first cell unit 356 and the second cell unit 357 in which five cells 151A are connected in series are housed in the battery pack 400. The + output (+ terminal) of the cell unit 356 is connected to the positive electrode terminal 422, and the − output (− terminal) of the cell unit 357 is connected to the negative electrode terminal 426. Six contact points 461a, 462a, 463a, 463b, 464, and 465 are provided in the switch mechanism 450, and these connection states are changed by a switching element 455 moved by the operation lever 452 (refer to FIG. 24). The swing fulcrum side of the switching element 455 is connected to the contact terminals 464 and 465. The contact terminal 464 is connected to the − output (− terminal) of the cell unit 356, and the contact terminal 465 is connected to the + output (+ terminal) of the cell unit 357. In addition, + output (+ terminal) of the cell unit 356 is connected to the contact point 461a, and the − output (− terminal) of the cell unit 357 is connected to the contact point 462a. In addition, the contact point 463a and the contact point 463b are connected by the connection terminal 463 for short-circuiting (refer to FIG. 26 to be described below). In a state in which 18 V is output as shown in FIG. 25(1), the contact terminal 464 and the contact point 462a are connected and the contact terminal 465 and the contact point 461a are connected by the switching element 455. According to such connection relationships, respective + outputs (+ terminals) of the cell units 356 and 357 are connected to the positive electrode terminal 422, respective − output (− terminals) of the cell units 356 and 357 are connected to the negative electrode terminal 426, two sets of cell units 356 and 357 are connected in parallel, and a rated voltage of 18 V is output from the battery pack 400.

When the switch mechanism 450 is switched and 36 V is output as shown in FIG. 25(2), contact points connected to the switching element 455 change, the contact terminal 464 is connected to the contact point 463a, and the contact terminal 465 is connected to the contact point 463b. That is, the contact points 463a and 463b are short-circuited by the connection terminal 463 (refer to FIG. 26 to be described below), and as a result, the − terminal (− output) of the cell unit 356 is connected to the + terminal (+ output) of the cell unit 357. On the other hand, the contact points 461a and 462a are both opened. In this manner, the cell units 356 and 357 are connected in series, and the + output is connected to the positive electrode terminal 422, the − output is connected to the negative electrode terminal 426, and a rated voltage of 36 V is output from the battery pack 400.

FIG. 26 is a diagram showing the shape of the contact terminals 461 to 465 in the switch case 451. The contact terminals 461 to 465 are made of a metal member, and housed in the switch case 451, and some of the contact terminals 461, 462, 464, and 465 except for the connection terminal 463 are exposed to the outside of the switch case 451 for wiring. In addition, not that, in order to show the shape of the contact terminals 461 to 465, illustration of the switching element 455 to be described below in FIG. 27 and FIG. 28 is omitted here. The switch mechanism 450 is a 2-circuit and 2-contact switch in which four terminals that are exposed to the outside of the switch case 451 are formed. A part of the contact terminals 461 and 462 extends and is connected to the terminal board 470 (refer to FIG. 24), and the contact terminals 464 and 465 are connected to the − output (− terminal) of the cell unit 356 and the + output (+ terminal) of the cell unit 357 by a power line. On one short side of the switch case 451, substantially four square planar contact points 462a, 463a, 464a, and 464b are disposed at predetermined intervals. Here, latch claws 462b, 463c, 463d, and 464c bent in a semi-cylindrical shape are formed on the opening side of the contact points 462a, 463a, 464a, and 464b in the horizontal direction. The latch claws 462b, 463c, 463d, and 464c function as a so-called latch mechanism that prevents a contact state from being easily released due to a spring force of the metal member when the connection terminal 463 to be described below is positioned either on the side of the contact point 462a and the contact point 464a or on the side of the contact point 463a and the contact point 464b. Here, either one side of the contact point 462a and the contact point 464a, or the contact point 463a and the contact point 464b is short-circuited. On the other short side of the switch case 451, four contact points 461a, 463b, 465a, and 465b formed in a flat surface are disposed at predetermined intervals. Here, either of the contact point 461a and the contact point 465a, or the contact point 463b and the contact point 465b is short-circuited.

FIG. 27 shows perspective views of an internal structure of the switch case 451, FIGS. 27(1) and 28(2) are the same diagram with different viewing angles. Unlike FIG. 26, the switching element 455 is shown. The switching element 455 can swing about a swing shaft 453 in a predetermined range, and holds metal members 456 and 457 curved in a U-shape for short-circuiting between contact points. An operation piece 454 for fixing the operation lever 452 (refer to FIG. 24) is formed on the side opposite to the switching element 455 with the swing shaft 453 therebetween. In FIG. 27, the planar shape of the operation piece 454 is shown. However, as shown in FIG. 24, the shape may be formed to cover the opening of the cutout part 435 (refer to FIG. 21), and integral forming with a lever-like operation portion (the operation lever 452) that extends upward may be performed. The operation piece 454, the switching element 455, the operation lever 452, and the swing shaft 453 can be produced by integral molding of a synthetic resin. Since the switching element 455 is provided to connect contact points arranged in the vertical direction, it may be formed by fixing or casting the metal members 456 and 457 to a molded article of a synthetic resin or biasing and fixing using a spring or the like. The metal members 456 and 457 are metal plate members bent in a U-shape in a top view and are disposed so that a U-shaped curved part faces the contact point side. When the switching element 455 shown in FIG. 27 is swung about the swing shaft 453, the metal member 456 short-circuits the contact points 462*a* and 464*b*, and the metal member 457 short-circuits the contact point 461*a* and the contact point 465*a*.

FIG. 28 shows perspective views of an internal structure of the switch case 451 when the switching element 455 is swung from the state in FIG. 27 and 36 V is output, and FIGS. 28(1) and 28(2) are the same diagram with different viewing angles. At the position of the switching element 455 shown in FIG. 28, the outside metal member 456 when viewed from the swing shaft 453 short-circuits the contact point 463*a* and the contact point 464*b*, and the inside metal member 457 short-circuits the contact point 463*b* and the contact point 465*b*. As a result of switching by the switching element 455, a serial output of the cell units 356 and 357 as shown in the circuit diagram in FIG. 25(2) is obtained. In the fourth example, when the switching element 455 of the switch mechanism 450 is set to be rotatable, the switching operation is stable, and operation deterioration of contact points due to dust and the like can be reduced. In addition, regarding the configuration, when a high voltage is set, an electric appliance for a low voltage cannot be mounted due to interference with the operation lever 452. Therefore, it is possible to reduce damage to the electric appliance due to erroneous attachment of battery packs with different voltages. In addition, when output switching is a manual switchable type, it is possible to improve appeal of the switching mechanism. In addition, when a case of the switching mechanism is additionally provided in the cases (401 and 410) of the battery pack 400 to form a double structure, it is possible to prevent dust and the like from flowing into the contact point part and reduce the occurrence of contact failure.

As described above, in the fourth example, the battery pack 400 in which voltages can be manually switched using the switch mechanism 450 can be realized. Moreover, when the width of the protrusion part 44 (refer to FIG. 22) or the protrusion part 484 (refer to FIG. 23) on the side of the electric appliance body is changed, it is possible to prevent an error in which a battery pack set to a high voltage side is mounted in an electric appliance body on the low voltage side. In addition, the switch mechanism 450 is disposed in an area overlapping a latch housing area when viewed in the mounting direction, in other words, on the rear side relative to the rail parts 438*a* and 438*b* (refer to FIG. 21) when viewed in the mounting direction. Therefore, it is possible to prevent the size of the battery pack 400 in the left to right direction from increasing. In addition, when the switch mechanism 450 is disposed in an area surrounded by the ridge part 432, the switch mechanism 450 is not exposed to the outside when the battery pack 400 is mounted in the electric appliance body. In addition, there are no actual damages when a battery pack 400 set to 18 V is mounted in an electric appliance body for 36 V. This is because, even if a direct current with a rated voltage of 18 V is mounted in a device for 36 V, the voltage is equal to or lower than a lower limit voltage (for example, 24 V) at which the battery pack can be used and the electric appliance does not operate. In such a low voltage, it is difficult to drive the motor of the electric appliance, but the operation portion of the electric appliance can be operated. Therefore, a buzzer or another component is provided on the side of the electric appliance body, and when a change-over switch in a low voltage state is mounted in an electric appliance body that is compatible with a high voltage, a warning sound indicating a battery voltage setting error may be produced. This alarm is not limited to a sound, and the alarm may be displayed by lighting up or blinking using an LED lamp, the alarm may be delivered by an artificial vibration that is generated by slightly driving the motor, and other notification methods may be used.

FIG. 29 shows a modified example of the fourth example and is diagram showing a configuration in which the battery pack 400 set to 18 V cannot be mounted in an electric tool body 480A for a high voltage. Here, a second protrusion part 485 is provided adjacent to the protrusion part 484 formed in the battery pack mounting part 481 on the side of the electric tool body 480A which is an electric appliance for 36 V. The shape of the second protrusion part 485 is a substantially triangular shape when viewed from the lower side to the upper side. The position of a front apex of the protrusion part 485 is formed to coincide with the position of the operation lever 452 of the battery pack 400 when the voltage is set to 18 V, and the battery pack 400 cannot be mounted while the operation lever 452 remains at 18 V. In such a configuration, it is possible to effectively prevent a mounting error of the battery pack 400. In the above erroneous attachment prevention mechanism, an error when the battery pack 400 is mounted is notified of. However, in the present modified example, a display window 490 through which a switch state of an output voltage is provided is additionally provided in a part of the battery pack side, and the operator can recognize a set voltage at a glance. The display window 490 is a window made of a cut-out opening or a transparent material, and a display mode is switched therein according to movement of the operation lever 452 of the switch mechanism 450. The position at which the display window 490 is formed may be a position that is easily visible when the operator mounts the battery pack 400, for example, the display window 490 may be disposed on a rear wall surface in the vicinity of a gap between the latches 441 provided on the left and right of the rear upper part. Here, when a battery pack 400A is set to 18 V, it is displayed in red as indicated by an arrow 491, and when the battery pack 400A is set to 36 V, it is displayed in another color as indicated by an arrow 492. However, a method of changing a display mode in the display window 490 is not limited to use of a color, but the size of the display window 490 may be further increased, the text of "18 V" or "36 V" may be displayed in the display window 490 for switching, and a combination of other texts, figures, and colors may be displayed. With the above configuration, the operator can recognize a state of a battery voltage at a glance.

The fourth example has been described above. The switching element (the switch mechanism 450) that can output a low voltage or a high voltage according to a voltage of an electric appliance body to which a battery pack is connected is provided. When the operation portion (the operation lever 452) that performs a switching operation is at the first position, a low voltage is output, and when the operation portion is at the second position, a high voltage is output. This configuration is not limited to the battery pack 400 shown in FIG. 21 to FIG. 23, that is, a configuration in which the latch 441 is provided on both left and right sides, the ridge part 432 is formed as a U-shaped recess in a top view, and the stopper part 431 of the inner part is provided, but it can be similarly applied to housings of other battery packs and battery packs having a latch shape. Providing the switch mechanism in the housing of the battery pack, providing the operation portion such as an operation lever for operating the switch mechanism, and providing the operation portion in a part where it cannot be touched from the outside when the battery pack is mounted in order to prevent the operation portion from being operated when the battery pack is mounted are important in the fourth example. When such requirements are satisfied, the fourth example can be applied to battery packs having various configurations.

For example, the invention described in Example 4 can be applied to a battery pack in which only one button of the latch mechanism is provided at the center on the rear side of the housing instead of two buttons. Even if there is one button of the latch mechanism, the switch mechanism is housed in the housing of the battery pack, and the operation portion that operates the switch mechanism may be provided in a space between rail mechanisms or on the rear side of a terminal disposition area in which a positive electrode terminal and a negative electrode terminal are disposed, or in a space between rail mechanisms or on the rear side so that it partially overlaps a terminal disposition area, at a position at which it is hidden when the battery pack is mounted. The shape of the operation portion is not limited to a swing type operation lever, and a push type operation button or a sliding lever may be used.

Example 5

Next, a fifth example of the present invention will be described with reference to FIG. 30 and FIG. 31. In a battery pack 500 of the fifth example, as in the fourth example, 18 V and 36 V can be switched by a change-over switch. However, the change-over switch is not manually operated by the operator. When the battery pack 500 is mounted in an electric appliance body, the voltage is automatically switched according to an output voltage corresponding to a rated voltage on the body side. Here, two switch levers 572 and 577 automatically move according to the width of the protrusion part (24 in FIGS. 2, and 44 in FIG. 22) on the electric appliance body side, and thus a change-over switch mechanism is operated and a connection state of the electrical circuit is changed.

FIG. 30(1) is a top view (partial cross-sectional part) of the battery pack 500 according to the fifth example of the present invention, and FIG. 30 (2) is a circuit diagram in a state in FIG. 30(1). In the ridge part 432 (refer to FIG. 21) of the battery pack 500, the latch 141 that moves in the left to right direction is formed. The latch 141 is a member having a latch claw on the front side, and is biased by a spring 142 so that it protrudes outward. In the present example, a switch mechanism having the movable switch levers 572 and 577 is provided in the inner part of two latches 141. The switch levers 572 and 577 are housed in respective switch housings 571 and 576, and the switch levers 572 and 577 that are movably held in the left to right direction of the battery pack 500. A spring 573 is interposed between the switch housing 571 and the switch lever 572, and the switch lever 572 is biased toward the inside of the battery pack. Similarly, the same biasing component, that is, a spring 578, is interposed between the switch housing 576 and the switch lever 577, and the switch lever 577 is biased toward the inside of the battery pack.

The positions of the switch levers 572 and 577 shown in FIG. 30(1) are in a state of being pushed outward due to the contact with left and right side surfaces of the protrusion part 44 when inserted into the protrusion part 44 on the side of an electric tool body 1A. Here, when the corner of the protrusion part 44 indicated by a dotted line abuts an end of the side of the electric tool body 1A (FIG. 22) when viewed in the insertion direction of the switch levers 572 and 577, the switch levers 572 and 577 are pushed out in the outward direction orthogonal to the mounting direction. In order to facilitate movement in the push-out direction, inclined surface parts 572*a* and 577*a* inclined inward from the front to the rear are formed near the contact part of the switch levers 572 and 577. When the battery pack 500 is completely mounted in the electric tool body 1A, movement occurs until the position of the tip of the switch levers 572 and 577 becomes substantially the same as that of the inner wall surface of the ridge part 432. A slider 572*b* for holding an insulation terminal 541 is formed on the front side of the switch lever 572 is formed. Similarly, a slider 577*b* for holding an insulation terminal 542 and a short-circuiting terminal 544 is formed on the front side of the switch lever 577. The insulation terminals 541 and 542 are a molded article made of a synthetic resin such as a plastic, and they are inserted between a pair of facing contact terminals 531 and 532 and separate respective contact terminals from each other to electrically disconnect them. The short-circuiting terminal 544 is a thin plate made of a metal, and is fixed only to the side of the switch lever 577. Here, the insulation terminals 541 and 542 are integrally molded with the switch levers 572 and 577 by molding a synthetic resin, and the short-circuiting terminal 544 is firmly fixed to the slider 577*b* by casting the metal plate during the molding.

FIG. 30(2) is a circuit diagram showing a connection state when the battery pack 500 is mounted in the electric tool body 1A shown in FIG. 22. Each of the pair of contact terminals 531 and 532 is composed of two short-circuiting terminals, and the wiring is in a connection state when the short-circuiting terminals are positioned along the wiring and are in contact with each other, and the wiring is in a non-connection state when the two short-circuiting terminals are separated from each other and are in a non-contact state. In a state in which the electric tool body 1A is not mounted, two short-circuiting terminals of each of the pair of contact terminals 531 and 532 are in contact with each other and in a connection state. A pair of non-contact terminals 534 are composed of two coupled metal terminals, and positioned in a serial connection wiring that connects the − output (− terminal) of the cell unit 356 and the + output (+ terminal) of the cell unit 357, and when a metal member for conduction, that is, the short-circuiting terminal 544, is inserted between two metal terminals, the wiring is in a connection state. In the state in FIG. 30, since the insulation terminals 541 and 542 are separated from the pair of contact terminals 531 and 532, and the short-circuiting terminal 544 is separated from the pair of non-contact terminals 534, as a result, a parallel circuit of the two cell units 356 and 357 is formed, and a direct current with a rated voltage of 18 V is output from a positive electrode output terminal 521 and a negative electrode output terminal 522.

FIG. 31(1) is a diagram showing a state when the battery pack 500 is mounted in the electric tool body 480 for 36 V (FIG. 23). Here, the width of a protrusion part 484B formed in the battery pack mounting part 481 of the electric tool body 480 is formed narrow in the left to right direction and is set as S3. The width S3 is formed narrower than the width S1 shown in FIG. 22 and the width S2 shown in FIG. 23, and when the battery pack 500 is mounted in the electric tool body 480 for 36 V, the protrusion part 484B does not contact with any of the switch levers 572 and 577. That is, the state of terminal groups in FIG. 31(1) shows a state in which the battery pack 500 is mounted in the electric tool body 480 for 36 V and a state in which the battery pack 500 is removed from the electric appliance body and the like. In this state, as shown in the circuit diagram in FIG. 31(2), the insulation terminals 541 and 542 are inserted between the pair of contact terminals 531 and 532, and electrical conduction is released. On the other hand, the short-circuiting terminal 544 is inserted between the pair of non-contact terminals 534, and electrical conduction is established. Therefore, a parallel connection state of the cell units 356 and 357 is released and a serial connection state is established, and a direct current with a rated voltage of 36 V is output from the positive electrode output terminal 521 and the negative electrode output terminal 522. In the fifth example, the change-over switch mechanism is disposed in an area L2 overlapping a latch housing area L1 when viewed in the mounting direction. The latch housing area L1 has a length in the front to rear direction required for installing a latch mechanism, and the length L2 is a length in the front to rear direction required for installing a switch mechanism including a switch lever and a switch housing. The position of the change-over switch mechanism is disposed on the rear side relative to a part in which rail parts 538a and 538b (not shown in FIG. 31) are disposed when viewed in the mounting direction. Therefore, it is possible to prevent the size of the battery pack 500 in the left to right direction from increasing. In addition, since the change-over switch mechanism is disposed below the upper step surface (the same position as the upper step surface 415 in FIG. 21) of the battery pack 500 and an area partially overlapping a U-shaped inner area surrounded by the ridge part 432 in a top view, the change-over switch mechanism is not exposed to the outside when the battery pack 500 is mounted in the electric appliance body.

As described above, according to the fifth example, when the basic state is set as a serial circuit configuration, and an output form after switching by the switch mechanism is set as a parallel circuit configuration, it is possible to easily switch output voltage of the battery pack. In addition, the basic shape of the battery pack using the present configuration can be changed according to the present example while maintaining the same size as a battery pack for 18 V used in the related art. According to the configuration of the present example, compared to those in the related art, a different voltage switching structure can be simplified, and the number of components can be reduced, and an increase in costs can be prevented when the structure of the present example is used. In addition, compared to battery packs in the related art, there is an advantage of the size not being increased, and an effect of compatibility with battery packs in the related art, which has been an issue, can be obtained.

Various modifications of the above examples can be made. Voltage switching between 18 V and 36 V is exemplified in the above examples, but other voltage ratios may be used.

The invention claimed is:

1. A battery pack, comprising:
a plurality of cell units, each cell unit having at least one cell;
a case body, housing the plurality of cell units, and having a mounting part configured to mount the battery pack on an electrical device body forward in a front-rear direction, and
an operation part, housed in the case body, and configured to switch a connection state of the plurality of cell units when the operation part moves from a first position to a second position,
wherein, the operation part is configured to abut a switching element of the electrical device body and to move from the first position to the second position when the battery pack is mounted to the electrical device body, thereby switching the connection state of the plurality of cell units, and
wherein, the operation part is configured to stay at the second position when the battery pack is removed from the electrical device body, thereby keeping the connection state of the plurality of cell units.

2. The battery pack according to claim 1,
wherein the mounting part comprises a pair of rails, extending in the front-rear direction, and positioned apart from each other in a left-right direction, and
wherein the operation part comprises an abutment portion configured to abut the switching element of the electrical device body, the abutment portion being positioned between the pair of rails in the left-right direction.

3. An electrical device, comprising:
the battery pack according to claim 1,
the electrical device body, having a battery pack mounting part configured to mount the battery pack, and having the switching element, and
a load, configured to drive by power supplied from the battery pack mounted to the battery mounting part.

4. The electrical device according to claim 3,
wherein the battery pack mounting part comprises a pair of rail grooves, extending in a front-rear direction, and positioned apart from each other in a left-right direction, and
wherein the switching element is configured to position between the pair of rail grooves in the left-right direction.

5. The electrical device according to claim 3,
wherein when the battery pack is mounted to the electrical device body, the switching element operates the operation part and the plurality of cell units are connected in parallel to each other.

* * * * *